United States Patent
Chu et al.

(10) Patent No.: US 11,899,268 B2
(45) Date of Patent: Feb. 13, 2024

(54) OPTICAL LENS, CAMERA MODULE AND ASSEMBLY METHOD THEREFOR

(71) Applicant: NINGBO SUNNY OPOTECH CO., LTD., Zhejiang (CN)

(72) Inventors: Shuijia Chu, Ningbo (CN); Heng Jiang, Ningbo (CN); Lin Liu, Ningbo (CN); Enlai Xiang, Ningbo (CN); Kailun Zhou, Ningbo (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 707 days.

(21) Appl. No.: 16/979,688

(22) PCT Filed: Mar. 18, 2019

(86) PCT No.: PCT/CN2019/078478
§ 371 (c)(1),
(2) Date: Sep. 10, 2020

(87) PCT Pub. No.: WO2019/174645
PCT Pub. Date: Sep. 19, 2019

(65) Prior Publication Data
US 2021/0048595 A1    Feb. 18, 2021

(30) Foreign Application Priority Data

Mar. 16, 2018  (CN) .......................... 201810220286.2
Mar. 16, 2018  (CN) .......................... 201810220657.7
(Continued)

(51) Int. Cl.
*G02B 7/02*       (2021.01)
*G02B 13/18*      (2006.01)

(52) U.S. Cl.
CPC ............. *G02B 7/021* (2013.01); *G02B 7/025* (2013.01); *G02B 13/18* (2013.01)

(58) Field of Classification Search
CPC .......... G02B 7/02; G02B 7/021; G02B 7/022; G02B 7/023; G02B 7/025; G02B 7/026
See application file for complete search history.

(56) References Cited

U.S. PATENT DOCUMENTS

2001/0040737 A1   11/2001  Nakano
2006/0093352 A1    5/2006  Webster et al.
(Continued)

FOREIGN PATENT DOCUMENTS

CN        1396473 A      2/2003
CN      101153947 A      4/2008
(Continued)

OTHER PUBLICATIONS

International Search Report issued in PCT/CN2019/078478 (PCT/ISA/210), dated Jun. 12, 2019.
(Continued)

*Primary Examiner* — Ephrem Z Mebrahtu
(74) *Attorney, Agent, or Firm* — Birch, Stewart, Kolasch & Birch, LLP

(57) ABSTRACT

An optical lens, comprising: a first lens component (100) comprising a first lens barrel (101) and at least one first lens sheet (102) mounted in the first lens barrel; a second lens component (200) comprising a second lens barrel (201) and at least one second lens sheet (202) mounted in the second lens barrel, the at least one second lens sheet and the at least one first lens sheet together constituting an imageable optical system; and an adhesive bonding the first lens component and the second lens component together, at least a part of the adhesive being interposed between a lens barrel and a lens sheet, wherein the statement of between the lens barrel and the lens sheet specifically means between the second lens barrel and the first lens sheet or between the first lens barrel and the second lens sheet. A corresponding assembly method for optical lens, a camera module, an optical lens
(Continued)

and assembly method for camera module are further provided. The position shift of the lens sheet caused by the deformation of the lens barrel can be reduced, and the imaging quality of the optical lens or the camera module can be improved.

20 Claims, 23 Drawing Sheets

(30) Foreign Application Priority Data

| Mar. 16, 2018 | (CN) | 201810220892.4 |
|---|---|---|
| Mar. 16, 2018 | (CN) | 201820365043.3 |
| Mar. 16, 2018 | (CN) | 201820366205.5 |
| Mar. 16, 2018 | (CN) | 201820366692.5 |

(56) References Cited

U.S. PATENT DOCUMENTS

| 2008/0212214 | A1 | 9/2008 | Wade et al. |
| 2012/0147489 | A1* | 6/2012 | Matsuoka ............ G02B 7/025 |
| | | | 359/819 |
| 2015/0338602 | A1 | 11/2015 | Furutake |
| 2017/0160509 | A1 | 6/2017 | Wang et al. |
| 2018/0024312 | A1 | 1/2018 | Wei |
| 2018/0224623 | A1* | 8/2018 | Lin .................. G02B 7/021 |

FOREIGN PATENT DOCUMENTS

| CN | 101251634 A | | 8/2008 | |
| CN | 101571617 A | | 11/2009 | |
| CN | 101963692 A | | 2/2011 | |
| CN | 101983348 A | | 3/2011 | |
| CN | 102449523 A | | 5/2012 | |
| CN | 105005131 A | | 10/2015 | |
| CN | 105093471 A | | 11/2015 | |
| CN | 105445885 A | | 3/2016 | |
| CN | 105445889 A | | 3/2016 | |
| CN | 105487190 A | | 4/2016 | |
| CN | 105717602 A | | 6/2016 | |
| CN | 205982793 U | | 2/2017 | |
| CN | 206209175 U | | 5/2017 | |
| CN | 206362958 U | | 7/2017 | |
| CN | 208367291 U | | 1/2019 | |
| CN | 208367292 U | | 1/2019 | |
| CN | 107167893 B | * | 10/2019 | ............ G02B 7/02 |
| EP | 2 881 774 A1 | | 6/2015 | |
| EP | 2 933 670 A1 | | 10/2015 | |
| JP | 2010-191345 A | | 9/2010 | |
| JP | 2010191345 A | * | 9/2010 | |
| KR | 10-2014-0076761 A | | 6/2014 | |
| KR | 2014076761 A | * | 6/2014 | |
| WO | WO 2015/191001 A1 | | 12/2015 | |
| WO | WO 2017/052268 A2 | | 3/2017 | |

OTHER PUBLICATIONS

Extended European Search Report for European Application No. 19766724.9, dated Apr. 16, 2021.

European Communication pursuant to Article 94(3) EPC for European Application No. 19766724.9, dated Jul. 7, 2023.

* cited by examiner

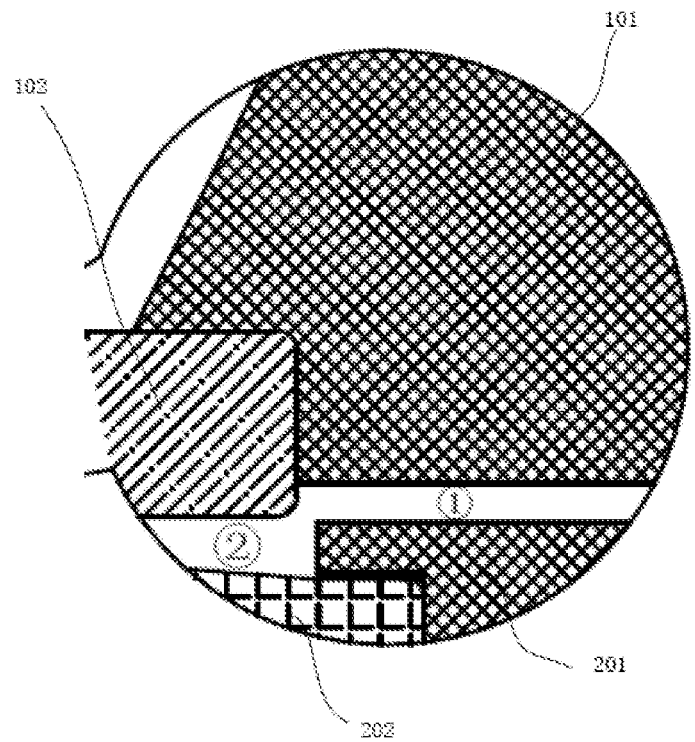
Fig.21g
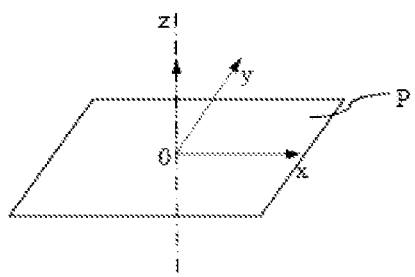
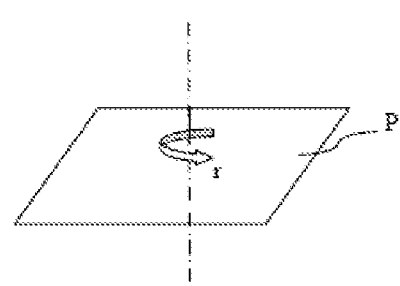
Fig. 22a　　　　　　　　Fig. 22b
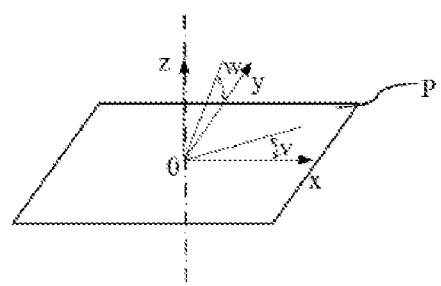
Fig.22c

OPTICAL LENS, CAMERA MODULE AND ASSEMBLY METHOD THEREFOR

CROSS-REFERENCE TO RELATED APPLICATIONS

The present application claims the priority of Chinese invention patent application No. 201810220286.2, entitled "Optical Lens, Camera Module and Assembly Method Therefor", filed with the Chinese Patent Office on Mar. 16, 2018; Chinese utility model patent application No. 201820365043.3, entitled "Optical Lens and Camera Module", filed with the Chinese Patent Office on Mar. 16, 2018; Chinese invention patent application No. 201810220892.4, entitled "Optical Lens, Camera Module and Assembly Method Therefor", filed with the Chinese Patent Office on Mar. 16, 2018; Chinese utility model patent application No. 201820366692.5, entitled "Optical Lens and Camera Module", filed with the Chinese Patent Office on Mar. 16, 2018; Chinese invention patent application No. 201810220657.7, entitled "Optical Lens, Camera Module and Assembly Method Therefor", filed with the Chinese Patent Office on Mar. 16, 2018; and Chinese utility model patent application No. 201820366205.5, entitled "Optical Lens and Camera Module", filed with the Chinese Patent Office on Mar. 16, 2018, the entire contents of which are incorporated herein by reference.

TECHNICAL FIELD

The present disclosure relates to the technical field of optical imaging. Specifically, the present disclosure relates to an optical lens, a camera module and an assembly method therefor.

BACKGROUND

With the popularity of mobile electronic devices, the related technologies of camera modules applied in the mobile electronic devices to help the users obtain images (e.g. videos or pictures) have been developed and advanced rapidly, and in recent years, the camera modules have been widely applied in many fields such as medical treatment, security and industrial production.

In order to meet the increasingly widespread market demands, high pixels, small size, and large aperture are irreversible development trends of the existing camera modules. At present, the market has put forward higher and higher demands for the imaging quality of camera modules. Factors affecting the resolution of a camera module of an established optical design include the quality of an optical imaging lens and the manufacturing errors in the module packaging process.

Specifically, in the manufacturing process of the optical imaging lens, the factors affecting the resolution of the lens come from errors of each element and its assembly, an error of the thickness of a lens sheet spacer element, an error of the assembly of each lens, and a change of a refractive index of a lens material. Among them, the errors of each element and its assembly include errors in the thickness of an optical surface of each lens sheet unit, the vector height of the optical surface of the lens sheet, the profile of the optical surface, the radius of curvature, the single-surface and inter-surface eccentricities of the lens sheet, the tilt of the optical surface of the lens sheet, and so on. The magnitudes of these errors depend on the control ability of mold accuracy and molding accuracy. The error of the thickness of the lens spacer element depends on the processing accuracy of the element. The error of the assembly fit of each lens sheet depends on the dimensional tolerance of the assembled element and the assembly accuracy of the lens. The error introduced by the change of the refractive index of the lens material depends on the stability of the material and batch-to-batch consistency thereof.

The errors of the above respective elements affecting the resolution are cumulatively deteriorated, and such cumulative error will continue to increase as the number of lenses increases. The existing resolution solution is to perform tolerance control on the size of each relatively sensitive element and compensate for the rotation of the lens sheet to improve the resolution. However, because the lens with high pixels and large aperture is more sensitive, it requires strict tolerances. For example, 1 um lens sheet eccentricity of a partially sensitive lens will cause 9' image plane tilt, which makes lens processing and assembly more and more difficult. At the same time, due to the long feedback cycle during the assembly process, the process capability index (CPK) of lens assembly is low and fluctuates greatly, resulting in a high defect rate. Moreover, as described above, because there are many factors affecting the resolution of the lens, which exist in a plurality of elements, the control of each factor has the limit of manufacturing accuracy. If only the accuracy of each element is improved, the improvement ability is limited and the improvement cost is high. Furthermore, it cannot meet the market's increasing demand for image quality.

On the other hand, during the processing of the camera module, the assembly process of each structural member (e.g. the mounting of the photosensitive chip, the motor lens locking process, etc.) may cause the photosensitive chip to tilt, and multiple tilts may be superimposed, which may cause the resolution of the imaging module to fail to meet the established specifications, resulting in a low yield of the module factory. In recent years, the module factory has compensated for the tilt of the photosensitive chip and the relative shift and tilt of an optical axis of the lens and an optical axis of the photosensitive chip through an "Active Alignment" process when assembling the imaging lens and the photosensitive module. However, this process has limited compensation capabilities. Since many kinds of aberrations that affect the resolution come from the capabilities of the optical system (especially the optical imaging lens) itself, when the resolution of the optical imaging lens itself is insufficient, the existing Active Alignment process of the photosensitive module is difficult to compensate.

In order to overcome the above defects, the applicant proposed an assembly method in which a relative position of upper and lower sub-lens is adjusted and determined based on an Active Alignment process, and then the upper and lower sub-lens are bonded together according to the determined relative position, thereby manufacturing a complete optical lens or camera module. This solution can improve the process capability index (CPK) of mass-produced optical lenses or camera modules; can loosen the requirements for the accuracy of each element of the materials (e.g. sub-lens or photosensitive assemblies used to assemble the optical lens or camera module) and their assembly accuracy, thereby reducing the overall cost of optical imaging lenses and camera modules; and can adjust various aberrations of the camera modules in real time during the assembly process, reduce the defect rate, reduce the production costs, and improve the image quality. However, the active alignment and bonding based on the upper and lower sub-lens is a brand-new production process. To achieve stable and reliable mass production based on this production process, there are still many challenges. For example, there is an assembly tolerance between a lens sheet and a lens barrel of the upper sub-lens, and this assembly tolerance may bring a manufacturing tolerance to the optical lens manufactured based on the Active Alignment process. Specifically, FIG. 1 shows a partial schematic cross-sectional view of an example of an optical lens manufactured based on an Active Alignment process in an ideal case where an upper sub-lens has no assembly tolerance. In this example, a lens barrel of the upper sub-lens and a lens barrel of a lower sub-lens are directly connected and play a supporting function. The upper sub-lens includes an upper lens barrel 11 and an upper lens sheet 12, and the upper lens barrel 11 and the upper lens sheet 12 are closely attached, which belongs to the ideal case without assembly tolerances. The lower sub-lens includes a lower lens barrel 11 and a lower lens sheet 12. When the upper and lower sub-lenses are bonded together by an adhesive 40, the adhesive can have a very thin thickness. FIG. 2 shows a partial schematic cross-sectional view of an example of an optical lens manufactured based on an Active Alignment process in an actual case where an upper sub-lens has an assembly tolerance. Referring to FIG. 2, in the upper sub-lens, an upper surface of an upper lens sheet 12 is not closely attached to an upper lens barrel 11, and there is a gap 50 between the two due to the assembly tolerance, causing a filling space of an adhesive 40 between the upper sub-lens and a lower sub-lens after the active alignment to become larger, which not only affects coating/applying of the adhesive, but also may cause the adhesive layer to become thicker than the ideal case shown in FIG. 1. The thicker the adhesive, the greater the amount of variation it may cause. Specifically, the adhesive is used to bond the lens barrel of the upper sub-lens with the lower sub-lens. During the curing and deformation of the adhesive, the adhesive may exert an action force on the lens barrel, and the action force will cause undesired deformation of the lens barrel, which in turn leads to changes in the shape and position of lens sheets mounted in the lens barrel. The thicker the plastic, the greater the undesirable deformation described above. This results in a deviation between an actual lens sheet position of the optical system after the adhesive is completely cured and a lens sheet position of the optical system determined by the active alignment, which may cause the image quality to fail to meet expectations. For another example, the expansion coefficient of the adhesive is fixed, but the adhesive arranged between the upper and lower sub-lens is often uneven (for example, the upper and lower lens barrels produce glue overflow, which will cause uneven thickness of the adhesive). This can easily lead to deformation of the lens barrel due to the uneven force, which in turn causes variation of lens sheets, or may cause the position of the upper sub-lens to shift. The above problems may cause the image quality to decrease.

SUMMARY

The present disclosure is intended to provide a solution that can overcome at least one shortcoming of the prior art.

According to an aspect of the present disclosure, there is provided an optical lens, comprising: a first lens component comprising a first lens barrel and at least one first lens sheet mounted in the first lens barrel; a second lens component comprising a second lens barrel and at least one second lens sheet mounted in the second lens barrel, the at least one second lens sheet and the at least one first lens sheet together constituting an imageable optical system; and an adhesive bonding the first lens component and the second lens component together, at least a part of the adhesive being interposed between the second lens barrel and the first lens sheet or between the first lens barrel and the second lens sheet.

In an embodiment, there are a first gap and a second gap between the first lens component and the second lens component, and the first gap is closer to an outer side of the optical lens than the second gap; the adhesive includes a first adhesive located in the first gap and a second adhesive located in the second gap; and arrangement positions and materials of the first adhesive and the second adhesive are suitable for making the first adhesive and the second adhesive be cured successively at different times.

In an embodiment, the first adhesive and the second adhesive are of different materials, and an adhesion force provided by the second adhesive after curing is greater than an adhesion force provided by the first adhesive after curing.

In an embodiment, the first adhesive is an adhesive cured by light.

In an embodiment, the second adhesive is an adhesive cured by heat, by moisture, by anaerobic or oxidative curing.

In an embodiment, the first adhesive is a UV adhesive or UV thermosetting adhesive.

In an embodiment, the second adhesive is a thermosetting adhesive or UV thermosetting adhesive.

In an embodiment, the first adhesive and the second adhesive are of the same material when they are in a liquid state, and the first adhesive and the second adhesive form different materials with different microstructures after curing, so that an adhesion force provided by the second adhesive after curing is greater than an adhesion force provided by the first adhesive after curing.

In an embodiment, the first adhesive and the second adhesive are both UV thermosetting adhesives.

In an embodiment, the first adhesive and the second adhesive do not contact each other.

In an embodiment, a size of the first gap in a direction along an optical axis of the optical lens is 30-100 μm.

In an embodiment, a size of the second gap in a direction along an optical axis of the optical lens is 30-100 μm.

In an embodiment, a difference between sizes of the second gap and the first gap in a direction along an optical axis of the optical lens is smaller than a threshold.

In an embodiment, the first gap is located between an end surface of the first lens barrel and an end surface of the second lens barrel.

In an embodiment, the second gap is located between an end surface of the first lens barrel and a non-optical surface of a second lens sheet closest to the first lens barrel, and the non-optical surface of the second lens sheet closest to the first lens barrel has a roughened surface; or the second gap is located between an end surface of the second lens barrel and a non-optical surface of a first lens sheet closest to the second lens barrel, and the non-optical surface of the first lens sheet closest to the second lens barrel has a roughened surface.

In an embodiment, the adhesive is used to support the first lens component and the second lens component after curing, so that a relative position of the first lens component and the second lens component is maintained at a relative position determined by active alignment.

In an embodiment, an end surface of the second lens barrel comprises a flat surface, the first gap is located between the flat surface and an end surface of the first lens barrel, and the second gap is located between the flat surface and a non-optical surface of the first lens sheet.

In an embodiment, there is a third gap between an outer surface of the first lens sheet bonded to the second lens component and an inner surface of the first lens barrel, and the first lens sheet to the second lens component and the first lens barrel are fixed to each other by a third adhesive filled in the third gap.

In an embodiment, the second gap has a second opening facing an optical axis of the optical lens, and a size of the second opening in a direction along the optical axis is greater than an average size of the second gap.

In an embodiment, the first gap has a first opening facing an outer side of the optical lens, and a size of the first opening in a direction along the optical axis is greater than an average size of the first gap.

In an embodiment, the first lens sheet is closer to a front end of the optical lens than the second lens sheet.

In an embodiment, an end surface of the second lens sheet bonded to the first lens barrel has an annular groove, and the annular groove is located between the second gap and an optical surface of the second lens sheet.

In an embodiment, an end surface of the second lens sheet bonded to the first lens barrel has an annular boss, and the second gap is located between the annular boss and the first lens barrel.

In an embodiment, an end surface of the first lens sheet bonded to the second lens barrel has an annular boss, and the second gap is located between the annular boss and the second lens barrel.

In an embodiment, a cross-sectional shape of the boss is trapezoidal or rectangular.

According to another aspect of the present disclosure, there is further provided a camera module comprising the optical lens provided in the foregoing embodiments.

According to still another aspect of the present disclosure, there is further provided an assembly method for optical lens, comprising: pre-positioning the first lens component and the second lens component, wherein the first lens component comprises a first lens barrel and at least one first lens sheet mounted in the first lens barrel, the second lens component comprises a second lens barrel and at least one second lens sheet mounted in the second lens barrel, and the pre-positioning makes the at least one second lens sheet and the at least one first lens sheet together constitute an imageable optical system; adjusting and determining a relative position of the first lens component and the second lens component based on active alignment; and bonding the first lens component and the second lens component by an adhesive, wherein at least a part of the adhesive is interposed between the second lens barrel and the first lens sheet or between the first lens barrel and the second lens sheet.

In an embodiment, the bonding by the adhesive comprises: using the cured adhesive to support the first lens component and the second lens component, so that a relative position of the first lens component and the second lens component is maintained at a relative position determined by active alignment.

In an embodiment, the pre-positioning the first lens component and the second lens component further comprises: forming a first gap and a second gap between the first lens component and the second lens component, wherein the first gap is closer to an outer side of the optical lens than the second gap; and the bonding by the adhesive comprises: applying a first adhesive and a second adhesive to the first gap and the second gap, respectively, wherein an adhesion force of the second adhesive is greater than an adhesion force of the first adhesive; curing the first adhesive so that the first lens component and the second lens component are pre-fixed; and curing the second adhesive so that the first lens component and the second lens component are permanently combined.

In an embodiment, in the step of pre-positioning the first lens component and the second lens component, the first gap formed is located between an end surface of the first lens barrel and an end surface of the second lens barrel; and the second gap formed is located between an end surface of the first lens barrel and a non-optical surface of one lens sheet closest to the first lens barrel among the at least one second lens sheet, or between an end surface of the second lens barrel and a non-optical surface of one lens sheet closest to the second lens barrel among the at least one first lens sheet.

In an embodiment, in the step of bonding by the adhesive, the first adhesive is a UV adhesive or UV thermosetting adhesive, and the second adhesive is a thermosetting adhesive or UV thermosetting adhesive.

According to further another aspect of the present disclosure, there is further provided an assembly method for camera module, comprising: assembling an optical lens using the forgoing assembly method for optical lens; and using the assembled optical lens to manufacture a camera module.

According to further another aspect of the present disclosure, there is further provided an assembly method for camera module, comprising: pre-positioning the first lens component and the second lens component, wherein the camera module component comprises a second lens component and a photosensitive module combined together, the first lens component comprises a first lens barrel and at least one first lens sheet mounted in the first lens barrel, the second lens component comprises a second lens barrel and at least one second lens sheet mounted in the second lens barrel, and the pre-positioning makes the at least one second lens sheet and the at least one first lens sheet together constitute an imageable optical system; adjusting and determining a relative position of the first lens component and the second lens component based on active alignment; and bonding the first lens component and the second lens component by an adhesive, wherein at least a part of the adhesive is interposed between a lens barrel and a lens sheet, and the statement of between a lens barrel and a lens sheet specifically means between the second lens barrel and the first lens sheet, or between the first lens barrel and the second lens sheet.

According to further another aspect of the present disclosure, there is provided an optical lens, comprising: a first lens component comprising at least one first lens sheet; a second lens component comprising a second lens barrel and at least one second lens sheet mounted in the second lens barrel, the at least one second lens sheet and the at least one first lens sheet together constituting an imageable optical system; and an adhesive bonding the first lens component and the second lens component together, at least a part of the adhesive being interposed between one first lens sheet closest to the second lens component among the at least one first lens sheet and one second lens sheet closest to the first lens component among the at least one second lens sheet.

In an embodiment, there is a non-zero included angle between an axis of one first lens sheet closest to the second lens component and an axis of one second lens sheet closest to the first lens component.

In an embodiment, the first lens component further comprises a first lens barrel, and the first lens sheet bears against and is fixed to the first lens barrel.

In an embodiment, a top surface and/or an outer side surface of the first lens sheet bears against the first lens barrel.

In an embodiment, an axis of the first lens barrel coincides with or is parallel to an axis of the second lens barrel.

In an embodiment, the adhesive between the first lens barrel and the second lens barrel has the same thickness in an optical axis direction.

In an embodiment, the first lens component further comprises a first lens barrel, and the at least one first lens sheet is mounted on an inner side of the first lens barrel.

In an embodiment, the adhesive comprises a first adhesive and a second adhesive, the second adhesive is interposed between one first lens sheet closest to the second lens component among the at least one first lens sheet and one second lens sheet closest to the first lens component among the at least one second lens sheet, and an adhesion force provided by the second adhesive is greater than an adhesion force provided by the first adhesive.

In an embodiment, there are a first gap and a second gap between the first lens component and the second lens component, the first adhesive and the second adhesive are applied to the first gap and the second gap, respectively, and the first gap is closer to an outer side of the optical lens than the second gap.

In an embodiment, the first adhesive is an adhesive cured by light.

In an embodiment, the second adhesive is an adhesive cured by heat, by moisture, by anaerobic or oxidative curing.

In an embodiment, the first adhesive is a UV adhesive or UV thermosetting adhesive.

In an embodiment, the second adhesive is a thermosetting adhesive or UV thermosetting adhesive.

In an embodiment, the first adhesive and the second adhesive are of the same material when they are in a liquid state, and the first adhesive and the second adhesive form different materials with different microstructures after curing, so that an adhesion force provided by the second adhesive after curing is greater than an adhesion force provided by the first adhesive after curing.

In an embodiment, the first adhesive and the second adhesive are both UV thermosetting adhesives.

In an embodiment, the first adhesive and the second adhesive do not contact each other.

In an embodiment, a size of the first gap in a direction along an optical axis of the optical lens is 30-100 μm.

In an embodiment, a size of the second gap in a direction along an optical axis of the optical lens is 30-100 μm.

In an embodiment, a difference between sizes of the second gap and the first gap in a direction along an optical axis of the optical lens is smaller than a threshold.

In an embodiment, the first gap is located between an end surface of the first lens barrel and an end surface of the second lens barrel.

In an embodiment, the second gap is located between a non-optical surface of one first lens sheet closest to the second lens component among the at least one first lens sheet and a non-optical surface of one second lens sheet closest to the first lens component among the at least one second lens.

In an embodiment, the non-optical surface of the one first lens sheet closest to the second lens component among the at least one first lens sheet has a roughened surface.

In an embodiment, the non-optical surface of the one second lens sheet closest to the first lens component among the at least one second lens sheet has a roughened surface.

In an embodiment, the adhesive is used to support and fix the first lens component and the second lens component, so that a relative position of the first lens component and the second lens component is maintained at a relative position determined by active alignment.

In an embodiment, the second gap has a second opening facing an optical axis of the optical lens, and a size of the second opening in a direction along the optical axis is greater than an average size of the second gap.

In an embodiment, the first gap has a first opening facing an outer side of the optical lens, and a size of the first opening in a direction along the optical axis is greater than an average size of the first gap.

In an embodiment, the first lens sheet is closer to a front end of the optical lens than the second lens sheet.

In an embodiment, an end surface of the second lens sheet bonded to the first lens sheet has an annular groove, and the annular groove is located between the second gap and an optical surface of the second lens sheet.

In an embodiment, an end surface of the second lens sheet bonded to the first lens sheet has a boss, and the second gap is located between the boss and the first lens sheet.

In an embodiment, an end surface of the first lens sheet bonded to the second lens sheet has a boss, and the second gap is located between the boss and the second lens sheet.

In an embodiment, a cross-sectional shape of the boss is rectangular, trapezoidal, triangular or semicircular.

In an embodiment, an end surface of the second lens sheet bonded to the first lens sheet has a second boss, an end surface of the first lens sheet bonded to the second lens sheet has a first boss, and the second gap is located between the first boss and the second boss.

In an embodiment, an end surface of the second lens sheet bonded to the first lens sheet has an annular barrier, and the annular barrier is located between an optical zone of the second lens sheet and the second gap; and in a direction perpendicular to an optical axis of the optical lens, there is a gap of at least 50 μm between the annular barrier and the boss.

In an embodiment, a non-optical surface of the second lens sheet bonded to the first lens sheet has an inwardly recessed step or groove.

According to further another aspect of the present disclosure, there is further provided a camera module, comprising the foregoing optical lens.

According to further another aspect of the present disclosure, there is further provided an assembly method for optical lens, comprising: pre-positioning the first lens component and the second lens component, wherein the first lens component comprises at least one first lens sheet, the second lens component comprises a second lens barrel and at least one second lens sheet mounted in the second lens barrel, and the pre-positioning makes the at least one second lens sheet and the at least one first lens sheet together constitute an imageable optical system; adjusting and determining a relative position of the first lens component and the second lens component based on active alignment; and bonding the first lens component and the second lens component by an adhesive, wherein at least a part of the adhesive is interposed between the first lens sheet and the second lens sheet.

In an embodiment, the active alignment comprises: picking up the first lens sheet through direct contact with the first lens sheet, and then moving the first lens sheet to adjust and determine a relative position of the first lens sheet and the second lens component.

In an embodiment, the active alignment further comprises: adjusting and determining an included angle between an axis of the first lens sheet and an axis of the second lens sheet according to a measured resolution of the optical system.

In an embodiment, the active alignment further comprises: moving the first lens sheet along a plane, and determining a relative position between the first lens sheet and the second lens component in a direction of movement along the plane according to the measured resolution of the optical system; and the movement along the plane includes translation and/or rotation on the plane.

In an embodiment, the active alignment further comprises: moving the first lens sheet in a direction perpendicular to the plane, and determining a relative position between the first lens sheet and the second lens component in the direction perpendicular to the plane according to the measured resolution of the optical system.

In an embodiment, the bonding by the adhesive comprises: applying the adhesive between the first lens sheet and the second lens sheet, and curing the adhesive between the first lens sheet and the second lens sheet so as to support and fix the first lens sheet and the second lens component, so that a relative position of the first lens sheet and the second lens component is maintained at the relative position determined by active alignment; and the assembly method for optical lens further comprises: after curing the adhesive between the first lens sheet and the second lens sheet, mounting the first lens barrel on the first lens sheet.

In an embodiment, the mounting the first lens barrel on the first lens sheet comprises: making the first lens barrel bear against a top surface and/or an outer side surface of the first lens sheet.

In an embodiment, the mounting the first lens barrel on the first lens sheet further comprises: applying the adhesive between the first lens barrel and the second lens barrel and bonding the first lens barrel and the second lens barrel.

In an embodiment, the mounting the first lens barrel on the first lens sheet further comprises: causing an axis of the first lens barrel to coincide with or be parallel to an axis of the second lens barrel.

In an embodiment, the first lens component further comprises a first lens barrel, and the at least one first lens sheet is mounted on an inner side of the first lens barrel.

In an embodiment, the bonding by the adhesive comprises: using the cured adhesive to support and fix the first lens component and the second lens component, so that a relative position of the first lens component and the second lens component is maintained at a relative position determined by active alignment.

In an embodiment, the pre-positioning the first lens component and the second lens component further comprises: forming a first gap and a second gap between the first lens component and the second lens component, wherein the first gap is closer to an outer side of the optical lens than the second gap; and the bonding by the adhesive comprises: applying a first adhesive and a second adhesive to the first gap and the second gap, respectively, wherein an adhesion force of the second adhesive is greater than an adhesion force of the first adhesive; curing the first adhesive so that the first lens component and the second lens component are pre-fixed; and curing the second adhesive so that the first lens component and the second lens component are permanently combined.

In an embodiment, in the step of pre-positioning the first lens component and the second lens component, the first gap formed is located between an end surface of the first lens barrel and an end surface of the second lens barrel; and the second gap formed is located between one first lens sheet closest to the second lens component among the at least one first lens sheet and one second lens sheet closest to the first lens component among the at least one second lens sheet.

In an embodiment, in the step of bonding by the adhesive, the first adhesive is a light curable adhesive, and the second adhesive is a thermosetting adhesive.

According to further another aspect of the present disclosure, there is further provided an assembly method for camera module, comprising: assembling an optical lens using the foregoing assembly method for optical lens; and using the assembled optical lens to manufacture a camera module.

According to further another aspect of the present disclosure, there is further provided an assembly method for camera module, comprising: pre-positioning the first lens component and the second lens component, wherein the camera module component comprises a second lens component and a photosensitive module combined together, the first lens component comprises a first lens barrel and at least one first lens sheet mounted in the first lens barrel, the second lens component comprises a second lens barrel and at least one second lens sheet mounted in the second lens barrel, and the pre-positioning makes the at least one second lens sheet and the at least one first lens sheet together constitute an imageable optical system; adjusting and determining a relative position of the first lens component and the second lens component based on active alignment; and bonding the first lens component and the second lens component by an adhesive, wherein at least a part of the adhesive is interposed between the first lens sheet and the second lens sheet.

According to further another aspect of the present disclosure, there is provided an optical lens, comprising: a first lens component comprising at least one first lens sheet and a light shielding portion located on top and side surfaces of a non-optical zone of the at least one first lens sheet; a second lens component comprising a second lens barrel and at least one second lens sheet located in the second lens barrel, the at least one first lens sheet and the at least one second lens sheet together constituting an imageable optical system; and an adhesive bonding the first lens component and the second lens component together, the adhesive being interposed between the first lens sheet and the second lens component.

In an embodiment, there is a non-zero included angle between an axis of one first lens sheet closest to the second lens component and an axis of one second lens sheet closest to the first lens component.

In an embodiment, the light shielding portion is a first lens barrel, and the at least one first lens sheet is mounted in the first lens barrel.

In an embodiment, the adhesive is interposed between one first lens sheet closest to the second lens component among the at least one first lens sheet and an end surface of the second lens barrel.

In an embodiment, the adhesive is interposed between a non-optical surface of the one first lens sheet closest to the second lens component and the end surface of the second lens barrel.

In an embodiment, the adhesive comprises a first adhesive and a second adhesive, the second adhesive is interposed between one first lens sheet closest to the second lens component among the at least one first lens sheet and one second lens sheet closest to the first lens component among the at least one second lens sheet, and an adhesion force provided by the second adhesive is greater than an adhesion force provided by the first adhesive.

In an embodiment, there are a first gap and a second gap between the first lens component and the second lens component, the first adhesive and the second adhesive are applied to the first gap and the second gap, respectively, and the first gap is closer to an outer side of the optical lens than the second gap.

In an embodiment, a top surface of the second lens barrel comprises a second flat surface, and both the first gap and the second gap are located between the second flat surface and a bottom surface of a non-optical zone of the first lens sheet.

In an embodiment, the first gap is located between the one first lens sheet closest to the second lens component and an end surface of the second lens barrel; and the second gap is located between the one first lens sheet closest to the second lens component and the one second lens sheet closest to the first lens component.

In an embodiment, a non-optical surface of one first lens sheet closest to the second lens component among the at least one first lens sheet has a roughened surface.

In an embodiment, a non-optical surface of one second lens sheet closest to the first lens component among the at least one second lens sheet has a roughened surface.

In an embodiment, the adhesive is used to support and fix the first lens component and the second lens component, so that a relative position of the first lens component and the second lens component is maintained at a relative position determined by active alignment.

In an embodiment, the first adhesive is an adhesive cured by light.

In an embodiment, the second adhesive is an adhesive cured by heat, by moisture, by anaerobic or oxidative curing.

In an embodiment, the first adhesive is a UV adhesive or UV thermosetting adhesive.

In an embodiment, the second adhesive is a thermosetting adhesive or UV thermosetting adhesive.

In an embodiment, the first adhesive and the second adhesive are of the same material when they are in a liquid state, and the first adhesive and the second adhesive form different materials with different microstructures after curing, so that an adhesion force provided by the second adhesive after curing is greater than an adhesion force provided by the first adhesive after curing.

In an embodiment, the first adhesive and the second adhesive are both UV thermosetting adhesives.

In an embodiment, the first adhesive and the second adhesive do not contact each other.

In an embodiment, a size of the first gap in a direction along an optical axis of the optical lens is 30-100 μm.

In an embodiment, a size of the second gap in a direction along an optical axis of the optical lens is 30-100 μm.

In an embodiment, a difference between sizes of the second gap and the first gap in a direction along an optical axis of the optical lens is smaller than a threshold.

In an embodiment, the second gap has a second opening facing an optical axis of the optical lens, and a size of the second opening in a direction along the optical axis is greater than an average size of the second gap.

In an embodiment, the first gap has a first opening facing an outer side of the optical lens, and a size of the first opening in a direction along the optical axis is greater than an average size of the first gap.

In an embodiment, the first lens sheet is closer to a front end of the optical lens than the second lens sheet.

In an embodiment, the one first lens sheet closest to the second lens component has a first boss protruding toward the second lens component, and the second gap is located between the first boss and a non-optical surface of the one second lens sheet closest to the first lens component.

In an embodiment, a non-optical surface of the one second lens sheet closest to the first lens component has a first groove, and the second gap is located between the first boss and the first groove.

In an embodiment, the first boss is annular in a bottom view, and the first groove is annular in a top view.

In an embodiment, the one first lens sheet closest to the second lens component has a plurality of first bosses protruding toward the second lens component, and in a bottom view, the plurality of first bosses are distributed on one circle; and an end surface of the second lens component has a plurality of first grooves for accommodating the plurality of first bosses, the second gap being located between the plurality of first bosses and the plurality of first grooves.

In an embodiment, side walls of the plurality of first grooves are formed by the second lens barrel, and bottom surfaces of the plurality of first grooves are formed by non-optical surface of the one second lens closest to the first lens component.

In an embodiment, an end surface of the second lens barrel has a second boss protruding toward the first lens component, and a non-optical surface of the one first lens sheet closest to the second lens component has a second groove, the second gap being located between the second boss and the second groove.

According to further another aspect of the present disclosure, there is further provided a camera module, comprising the foregoing optical lens.

According to further another aspect of the present disclosure, there is further provided an assembly method for optical lens, comprising: pre-positioning the first lens component and the second lens component, wherein the first lens component comprises at least one first lens sheet, when there are a plurality of first lens sheets, these first lens sheets are fitted with each other to maintain at a fixed position relative to each other; the second lens component comprises a second lens barrel and at least one second lens sheet located in the second lens barrel; and the pre-positioning makes the at least one second lens sheet and the at least one first lens sheet together constitute an imageable optical system; adjusting and determining a relative position of the first lens component and the second lens component based on active alignment; and bonding the first lens component and the second lens component by an adhesive, wherein the adhesive is interposed between the first lens sheet and the second lens component.

In an embodiment, the active alignment comprises: picking up and moving the first lens sheet to adjust and determine a relative position of the first lens sheet and the second lens component.

In an embodiment, the active alignment further comprises: adjusting and determining an included angle between an axis of the first lens sheet and an axis of the second lens sheet according to a measured resolution of the optical system.

In an embodiment, the active alignment further comprises: moving the first lens sheet along a plane, and determining a relative position between the first lens sheet and the second lens component in a direction of movement along the plane according to the measured resolution of the optical system; and the movement along the plane includes translation and/or rotation on the plane.

In an embodiment, the active alignment further comprises: moving the first lens sheet in a direction perpendicular to the plane, and determining a relative position between the first lens sheet and the second lens component in the direction perpendicular to the plane according to the measured resolution of the optical system.

In an embodiment, the bonding by the adhesive comprises: using the cured adhesive to support the at least one first lens sheet and the second lens component, so that a relative position of the first lens component and the second lens component is maintained at a relative position determined by active alignment.

In an embodiment, the pre-positioning the first lens component and the second lens component further comprises: forming a first gap and a second gap between the first lens component and the second lens component, wherein the first gap is closer to an outer side of the optical lens than the second gap; and the bonding by the adhesive comprises: applying a first adhesive and a second adhesive to the first gap and the second gap, respectively, wherein an adhesion force of the second adhesive is greater than an adhesion force of the first adhesive; curing the first adhesive so that the first lens component and the second lens component are pre-fixed; and curing the second adhesive so that the first lens component and the second lens component are permanently combined.

In an embodiment, in the step of pre-positioning the first lens component and the second lens component, the first gap formed is located between a non-optical surface of one first lens sheet closest to the second lens component among the at least one first lens sheet and an end surface of the second lens barrel; and the second gap formed is located between the one first lens sheet closest to the second lens component and one second lens sheet closest to the first lens component among the at least one second lens sheet.

In an embodiment, in the step of bonding by the adhesive, the first adhesive is a UV adhesive or UV thermosetting adhesive, and the second adhesive is a thermosetting adhesive or UV thermosetting adhesive.

According to further another aspect of the present disclosure, there is further provided an assembly method for camera module, comprising: assembling an optical lens using the foregoing assembly method for optical lens; and using the assembled optical lens to manufacture a camera module.

According to further another aspect of the present disclosure, there is further provided an assembly method for camera module, comprising: pre-positioning the first lens component and the second lens component, wherein the camera module component comprises a second lens component and a photosensitive module combined together, the first lens component comprises at least one first lens sheet, when there are a plurality of first lens sheets, these first lens sheets are fitted with each other to maintain at a fixed position relative to each other, the second lens component comprises a second lens barrel and at least one second lens sheet located in the second lens barrel, and the pre-positioning makes the at least one second lens sheet and the at least one first lens sheet together constitute an imageable optical system; adjusting and determining a relative position of the first lens component and the second lens component based on active alignment; and bonding the first lens component and the second lens component by an adhesive, wherein the adhesive is interposed between the first lens sheet and the second lens component.

Compared with the prior art, the present disclosure has at least one of the following technical effects:

1. In the present disclosure, the position shift of the lens sheet caused by the deformation of the lens barrel can be reduced, and especially the influence caused by the deformation of the lens barrel directly bonded to the lens sheet can be reduced.

2. In the present disclosure, the lens sheets of the upper and lower lens components can be used to be directly connected to the lens barrel and provide the main adhesion force, thereby reducing the influence of the variation of the lens barrel in the lens components on the lens sheets.

3. In the present disclosure, increasing the roughness of the ineffective region of the lens sheet, and directly connecting it to the lens barrel by the adhesive, can be used to enhance the connection strength of the upper and lower lens components.

4. In the present disclosure, directing bonding the lens sheets of the upper and lower lens components can be used to provide the main adhesion force, thereby reducing the influence of the variation of the lens barrel in the lens components on the lens sheets.

5. In the present disclosure, the weather resistance of the optical lens or camera module can be improved. For example, the way the lens sheet is connected to the lens sheet can enhance the weather resistance when the lens barrel is made of plastic. For example, in the weather resistance and optical imaging quality experiments of camera modules and optical lenses, high temperature and high humidity are used as test standards, and after they pass through a high temperature and high humidity environment, the difference in optical image quality is relatively low.

6. In the present disclosure, the optical zone of the lens sheet being contaminated by glue overflow can be avoided.

7. In the present disclosure, the adhesion force between the lens sheets can be increased while achieving the direct bonding of the lens sheets of the upper and lower lens components.

8. In the present disclosure, the lens sheet of the upper lens component can be used to be directly bonded to the lower lens component so as to provide a full adhesion force, thereby avoiding the influence of the variation of the lens barrel in the lens component on the lens sheet.

9. In the present disclosure, the lens sheet of the upper lens component can be directly connected to the lower lens component, thereby reducing the manufacturing tolerance of the optical lens or camera module caused by the assembly tolerance between the lens sheet of the upper lens component and the lens barrel.

10. In the present disclosure, the lens sheet of the upper lens component can be directly connected to the lower lens component, thereby reducing the variation of the upper lens component caused by thermal expansion coefficients of the lens barrel and the lens sheet.

11. The present disclosure can improve the stability of the optical system and improve the imaging quality of the camera module.

12. The present disclosure is helpful to improve the yield of optical lenses or camera modules manufactured based on active alignment.

13. The present disclosure can provide a camera module and optical lens with better imaging quality.

BRIEF DESCRIPTION OF THE DRAWINGS

The exemplary embodiments are shown in the reference drawings. The embodiments and drawings disclosed herein are to be considered illustrative and not restrictive.

FIG. 21d shows an enlarged schematic view of a partial region in FIG. 21a;

FIG. 21g shows an enlarged schematic view of a partial region where a glue dispensing position of an adhesive between a first lens barrel and a second lens barrel is added on the basis of FIG. 21f;

FIG. 22a shows a relative position adjustment manner in active alignment in an embodiment of the present disclosure;

FIG. 22b shows rotation adjustment in active alignment according to another embodiment of the present disclosure;

FIG. 22c shows a relative position adjustment manner in which adjustments in v and w directions are added in active alignment according to still another embodiment of the present disclosure;

FIG. 36c shows an enlarged schematic view of a partial region in FIG. 36a;

DETAILED DESCRIPTION

Figure 1:
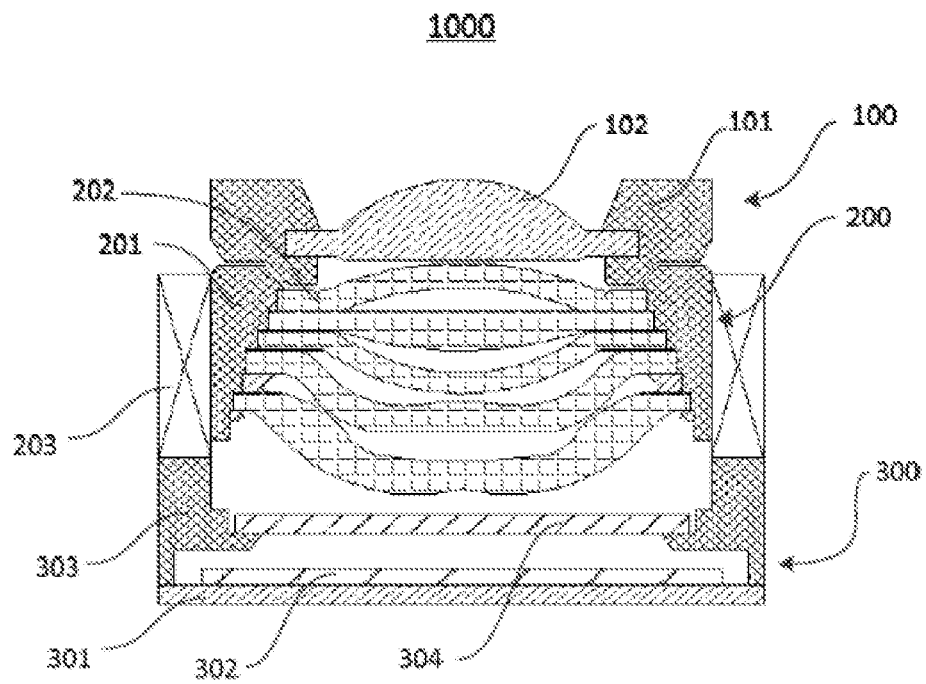
FIG. 1 shows a schematic cross-sectional view of a camera module 1000 according to an embodiment of the present disclosure.

In order to better understand the present application, various aspects of the present application will be described in more detail with reference to the drawings. It should be understood that the detailed description is merely description of exemplary embodiments of the present application, and does not limit the scope of the present application in any way. Throughout the description, the same reference numerals refer to the same elements. The expression "and/or" includes any and all combinations of one or more of the associated listed items.

It should be noted that in the present description, the expressions of "first", "second", etc. are only used to distinguish one feature from another feature, and do not indicate any limitation on the feature. Therefore, without departing from the teachings of the present application, a first main body discussed below may also be referred to as a second main body.

In the drawings, for convenience of explanation, the thickness, size, and shape of the object have been slightly exaggerated. The drawings are only examples and are not drawn to scale.

It should also be understood that the terms "comprising", "comprise", "having", "including" and/or "include" when used in the present description, indicate the existence of stated features, integers, steps, operations, elements and/or components, but does not exclude the presence or addition of one or more other features, integers, steps, operations, elements, components and/or combinations thereof. Furthermore, when an expression such as "at least one of" appears after a list of listed features, it modifies the entire list of features, rather than the individual elements in the list. In addition, when describing the implementations of the present application, the use of "may" means "one or more implementations of the present application", and, the term "exemplary" refers to an example or illustration.

As used herein, the terms "substantially", "approximately" and similar terms are used as a term expressing an approximation and not as a term expressing an extent, and are intended to indicate an inherent deviation in a measurement value or calculated value, which will be recognized by those of ordinary skill in the art.

Unless otherwise defined, all terms (including technical and scientific terms) used herein have the same meanings as commonly understood by those of ordinary skill in the art to which the present application belongs. It should also be understood that the terms (e.g. those defined in commonly used dictionaries) should be interpreted to have meanings consistent with their meaning in the context of the relevant art and will not be interpreted in an idealized or overly formal sense unless it is clearly defined herein.

It needs to be explained that, in the case of no conflict, the embodiments in the present application and the features in the embodiments can be combined with each other. The present application will be described in detail below in conjunction with embodiments with reference to the drawings.

FIG. 1 shows a schematic cross-sectional view of a camera module 1000 according to an embodiment of the present disclosure. The camera module 1000 includes an optical lens and a photosensitive assembly 300. The optical lens includes a first lens component 100, a second lens component 200, and an adhesive (not shown in the figure) for bonding the first lens component 100 and the second lens component 200 together. The first lens component 100 includes a first lens barrel 101 and one first lens sheet 102, and the second lens component 200 includes a second lens barrel 201 and five second lens sheets 202. In this embodiment, the second lens sheet 202 closest to the first lens component 100 is directly bonded to the first lens barrel 101. In this embodiment, the second lens component 200 may further include a motor 203, and the second lens barrel 202 may be mounted in a carrier of the motor 203. The photosensitive assembly 300 includes a circuit board 301, a photosensitive chip 302 mounted on the circuit board 301, a cylindrical support 303 mounted on the circuit board 301 and surrounding the photosensitive chip, and a color filter 304 mounted on the cylindrical support 303. The motor 203 is mounted on a top surface of the cylindrical support 303 so as to fix the second lens component 200 and the photosensitive assembly 300 together. It needs to be noted that in other embodiments of the present disclosure, the motor 203 in FIG. 1 may also be replaced by another structure such as a cylindrical support, or the motor 203 in FIG. 1 may also be cancelled and the second lens barrel 201 is directly mounted on the top surface of the cylindrical support 303. It needs to be noted that in other embodiments, the motor 203 may also be replaced by another type of optical actuator, such as an SMA (shape memory alloy) actuator, an MEMS actuator or the like. The optical actuator refers to a device used to urge the optical lens to move relative to the photosensitive chip.

Figure 2:
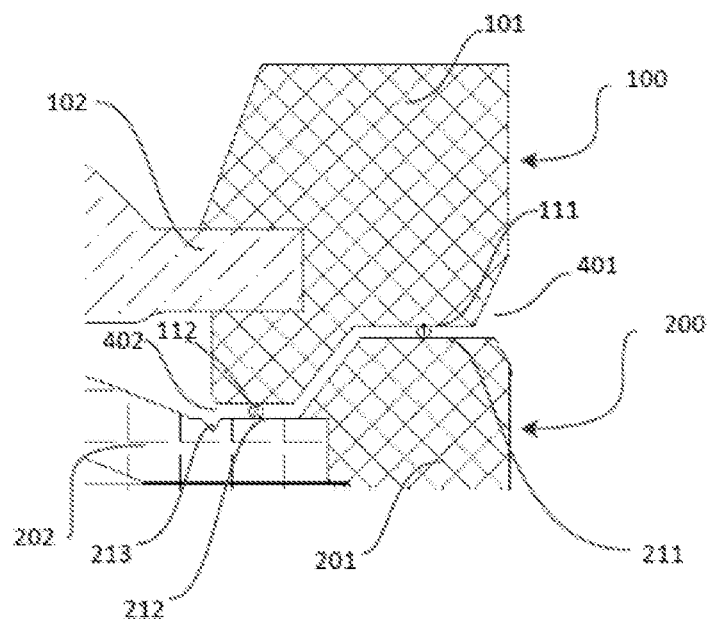
FIG. 2 shows a partially enlarged schematic cross-sectional view of a bonding region of a first lens component 100 and a second lens component 200 in an embodiment of the present disclosure.

Further, FIG. 2 shows a partially enlarged schematic cross-sectional view of a bonding region of a first lens component 100 and a second lens component 200 in an embodiment of the present disclosure. Referring to FIG. 2, in this embodiment, there is a first gap and a second gap between the first lens component 100 and the second lens component 200. In FIG. 2, "①" and "②" are used to mark the positions of the first gap and the second gap, respectively. The adhesive includes a first adhesive and a second adhesive, wherein the first adhesive and the second adhesive are applied to the first gap and the second gap, respectively, and the first gap is closer to an outer side of the optical lens than the second gap (that is, the second gap is closer to an optical axis of the optical lens than the first gap). Moreover, the second adhesive is interposed between the lens barrel and the lens sheet, and the adhesion force provided by the second adhesive is greater than the adhesion force provided by the first adhesive. Referring to FIG. 2, the first gap is located between an end surface 111 of the first lens barrel 100 and an end surface 211 of the second lens barrel 200. The second gap is located between an end surface 112 of the first lens barrel 100 and a non-optical surface 212 of one second lens sheet 202 closest to the first lens barrel 100. A non-optical surface of one lens sheet is a surface of a part of the lens sheet that does not participate in optical imaging. A part of the lens sheet that does not participate in optical imaging may be referred to as a non-optical zone, sometimes also referred to as an ineffective zone. In this embodiment, the non-optical zone of the lens sheet can play a supporting function. In this embodiment, the adhesive (including the first adhesive and the second adhesive) is used to support the first lens component 100 and the second lens component 200, so that a relative position of the first lens component 100 and the second lens component 200 is maintained at a relative position determined by active alignment. The first adhesive can be used for pre-fixing, and the second adhesive can be used for permanent fixing. In an embodiment, the first adhesive is a UV adhesive, and the UV adhesive can be cured by exposure. The second adhesive is a thermosetting adhesive, and thermosetting adhesive can be cured by baking the lens or module. In this embodiment, a surface of the non-optical surface 212 of the second lens sheet 202 applied with the second adhesive may be roughened to increase its roughness, thereby increasing the adhesion force between the second adhesive and the surface of the non-optical surface 212.

In the above embodiment, the second lens sheet 202 is directly bonded to the end surface 112 of the first lens barrel 101 through the second adhesive (e.g. thermosetting adhesive), which avoids changes in the position and shape of the second lensسheet 202 due to the deformation of the lens barrel 201 in the curing process of the second adhesive, thereby improving the imaging quality of the optical lens and camera module.

Further, still referring to FIG. 2, in an embodiment, the second gap has a second opening 402 facing the optical axis of the optical lens, and a size of the second opening 402 in a direction along the optical axis is larger than an average size of the second gap. That is to say, a larger opening is provided between the first lens component 100 and the second lens component 200 on a side close to the optical axis. This can avoid poor imaging due to the effective region (i.e. optical zone) of the lens sheet being contaminated by glue overflow. Further, the surface of the non-optical zone of the second lens sheet 202 may further have a groove 213, and the groove 213 is annular in a top view. The groove 213 can be used to store excess glue to prevent the glue from contaminating the lens sheet. Further, the first gap has a first opening 401 facing the outer side of the optical lens, and the size of the first opening 401 in the direction along the optical axis is larger than the average size of the first gap. That is to say, a larger opening is also provided between the first lens component 100 and the second lens component 200 on a side close to the outside. In an embodiment, the first lens sheet 102 is closer to a front end of the optical lens than the second lens sheet 202 (the front end of the optical lens refers to a light incident end, and a rear end refers to an end close to the photosensitive assembly).

In the above embodiments, a UV thermosetting adhesive may also be used for the first adhesive. A UV thermosetting adhesive may also be used for the second adhesive.

Figure 3:
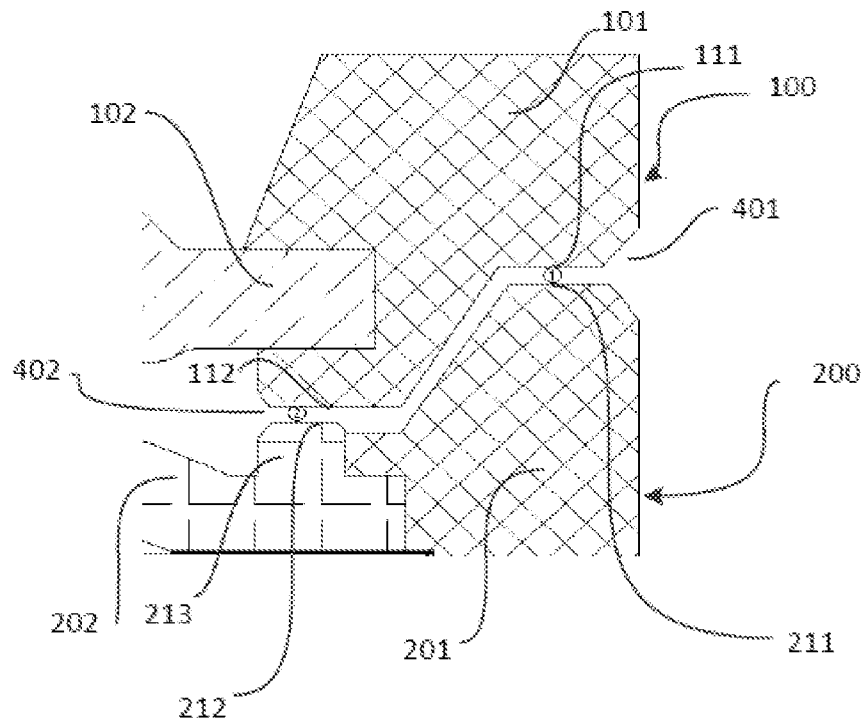
FIG. 3 shows a partially enlarged schematic cross-sectional view of a bonding region of a first lens component 100 and a second lens component 200 in another embodiment of the present disclosure.

Further, FIG. 3 shows a partially enlarged schematic cross-sectional view of a bonding region of a first lens component 100 and a second lens component 200 in another embodiment of the present disclosure. Referring to FIG. 3, in this embodiment, an end surface 212 of the second lens sheet 202 bonded to the first lens barrel 101 has a boss 213. The second gap is located between the boss 213 and an end surface 112 of the first lens barrel 101. In this embodiment, the boss 213 is used to replace the groove design in the embodiment of FIG. 2, which can better prevent glue overflow from contaminating the lens sheet. The cross-sectional shape of the boss 213 includes, but is not limited to, trapezoidal, rectangular and other shapes.

Figure 4:
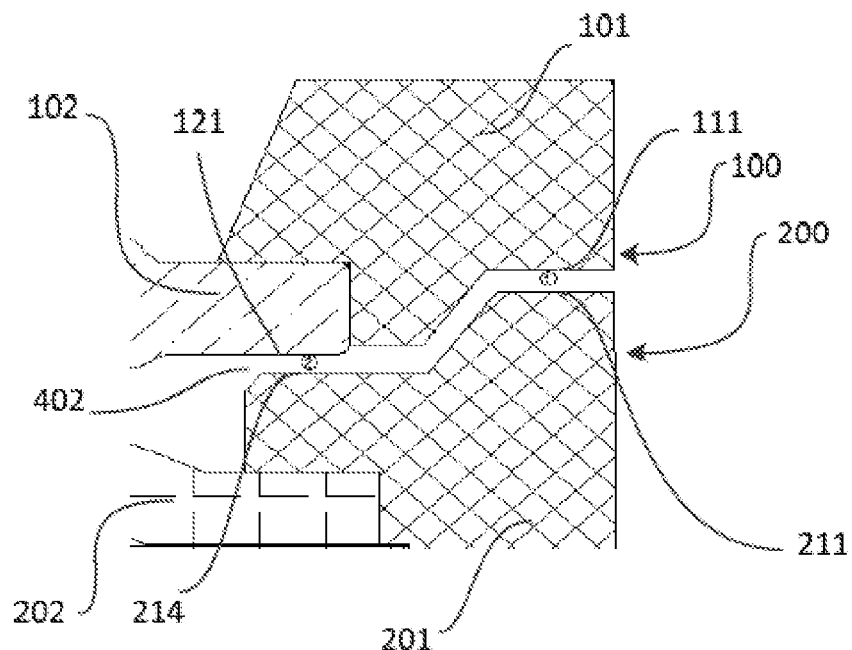
FIG. 4 shows a partially enlarged schematic cross-sectional view of a bonding region of a first lens component 100 and a second lens component 200 in still another embodiment of the present disclosure.

FIG. 4 shows a partially enlarged schematic cross-sectional view of a bonding region of a first lens component 100 and a second lens component 200 in still another embodiment of the present disclosure. This embodiment is different from the embodiment in FIG. 2 in that a non-optical surface 121 of the first lens sheet 102 is directly bonded to an end surface of the second lens barrel 201. Referring to FIG. 4, the first gap is located between an end surface 211 of the second lens barrel 201 and an end surface 111 of the first lens barrel 101. The second gap is located between an end surface 214 of the second lens barrel 201 and a non-optical surface 121 of the first lens sheet 102. The first gap is applied with a first adhesive (e.g. a UV adhesive or UV thermosetting adhesive), and the second gap is applied with a second adhesive (e.g. thermosetting adhesive or UV thermosetting adhesive). The second gap has a second opening 402 facing an optical axis of the optical lens, and a size of the second opening 402 in a direction along the optical axis is larger than an average size of the second gap. That is to say, a larger opening is provided between the first lens component 100 and the second lens component 200 on a side close to the optical axis. This can avoid poor imaging due to the effective region (i.e. optical zone) of the lens sheet being contaminated by glue overflow.

Figure 5:
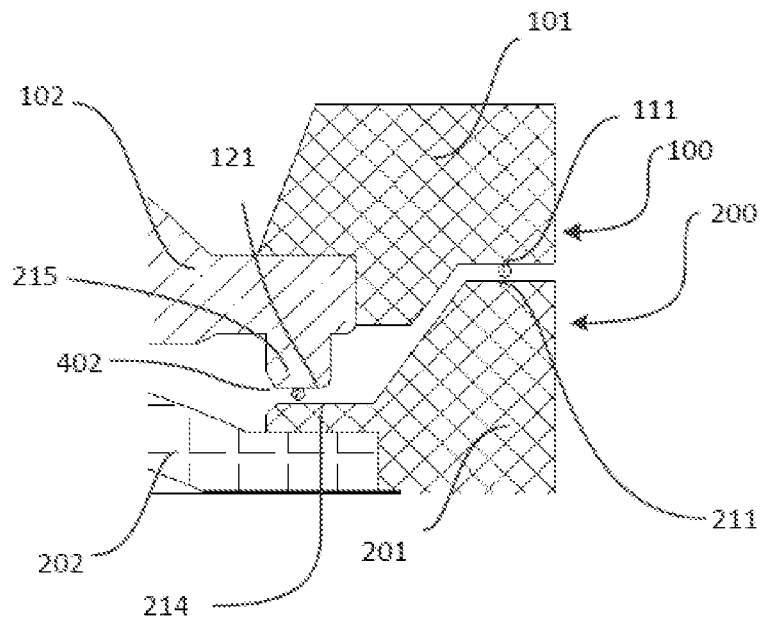
FIG. 5 shows a partially enlarged schematic cross-sectional view of a bonding region of a first lens component 100 and a second lens component 200 in further another embodiment of the present disclosure.

Further, FIG. 5 shows a partially enlarged schematic cross-sectional view of a bonding region of a first lens component 100 and a second lens component 200 in further another embodiment of the present disclosure. Compared with the embodiment of FIG. 4, a boss 215 facing the second lens barrel 201 is added to the first lens sheet 102 of this embodiment. Specifically, in this embodiment, an end surface 121 of the first lens sheet 102 bonded to the second lens barrel 201 has a boss 215. The second gap is located between the boss 215 and an end surface 214 of the second lens barrel 201. The adhesive applied to the boss 215 in this way can be drained to both sides of the boss when it overflows, which can thus avoid the effective region of the lens sheet being contaminated by glue. The cross-sectional shape of the boss 215 includes, but is not limited to, trapezoidal, rectangular and other shapes.

Figure 9:
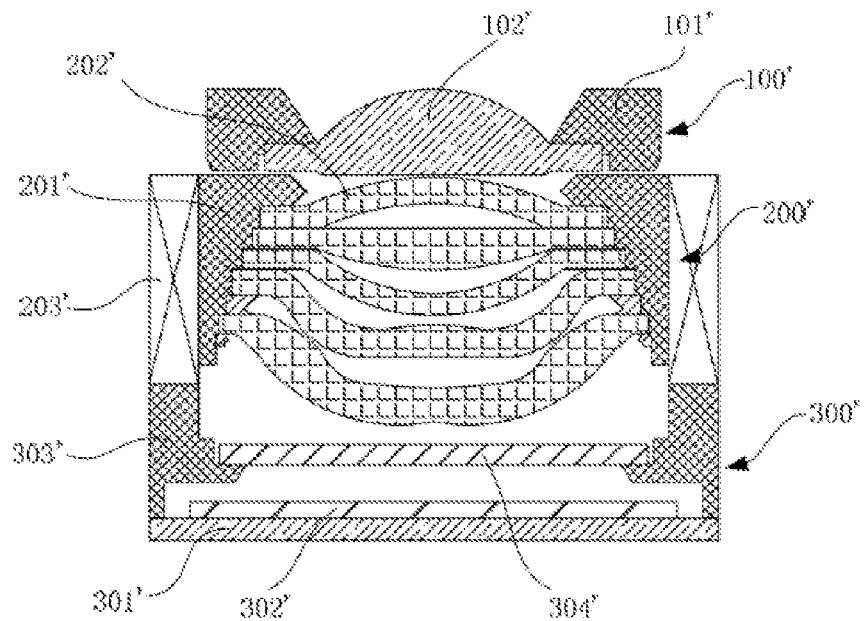
FIG. 9 shows a schematic cross-sectional view of a camera module 1000' according to another embodiment of the present disclosure.
Figure 10:
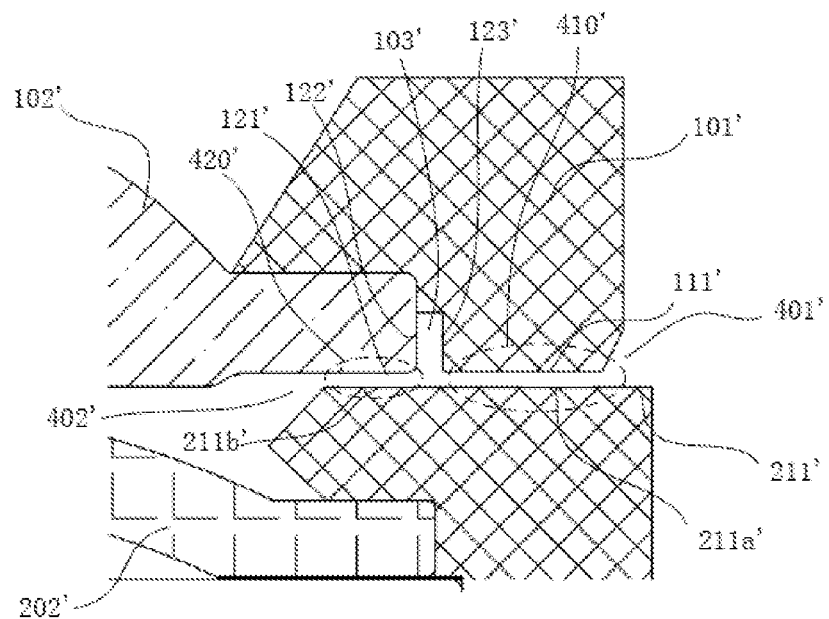
FIG. 10 shows a partially enlarged schematic cross-sectional view of a bonding region of a first lens component 100' and a second lens component 200' in the embodiment as shown in FIG. 9.

Further, FIG. 9 shows a schematic cross-sectional view of a camera module 1000' according to another embodiment of the present disclosure. The camera module 1000' includes an optical lens and a photosensitive assembly 300'. The optical lens includes a first lens component 100', a second lens component 200', and an adhesive (not shown in FIG. 9) for bonding the first lens component 100' and the second lens component 200' together. The first lens component 100' includes a first lens barrel 101' and one first lens sheet 102', and the second lens component 200' includes a second lens barrel 201' and five second lens sheets 202'. Further, FIG. 10 shows a partially enlarged schematic cross-sectional view of the bonding region of the first lens component 100' and the second lens component 200' in the embodiment as shown in FIG. 9. In this embodiment, an end surface (e.g. a top surface) of the second lens barrel 201' includes a flat surface 211', and the flat surface 211' includes a first segment 211a' and a second segment 211b'. The first segment 211a' is closer to an outer side of the optical lens than the second segment 211b' (that is, the second segment 211b' is closer to the optical axis of the optical lens than the first segment 211a'). A first gap 410' is formed between an end surface 111' (for example, it may be a bottom surface) of the first lens barrel and the first segment 211a'. A second gap 420' is formed between an end surface 121' of a non-optical zone of the first lens sheet 102' (for example, it may be a bottom surface of the non-optical zone) and the second segment 211b'. The adhesive includes a first adhesive and a second adhesive. Moreover, the arrangement position and material of the first adhesive and the second adhesive are suitable for making the first adhesive and the second adhesive to be cured successively at different times. In this embodiment, the first adhesive and the second adhesive are applied to the first gap and the second gap, respectively, and an adhesion force provided by the second adhesive is greater than an adhesion force provided by the first adhesive. On the one hand, since the second adhesive is located inside and directly bonded to the lens sheet, it can directly give the lens sheet connection strength, thereby increasing the structural strength of the optical lens. On the other hand, the second adhesive provides a greater adhesion force between the lens barrel and the lens sheet, which can improve the reliability of the optical lens.

In an embodiment, the first adhesive may be a UV adhesive. The second adhesive may be a thermosetting adhesive. The UV adhesive is applied to the first gap, and thermosetting adhesive is applied to the second gap. The UV adhesive is cured by direct irradiation of light to pre-fix the first lens component and the second lens component according to a relative position determined by active alignment. Then, the pre-fixed optical lens is heated to cure thermosetting adhesive at the second gap, thereby enhancing the structural strength of the optical lens and improving the reliability of the optical lens.

It needs to be noted that in other embodiments, the first adhesive may also be another adhesive cured by light (for example, it may be a UV thermosetting adhesive). The second adhesive may also be another adhesive cured by heat, by moisture, by anaerobic or oxidative curing.

In another embodiment, the first adhesive and the second adhesive may be of the same material when they are in a liquid state. For example, UV thermosetting adhesives may be used for both of the first adhesive and the second adhesive. However, the UV thermosetting adhesives located in the first gap and the second gap are each cured in a different way (for example, the UV thermosetting adhesive in the first gap may be directly irradiated with light to complete the light curing, and then the UV thermosetting adhesive in the second gap is cured by heat), so as to form different materials with different microstructures after curing, so that the adhesion force provided by the second adhesive after curing is greater than the adhesion force provided by the first adhesive after curing. The microstructure may be, for example, a molecular structure, a physical form in micrometers, a molecular ratio, a lattice form, or the like.

Further, in an embodiment, the first adhesive and the second adhesive may not be in contact with each other so as to avoid the generation of chemical changes after the first adhesive and the second adhesive are mixed and the influence on the characteristics of glue. Since the generation of chemical changes after the first adhesive and the second adhesive are mixed is avoided, this embodiment can further enhance the reliability of the optical lens or camera module.

Further, in an embodiment, a size of the first gap in a direction along the optical axis of the optical lens is 30-100 μm.

Further, in an embodiment, a size of the second gap in the direction along the optical axis of the optical lens is 30-100 μm.

Further, when the first adhesive and the second adhesive are of the same material when they are in a liquid state (that is, when not cured), a difference of the sizes of the second gap and the first gap in the direction along the optical axis of the optical lens is less than a threshold (the threshold may be smaller than 100 μm).

Further, still referring to FIG. 10, in an embodiment, in the first lens component 100', there is a third gap 103' between an outer side surface 122' of the first lens sheet 102' and an inner side surface 123' of the first lens barrel 101', and the first lens sheet 102' and the first lens barrel 101' can be fixed to each other by a third adhesive filled in the third gap, thereby forming an integral first lens component 100'.

Further, still referring to FIG. 10, in an embodiment, the first gap 410' has a first opening 401' facing the outer side of the optical lens, and a size of the first opening 401' in the direction along the optical axis is larger than an average size of the first gap 410'. The second gap 420' has a second opening 402' facing the optical axis of the optical lens, and a size of the second opening 402' in the direction along the optical axis is larger than an average size of the second gap.

Further, still referring to FIG. 9, in an embodiment, the second lens component 200' may further include a motor 203', and the second lens barrel 202' may be mounted in a carrier of the motor 203'. The photosensitive assembly 300' includes a circuit board 301', a photosensitive chip 302' mounted on the circuit board 301', a cylindrical support 303' mounted on the circuit board 301' and surrounding the photosensitive chip, and a color filter 304' mounted on the cylindrical support 303'. The motor 203' is mounted on a top surface of the cylindrical support 303' to fix the second lens component 200' and the photosensitive assembly 300' together. It needs to be noted that in other embodiments of the present disclosure, the motor 203' in FIG. 9 may also be replaced by another structure such as a cylindrical support, or the motor 203' in FIG. 9 may also be cancelled and the second lens barrel 201' is directly mounted on the top surface of the cylindrical support 303'. It needs to be noted that in other embodiments, the motor 203' may also be replaced by another type of optical actuator, such as an SMA (shape memory alloy) actuator. The optical actuator refers to a device used to urge the optical lens to move relative to the photosensitive chip.

It needs to be noted that in the above embodiment, the number of lens sheets of the first lens component and the second lens component can be adjusted as needed. For example, the number of lens sheets of the first lens component and the second lens component may be two and four, respectively, or may be three and three, respectively, or may be four and two, respectively, or may be five and one, respectively. The total number of lens sheets of the entire optical lens can also be adjusted as needed. For example, the total number of lens sheets of the optical lens can be six, or may be five or seven.

It also needs to be noted that in the optical lens of the present application, the lens components are not limited to two. For example, the number of lens components may also be a number of greater than two, such as three or four. When there are more than two lens components constituting the optical lens, two adjacent lens components may be regarded as the first lens component mentioned previously and the second lens component mentioned previously, respectively. For example, when the number of lens components of the optical lens is three, the optical lens may include two first lens components and one second lens component located between the two first lens components, and all first lens sheets of the two first lens components and all second lens sheets of the one second lens component together constitute an imageable optical system for active alignment. When the number of lens components of the optical lens is four, the optical lens may include two first lens components and two second lens components, and they are arranged from top to bottom in an order of a first lens component, a second lens component, a first lens component, and a second lens component, and all first lens sheets of the two first lens components and all second lens sheets of the two second lens components together constitute an imageable optical system for active alignment. Other variations like this will not be repeated herein.

Figure 6:
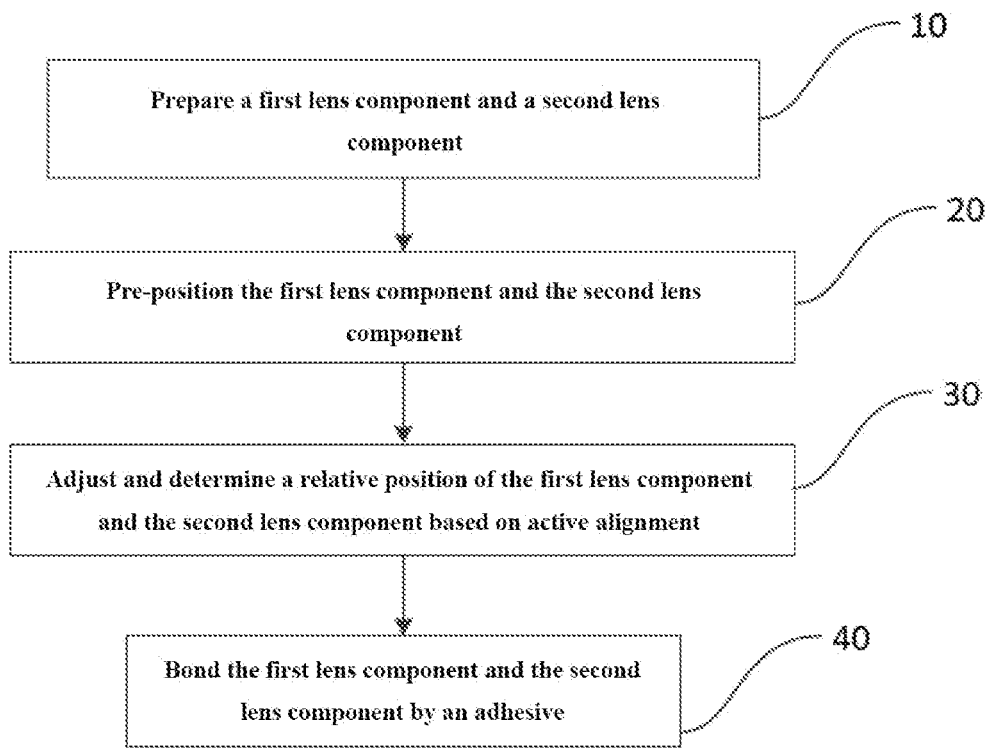
FIG. 6 shows a flowchart of an assembly method for optical lens in an embodiment of the present disclosure.

Further, FIG. 6 shows a flowchart of an assembly method for optical lens in an embodiment of the present disclosure. Referring to FIG. 6, the method comprises:

Step 10, prepare a first lens component and a second lens component, wherein the first lens component includes a first lens barrel and at least one first lens sheet mounted in the first lens barrel, and the second lens component includes a second lens barrel and at least one second lens sheet mounted in the second lens barrel.

Step 20, pre-position the first lens component and the second lens component, so that the at least one second lens sheet and the at least one first lens sheet together constitute an imageable optical system.

Step 30, adjust and determine a relative position of the first lens component and the second lens component based on active alignment.

Step 40, bond the first lens component and the second lens component by an adhesive, wherein at least a part of the adhesive is interposed between a lens barrel and a lens sheet, and the statement of between a lens barrel and a lens sheet specifically means between the second lens barrel and the first lens sheet, or between the first lens barrel and the second lens sheet. In this step, the cured adhesive is used to support the first lens component and the second lens component, so that the relative position of the first lens component and the second lens component is maintained at a relative position determined by the active alignment.

Further, in an embodiment, before step 30 is performed, the adhesive may be applied on the gap between the first lens component and the second lens component, and then step 30 is performed to adjust and determine the relative position of the first lens component and the second lens component. After determining the relative position, step 40 is performed to cure the adhesive, so that the cured adhesive is used to support the first lens component and the second lens component, and thus the relative position of the first lens component and the second lens component is maintained at the relative position determined by the active alignment. In another embodiment, step 30 may be performed first so as to adjust and determine the relative position of the first lens component and the second lens component. After determining the relative position, the first lens component (or second lens component) is temporarily moved away, then the adhesive is applied, and thereafter, the first lens component (or second lens component) is moved back based on the determined relative position. Finally, the adhesive is cured so that the relative position of the first lens component and the second lens component is maintained at the relative position determined by the active alignment.

Further, in an embodiment, in the step 30, a first gap and a second gap are formed between the first lens component and the second lens component, wherein the first gap is closer to the outer side of the optical lens than the second gap.

Figure 7:
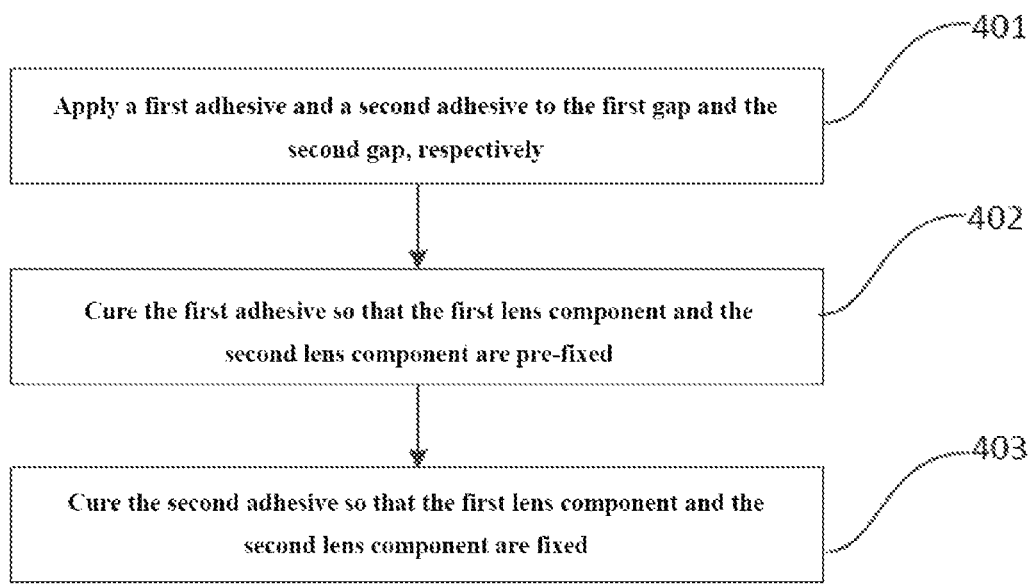
FIG. 7 shows a flowchart of step 40 in an embodiment of the present disclosure.

Further, FIG. 7 shows a flowchart of step 40 in an embodiment of the present disclosure. Referring to FIG. 7, the step 40 comprises the following sub-steps:

Step 401, apply a first adhesive and a second adhesive to the first gap and the second gap, respectively, wherein an adhesion force of the second adhesive is greater than an adhesion force of the first adhesive.

Step 402, cure the first adhesive so that the first lens component and the second lens component are pre-fixed.

Step 403, after the pre-fixing is completed, cure the second adhesive so that the first lens component and the second lens component are permanently combined. The first adhesive may be a UV adhesive, and the second adhesive may be a thermosetting adhesive.

In step 402, when the first lens barrel and the second lens are bonded by using the first adhesive, the curing deformation of the adhesive has a small action force on the lens barrel, and thus it will not cause undesired deformation of the lens barrel. Moreover, in the active alignment stage, the first lens component and/or the second lens component are usually picked up (e.g. clamped or adsorbed) by an external pickup mechanism so as to adjust the relative position of the first lens component and the second lens component. The pre-fixing can cause the relative position between the first lens component and the second lens component to be still maintained at the relative position determined by the active alignment after being detached from the external pickup mechanism. That is to say, after the first adhesive is cured, it provides support for the first lens component and the second lens component so that the two are maintained in the relative position determined by the active alignment. In step 403, since the lens sheet is directly bonded to an end surface of a corresponding lens barrel, the position change of the lens sheet caused by the deformation of the lens barrel can be avoided, thereby ensuring that a permanent relative position between the first lens component and the second lens component formed after curing is consistent with the relative position between the first lens component and the second lens component determined by the active alignment.

It needs to be noted that in other embodiments, the first adhesive may also be another adhesive cured by light (for example, it may be a UV thermosetting adhesive). The second adhesive may also be another adhesive cured by heat, by moisture, by anaerobic or oxidative curing.

In another embodiment, the first adhesive and the second adhesive may be of the same material when they are in a liquid state. For example, UV thermosetting adhesives may be used for both of the first adhesive and the second adhesive. However, the UV thermosetting adhesives located in the first gap and the second gap are each cured in a different way (for example, the UV thermosetting adhesive in the first gap may be directly irradiated with light to complete the light curing, and then the UV thermosetting adhesive in the second gap is cured by heat), so as to form different materials with different microstructures after curing, so that the adhesion force provided by the second adhesive after curing is greater than the adhesion force provided by the first adhesive after curing. The microstructure may be, for example, a molecular structure, a physical form in micrometers, a molecular ratio, a lattice form, or the like.

Further, in an embodiment, the first adhesive and the second adhesive may not be in contact with each other so as to avoid the generation of chemical changes after the first adhesive and the second adhesive are mixed and the influence on the characteristics of glue. Since the generation of chemical changes after the first adhesive and the second adhesive are mixed is avoided, this embodiment can further enhance the reliability of the optical lens or camera module.

Further, in an embodiment, the size of the first gap in the direction along the optical axis of the optical lens is 30-100 μm.

Further, in an embodiment, the size of the second gap in the direction along the optical axis of the optical lens is 30-100 μm.

Further, when the first adhesive and the second adhesive are of the same material when they are in a liquid state (that is, when not cured), the difference of the sizes of the second gap and the first gap in the direction along the optical axis of the optical lens is less than a threshold (the threshold may be smaller than 100 μm).

It needs to be noted that the sizes of the first gap and the second gap in the direction along the optical axis of the optical lens (for ease of description, the size in the direction along the optical axis of the optical lens in this paragraph are all referred to by size) is ultimately determined by the result of active alignment, but the size is also related to the design gap of the optical lens in the design stage. In the design stage, when a size of a design gap reserved between structural surfaces of the first lens component and the second lens component is small, the size of the first gap and the second gap determined by the active alignment will also be reduced accordingly. The smaller sizes of the first gap and the second gap are helpful to suppress a secondary variation of the lens barrel and/or lens sheet caused by curing of the adhesive, thereby improving the imaging quality of the optical lens or the corresponding camera module.

Further, in an embodiment, in the step 10, the first gap formed is located between an end surface of the first lens barrel and an end surface of the second lens barrel. Moreover, the second gap formed is located between an end surface of the first lens barrel and a non-optical surface of one lens sheet closest to the first lens barrel among the at least one second lens sheet. In another embodiment, the second gap formed is located between an end surface of the second lens barrel and a non-optical surface of one lens sheet closest to the second lens barrel among the at least one first lens sheet.

Further, according to an embodiment of the present disclosure, there is also provided an assembly method for camera module, comprising: using the assembly method for optical lens of any one of the foregoing embodiments to assemble an optical lens, and then using the assembled optical lens to manufacture a camera module.

Figure 8:
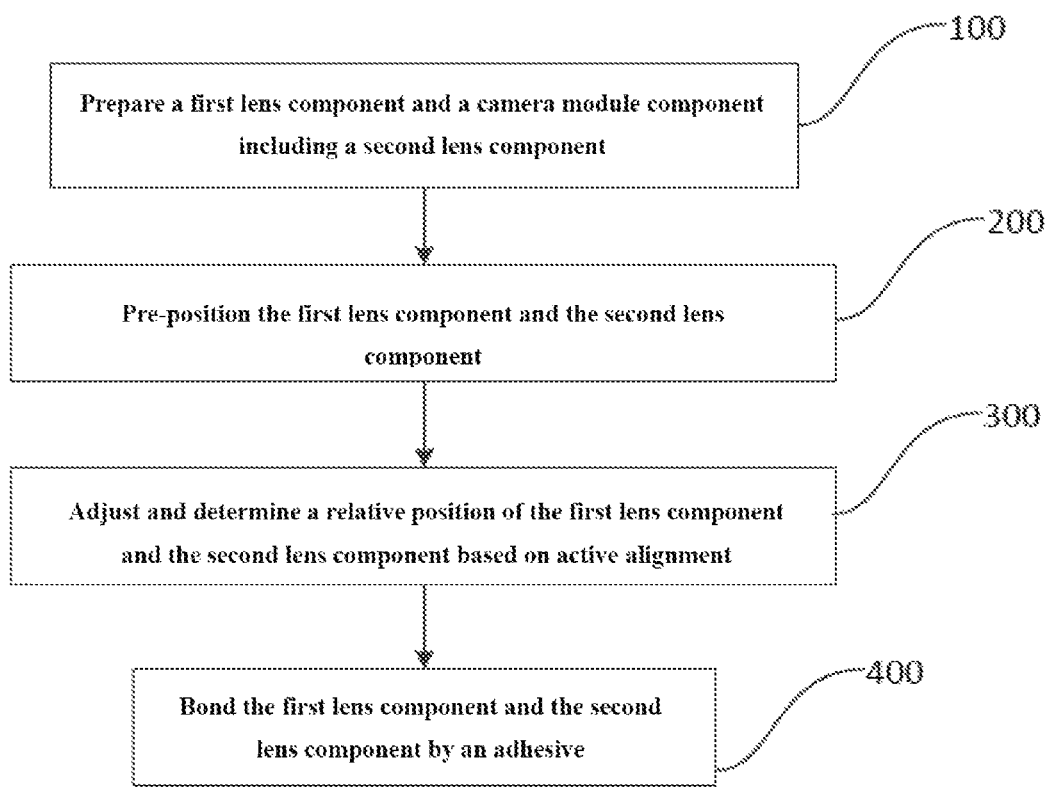
FIG. 8 shows a flowchart of an assembly method for camera module in another embodiment of the present disclosure.

Further, FIG. 8 shows a flowchart of an assembly method for camera module in another embodiment of the present disclosure, and the method comprises:

Step 100, prepare a first lens component and a camera module component, wherein the camera module component includes a second lens component and a photosensitive module combined together, the first lens component includes a first lens barrel and at least one first lens sheet mounted in the first lens barrel, and the second lens component includes a second lens barrel and at least one second lens sheet mounted in the second lens barrel.

Step 200, pre-position the first lens component and the second lens component, so that the at least one second lens sheet and the at least one first lens sheet together constitute an imageable optical system.

Step 300, adjust and determine a relative position of the first lens component and the second lens component based on active alignment.

Step 400, bond the first lens component and the second lens component by an adhesive, wherein at least a part of the adhesive is interposed between a lens barrel and a lens sheet, and the statement of between a lens barrel and a lens sheet specifically means between the second lens barrel and the first lens sheet, or between the first lens barrel and the second lens sheet.

It can be seen that, compared with the previous embodiment, the second lens component and the photosensitive module in this embodiment are assembled together to constitute the camera module component, and then the camera module component and the first lens component are assembled to obtain a complete camera module. The process of assembling the camera module component and the first lens component can also have many variants. For example, the multiple embodiments of the assembly method for optical lens described previously may be referred to so as to realize the assembly of the camera module component and the first lens component.

Figure 11:
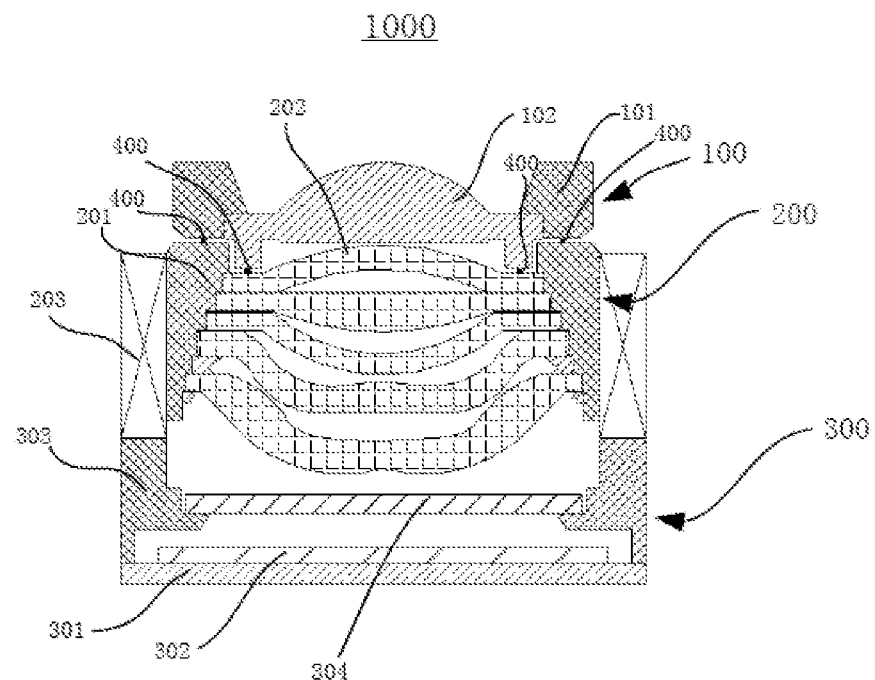
FIG. 11 shows a schematic cross-sectional view of a camera module 1000 according to an embodiment of the present disclosure.

FIG. 11 shows a schematic cross-sectional view of a camera module 1000 according to an embodiment of the present disclosure. The camera module 1000 includes an optical lens and a photosensitive assembly 300. The optical lens includes a first lens component 100, a second lens component 200, and an adhesive 400 for bonding the first lens component 100 and the second lens component 200 together. The first lens component 100 includes a first lens barrel 101 and one first lens sheet 102, and the second lens component 200 includes a second lens barrel 201 and five second lens sheets 202. In this embodiment, the second lens sheet 202 closest to the first lens component 100 is directly bonded to the first lens sheet 101. In this embodiment, the second lens component 200 may further include a motor 203, and the second lens barrel 202 may be mounted in a carrier of the motor 203 (the internal structure of the motor is not shown in FIG. 11). The photosensitive assembly 300 includes a circuit board 301, a photosensitive chip 302 mounted on the circuit board 301, a cylindrical support 303 mounted on the circuit board 301 and surrounding the photosensitive chip, and a color filter 304 mounted on the cylindrical support 303. The motor 203 is mounted on a top surface of the cylindrical support 303 so as to fix the second lens component 200 and the photosensitive assembly 300 together. It needs to be noted that in other embodiments of the present disclosure, the motor 203 in FIG. 11 may also be replaced by another structure such as a cylindrical support, or the motor 203 in FIG. 11 may also be cancelled and the second lens barrel 201 is directly mounted on the top surface of the cylindrical support 303. It needs to be noted that in other embodiments, the motor 203 may also be replaced by another type of optical actuator, such as an SMA (shape memory alloy) actuator or an MEMS actuator. The optical actuator refers to a device used to urge the optical lens to move relative to the photosensitive chip.

Figure 12:
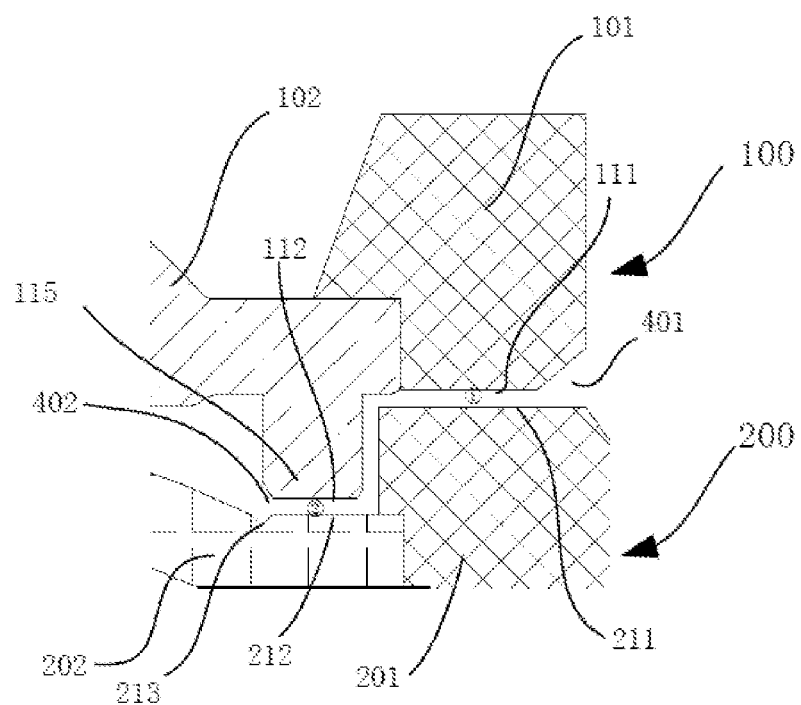
FIG. 12 shows a partially enlarged schematic cross-sectional view of a bonding region of a first lens component 100 and a second lens component 200 in an embodiment of the present disclosure.

Further, FIG. 12 shows a partially enlarged schematic cross-sectional view of a bonding region of a first lens component 100 and a second lens component 200 in an embodiment of the present disclosure. Referring to FIG. 12, in this embodiment, there is a first gap and a second gap between the first lens component 100 and the second lens component 200. In FIG. 12, "①" and "②" are used to mark the positions of the first gap and the second gap, respectively. The adhesive includes a first adhesive and a second adhesive, wherein the first adhesive and the second adhesive are applied to the first gap and the second gap, respectively, and the first gap is closer to an outer side of the optical lens than the second gap (that is, the second gap is closer to an optical axis of the optical lens than the first gap). Moreover, the second adhesive is between the first lens sheet 102 and the second lens sheet 202. Referring to FIG. 12, the first gap is located between an end surface 111 of the first lens barrel 101 and an end surface 211 of the second lens barrel 201. The second gap is located between a non-optical surface 112 of the first lens sheet 101 and a non-optical surface 212 of one second lens sheet 202 closest to the first lens barrel 100. A non-optical surface of one lens sheet is a surface of a part of the lens sheet that does not participate in optical imaging. A part of the lens sheet that does not participate in optical imaging may be referred to as a non-optical zone, sometimes also referred to as an ineffective zone. In this embodiment, the non-optical zone of the lens sheet can play a supporting function. In this embodiment, the adhesive (including the first adhesive and the second adhesive) is used to support and fix the first lens component 100 and the second lens component 200, so that a relative position of the first lens component 100 and the second lens component 200 is maintained at the relative position determined by the active alignment. The first adhesive can be used for pre-fixing, and the second adhesive can be used for permanent fixing. Further, in an embodiment, a surface of the non-optical surface 212 of the second lens sheet 202 coated with the second adhesive may be roughened to increase its roughness, thereby increasing the adhesion force between the second adhesive and the surface of the non-optical surface 212. A surface of the non-optical surface of the first lens sheet 102 may also be roughened to increase its roughness, thereby increasing the adhesion force between the second adhesive and the surface of the non-optical surface. By roughening the surfaces of the non-optical surfaces of the first lens sheet 102 and/or the second lens sheet 202, the adhesion force provided by the second adhesive can be increased, so that the adhesion force provided by the second adhesive is greater than the adhesion force provided by the first adhesive to enhance the reliability of the manufactured optical lens or camera module.

In an embodiment, the first adhesive is a UV adhesive, and the UV adhesive can be cured by exposure. The second adhesive is a thermosetting adhesive, and thermosetting adhesive can be cured by baking the lens or module. Thermosetting adhesive can provide an adhesion force greater than that of the UV adhesive after curing, so that the adhesion force provided by the second adhesive is greater than the adhesion force provided by the first adhesive. The UV adhesive is applied to the first gap located on an outer side (i.e. a side farther from the optical axis), and thermosetting adhesive is applied to the second gap located on an inner side (i.e. a side closer to the optical axis). The UV adhesive is cured by direct irradiation of light to pre-fix the first lens component and the second lens component according to a relative position determined by active alignment. Then, the pre-fixed optical lens is heated to cure thermosetting adhesive at the second gap, thereby enhancing the structural strength of the optical lens and improving the reliability of the optical lens.

It needs to be noted that in other embodiments, the first adhesive may also be another adhesive cured by light (for example, it may be a UV thermosetting adhesive). The second adhesive may also be another adhesive cured by heat, by moisture, by anaerobic or oxidative curing.

In another embodiment, the first adhesive and the second adhesive may be of the same material when they are in a liquid state. For example, UV thermosetting adhesives may be used for both of the first adhesive and the second adhesive. However, the UV thermosetting adhesives located in the first gap and the second gap are each cured in a different way (for example, the UV thermosetting adhesive in the first gap may be directly irradiated with light to complete the light curing, and then the UV thermosetting adhesive in the second gap is cured by heat), so as to form different materials with different microstructures after curing, so that the adhesion force provided by the second adhesive after curing is greater than the adhesion force provided by the first adhesive after curing. The microstructure may be, for example, a molecular structure, a physical form in micrometers, a molecular ratio, a lattice form, or the like.

Further, in an embodiment, the first adhesive and the second adhesive may not be in contact with each other so as to avoid the generation of chemical changes after the first adhesive and the second adhesive are mixed and the influence on the characteristics of glue. Since the generation of chemical changes after the first adhesive and the second adhesive are mixed is avoided, this embodiment can further enhance the reliability of the optical lens or camera module.

Further, in an embodiment, the size of the first gap in the direction along the optical axis of the optical lens is 30-100 µm.

Further, in an embodiment, the size of the second gap in the direction along the optical axis of the optical lens is 30-100 µm.

Further, when the first adhesive and the second adhesive are of the same material when they are in a liquid state (that is, when not cured), the difference of the sizes of the second gap and the first gap in the direction along the optical axis of the optical lens is less than a threshold.

In the above embodiment, the second lens sheet 202 is directly bonded to the first lens sheet 101 through the second adhesive (e.g. thermosetting adhesive), which avoids changes in the positions of the first lens sheet 101 and the second lens sheet 202 due to the deformation of the first lens barrel 101 and the second lens barrel 201 in the curing process of the second adhesive, thereby improving the imaging quality of the optical lens and camera module.

Further, still referring to FIG. 12, in an embodiment, the non-optical surface 112 of the first lens 101 has a first boss 115, and the first boss 115 may be annular in a top view. The second gap is formed between the first boss 115 and the non-optical surface 212 of the second lens sheet 202. Moreover, the second gap has a second opening 402 facing an optical axis of the optical lens, and a size of the second opening 402 in the direction along the optical axis is larger than an average size of the second gap. That is to say, a larger opening is provided between the first lens component 100 and the second lens component 200 on a side close to the optical axis. This can avoid poor imaging due to the effective region (i.e. optical zone) of the lens sheet being contaminated by glue overflow. Further, the surface of the non-optical zone of the second lens sheet 202 may further have a groove 213, and the groove 213 is annular in a top view. The groove 213 can be used to store excess glue to prevent the glue from contaminating the lens sheet. Further, the first gap has a first opening 401 facing the outer side of the optical lens, and the size of the first opening 401 in the direction along the optical axis is larger than the average size of the first gap. That is to say, a larger opening is also provided between the first lens component 100 and the second lens component 200 on a side close to the outside. In an embodiment, the first lens sheet 102 is closer to a front end of the optical lens than the second lens sheet 202 (the front end of the optical lens refers to a light incident end, and a rear end refers to an end close to the photosensitive assembly).

In the above embodiments, a UV thermosetting adhesive may also be used for the first adhesive. A UV thermosetting adhesive may also be used for the second adhesive.

Figure 13:
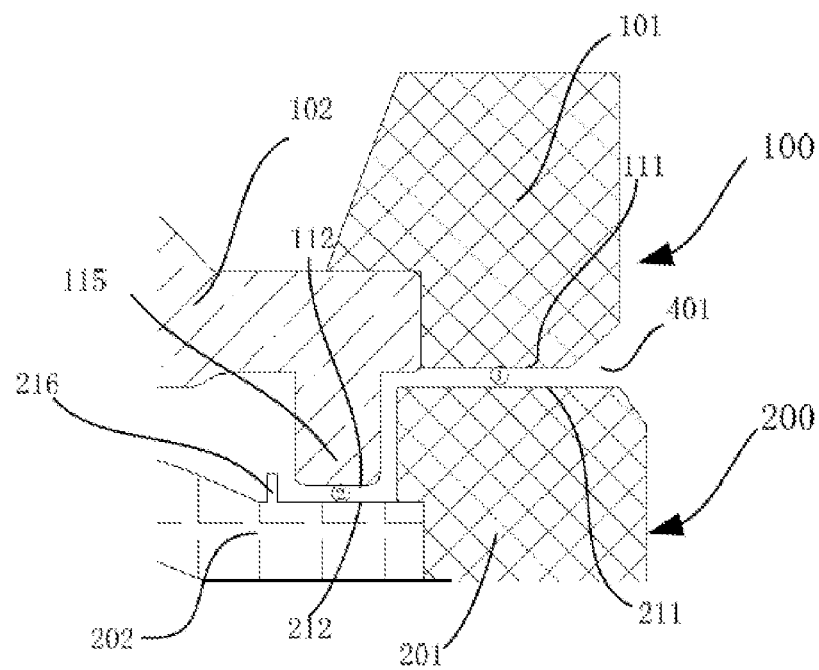
FIG. 13 shows a partially enlarged schematic cross-sectional view of a bonding region of a first lens component 100 and a second lens component 200 in another embodiment of the present disclosure.

Further, FIG. 13 shows a partially enlarged schematic cross-sectional view of a bonding region of a first lens component 100 and a second lens component 200 in another embodiment of the present disclosure. Referring to FIG. 13, in this embodiment, the non-optical surface 112 of the first lens 101 has a first boss 115, and the first boss 115 may be annular in a top view. An end surface 212 of the second lens sheet 202 bonded to the first lens sheet 102 has an annular barrier 216 that is annular in a top view, and the annular barrier 216 is located between an optical zone of the second lens sheet 202 and the second gap so as to block the flow of glue to the effective region (i.e. optical zone) of the lens sheet. Moreover, in the direction perpendicular to the optical axis of the optical lens, there is a gap of at least 50 µm between the annular barrier 216 and the first boss 115 so as to prevent the annular barrier 216 from affecting the active alignment of the first and second lens components.

Figure 14:
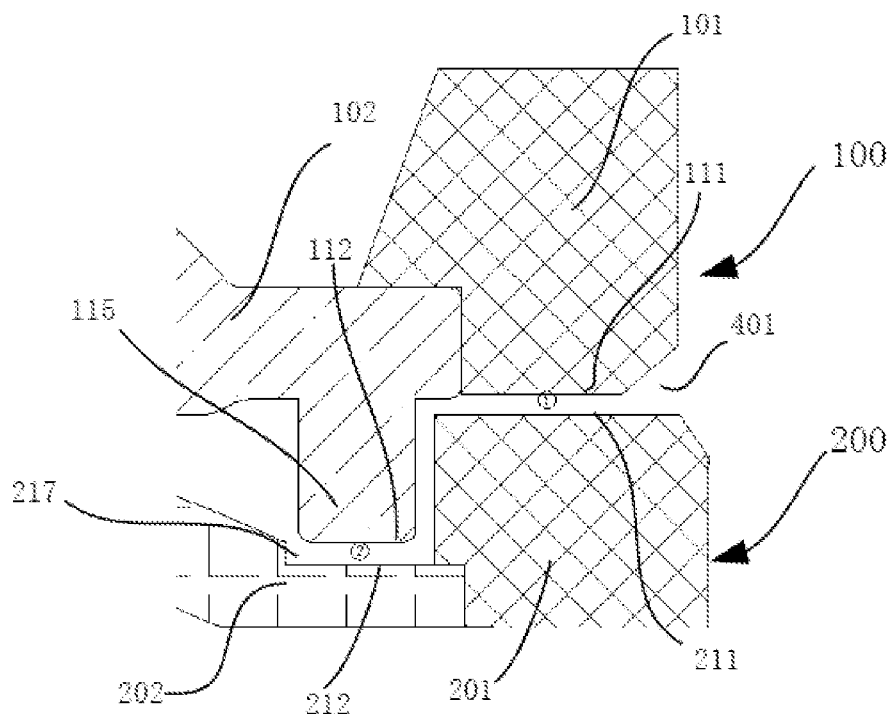
FIG. 14 shows a partially enlarged schematic cross-sectional view of a bonding region of a first lens component 100 and a second lens component 200 in still another embodiment of the present disclosure.

Further, FIG. 14 shows a partially enlarged schematic cross-sectional view of a bonding region of a first lens component 100 and a second lens component 200 in still another embodiment of the present disclosure. In this embodiment, the non-optical surface (i.e. a surface of an ineffective region) of the second lens sheet 202 bonded to the first lens sheet 102 has an inwardly recessed step 217, so as to block glue overflow from contaminating an effective region of the lens sheet. The step 217 is annular in a top view, and it can replace the annular barrier 216 in the embodiment of FIG. 13, and can reduce the difficulty of lens sheet processing relative to the solution of the annular barrier 216.

Figure 15:
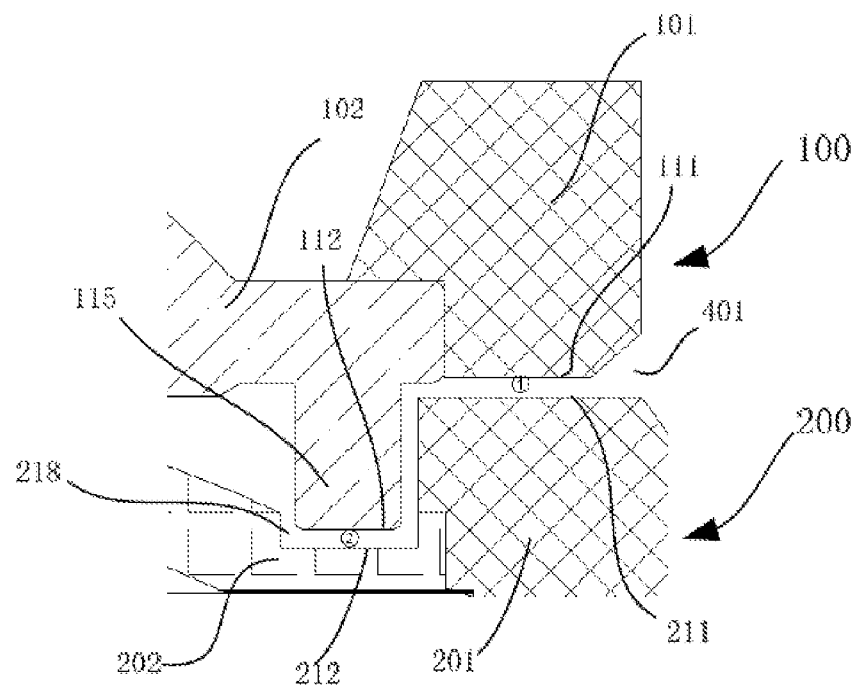
FIG. 15 shows a partially enlarged schematic cross-sectional view of a bonding region of a first lens component 100 and a second lens component 200 in further another embodiment of the present disclosure.

Further, FIG. 15 shows a partially enlarged schematic cross-sectional view of a bonding region of a first lens component 100 and a second lens component 200 in further another embodiment of the present disclosure. In this embodiment, the non-optical surface (i.e. a surface of an ineffective region) of the second lens sheet 202 bonded to the first lens sheet 102 has an inwardly recessed groove 218, so as to block glue overflow from contaminating an effective region of the lens sheet. Moreover, the groove 218 is annular in a top view, and it may replace the annular barrier 216 in the embodiment of FIG. 13 or the step 217 in the embodiment of FIG. 14. The groove 218 can increase the bonding area between the first lens sheet 102 and the second lens sheet 202 while achieving glue blocking, thereby increasing the strength of bonding.

Figure 16:
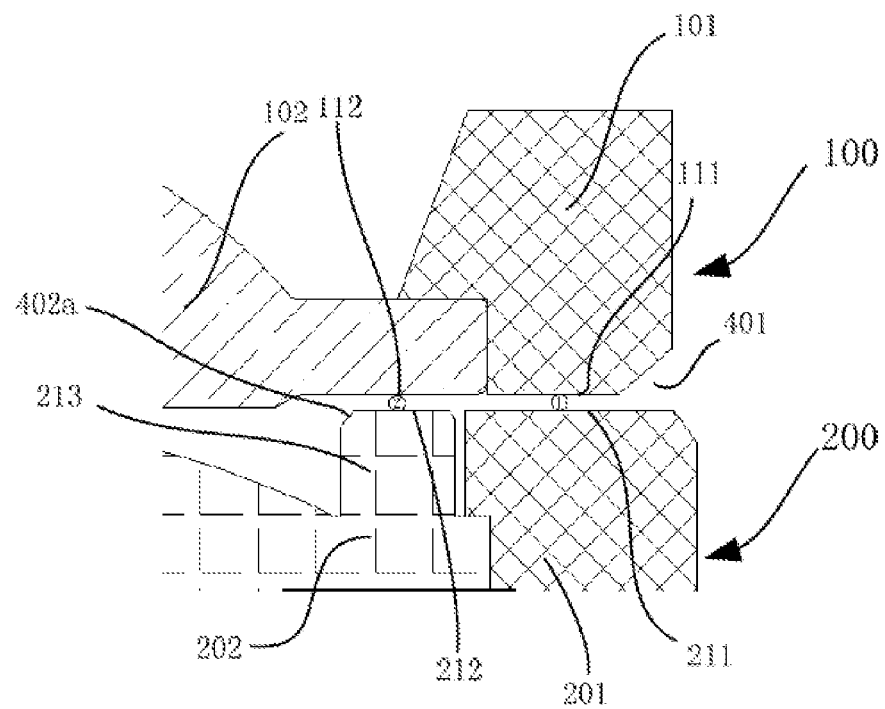
FIG. 16 shows a partially enlarged schematic cross-sectional view of a bonding region of a first lens component 100 and a second lens component 200 in further another embodiment of the present disclosure.

Further, FIG. 16 shows a partially enlarged schematic cross-sectional view of a bonding region of a first lens component 100 and a second lens component 200 in further another embodiment of the present disclosure. In this embodiment, an end surface 212 of the second lens sheet 202 bonded to the first lens sheet 102 has a boss 213. The second gap is located between the boss 213 and a non-optical surface 112 of the first lens sheet 101. In this embodiment, the boss 213 is used to replace the groove design in the embodiment of FIG. 12, which can better prevent glue overflow from contaminating the lens sheet. The cross-sectional shape of the boss 213 includes, but is not limited to, trapezoidal, rectangular, triangular, semicircular and other shapes. Generally speaking, during the active alignment and bonding process, the second lens component is placed below the first lens component. At this time, a chamfer 402a can be provided on an annular boss 213 of the second lens component 200 located below to provide a larger opening for the second gap, thereby preventing glue from contaminating the effective region (i.e. optical zone) of the lens sheet and causing poor imaging.

Figure 17:
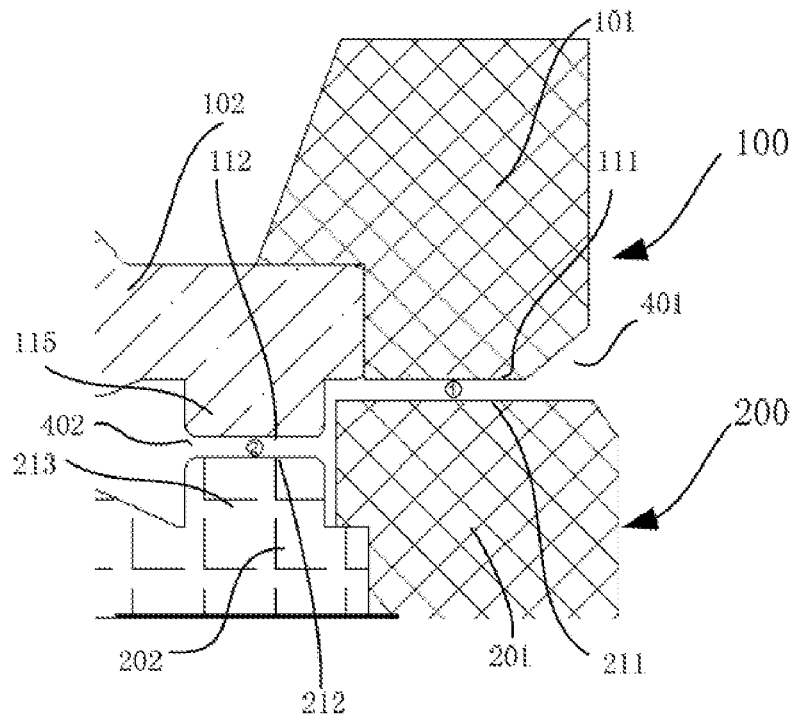
FIG. 17 shows a partially enlarged schematic cross-sectional view of a bonding region of a first lens component 100 and a second lens component 200 in further another embodiment of the present disclosure.

Further, FIG. 17 shows a partially enlarged schematic cross-sectional view of a bonding region of a first lens component 100 and a second lens component 200 in further another embodiment of the present disclosure. In this embodiment, compared with the embodiment of FIG. 16, one first boss 115 facing the second lens sheet 202 is added to the first lens sheet 102 of this embodiment. Specifically, in this embodiment, the non-optical surface 112 of the first lens sheet 102 bonded to the second lens sheet 202 has a first boss 115. The first boss 115 is located in an ineffective region (i.e. non-optical zone) of the first lens sheet 102. The second gap is located between the first boss 115 and the second boss 212 of the second lens sheet 202. In this embodiment, the adhesive applied to the second boss 212 can be drained to both sides of the boss when it overflows, which can thus avoid the effective region of the lens sheet being contaminated by glue. The cross-sectional shapes of the first boss 115 and the second boss 212 include, but are not limited to, trapezoidal, rectangular, triangular, semicircular and other shapes. Both the first boss 115 and the second boss 212 can be provided with chamfers to increase the second opening 402 of the second gap, so as to better drain glue overflow.

It needs to be noted that in the above embodiment, the number of lens sheets of the first lens component and the second lens component can be adjusted as needed. For example, the number of lens sheets of the first lens component and the second lens component may be two and four, respectively, or may be three and three, respectively, or may be four and two, respectively, or may be five and one, respectively. The total number of lens sheets of the entire optical lens can also be adjusted as needed. For example, the total number of lens sheets of the optical lens can be six, or may be five or seven.

It also needs to be noted that in the optical lens of the present application, the lens components are not limited to two. For example, the number of lens components may also be a number of greater than two, such as three or four. When there are more than two lens components constituting the optical lens, two adjacent lens components may be regarded as the first lens component mentioned previously and the second lens component mentioned previously, respectively. For example, when the number of lens components of the optical lens is three, the optical lens may include two first lens components and one second lens component located between the two first lens components, and all first lens sheets of the two first lens components and all second lens sheets of the one second lens component together constitute an imageable optical system for active alignment. When the number of lens components of the optical lens is four, the optical lens may include two first lens components and two second lens components, and they are arranged from top to bottom in an order of a first lens component, a second lens component, a first lens component, and a second lens component, and all first lens sheets of the two first lens components and all second lens sheets of the two second lens components together constitute an imageable optical system for active alignment. Other variations like this will not be repeated herein.

Figure 18:
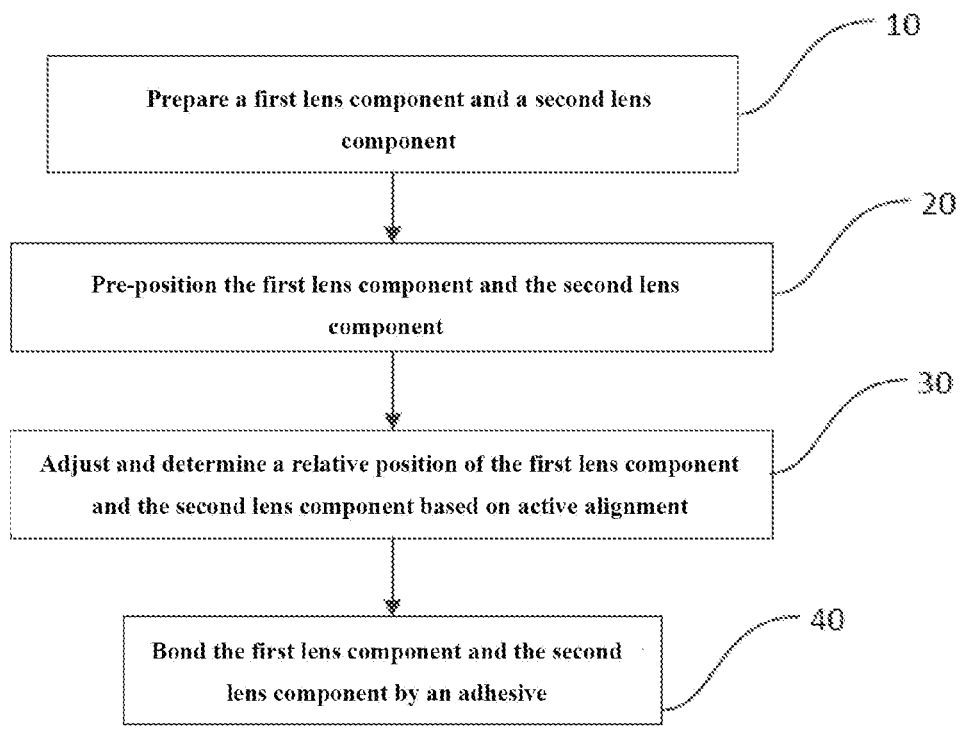
FIG. 18 shows a flowchart of an assembly method for optical lens in an embodiment of the present disclosure.

Further, FIG. 18 shows a flowchart of an assembly method for optical lens in an embodiment of the present disclosure. Referring to FIG. 18, the method comprises:

Step 10, prepare a first lens component and a second lens component, wherein the first lens component includes a first lens barrel and at least one first lens sheet mounted in the first lens barrel, and the second lens component includes a second lens barrel and at least one second lens sheet mounted in the second lens barrel.

Step 20, pre-position the first lens component and the second lens component, so that the at least one second lens sheet and the at least one first lens sheet together constitute an imageable optical system.

Step 30, adjust and determine a relative position of the first lens component and the second lens component based on active alignment.

Step 40, bond the first lens component and the second lens component by an adhesive, wherein at least a part of the adhesive is interposed between the first lens sheet and the second lens sheet. In this step, the cured adhesive is used to support and fix the first lens component and the second lens component, so that the relative position of the first lens component and the second lens component is maintained at a relative position determined by active alignment.

Further, in an embodiment, before step 30 is performed, the adhesive may be applied to the gap between the first lens component and the second lens component, and then step 30 is performed to adjust and determine the relative position of the first lens component and the second lens component. After determining the relative position, step 40 is performed to cure the adhesive, so that the cured adhesive is used to support the first lens component and the second lens component, and thus the relative position of the first lens component and the second lens component is maintained at the relative position determined by the active alignment. In another embodiment, step 30 may be performed first so as to adjust and determine the relative position of the first lens component and the second lens component. After determining the relative position, the first lens component (or second lens component) is temporarily moved away, then the adhesive is applied, and thereafter, the first lens component (or second lens component) is moved back based on the determined relative position. Finally, the adhesive is cured so that the relative position of the first lens component and the second lens component is maintained at the relative position determined by the active alignment.

Further, in an embodiment, in the step 30, a first gap and a second gap are formed between the first lens component and the second lens component, wherein the first gap is closer to the outer side of the optical lens than the second gap.

Figure 19:
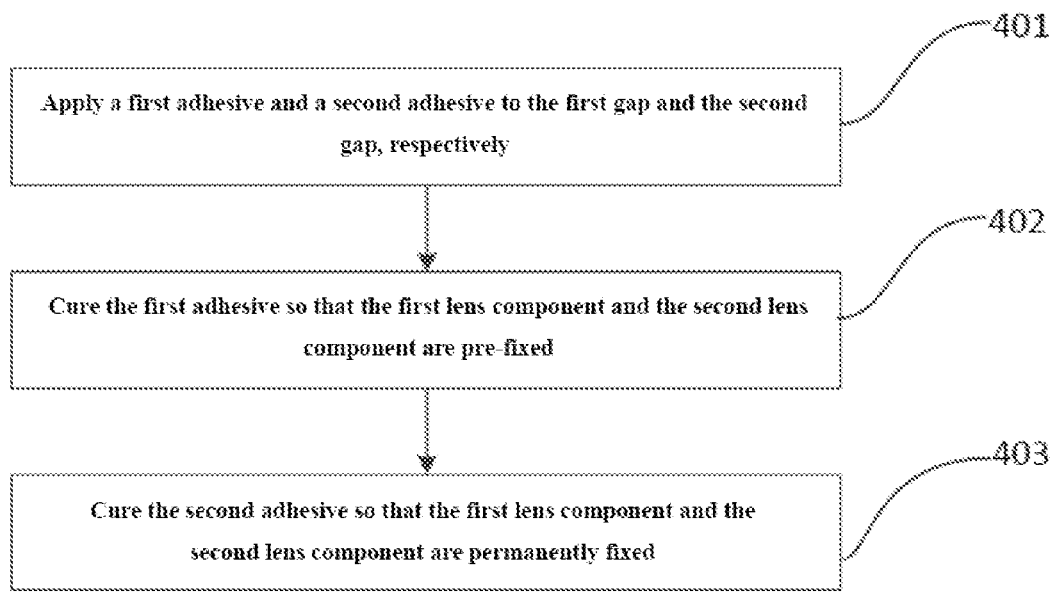
FIG. 19 shows a flowchart of step 40 in an embodiment of the present disclosure.
Figure 20:
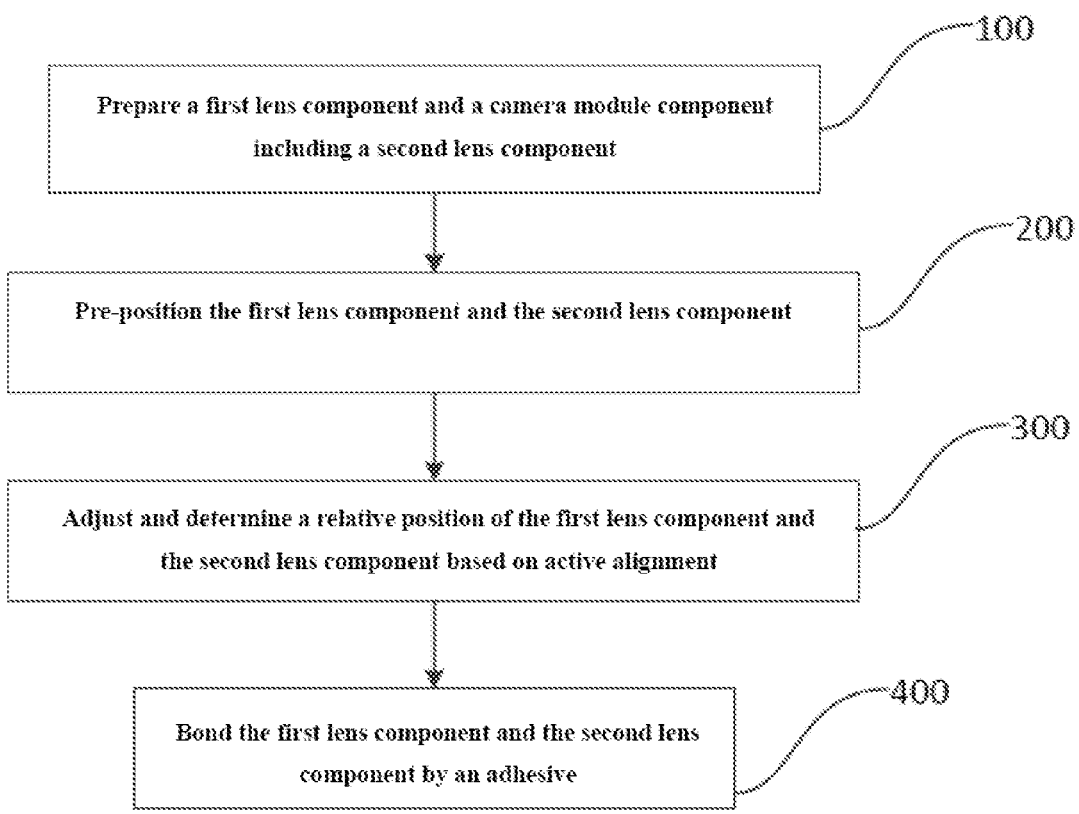
FIG. 20 shows a flowchart of an assembly method for camera module in another embodiment of the present disclosure.

Further, FIG. 19 shows a flowchart of step 40 in an embodiment of the present disclosure. Referring to FIG. 19, the step 40 comprises the following sub-steps:

Step 401, apply a first adhesive and a second adhesive to the first gap and the second gap, respectively, wherein an adhesion force of the second adhesive is greater than an adhesion force of the first adhesive.

Step 402, cure the first adhesive so that the first lens component and the second lens component are pre-fixed.

Step 403, cure the second adhesive so that the first lens component and the second lens component are permanently combined. The first adhesive may be a UV adhesive, and the second adhesive may be a thermosetting adhesive.

In step 403, since the first lens sheet is directly bonded to a corresponding second lens sheet, the position change of the lens sheet caused by the deformation of the first lens barrel and/or the second lens barrel can be avoided, thereby ensuring that a permanent relative position between the first lens sheet and the second lens sheet formed after curing is consistent with the relative position between the first lens component and the second lens component determined by the active alignment.

Further, in an embodiment, in the step 10, the first gap formed is located between an end surface of the first lens barrel and an end surface of the second lens barrel.

Moreover, the second gap formed is located between a non-optical surface of the first lens sheet and a non-optical surface of the second lens sheet.

It needs to be noted that in other embodiments, the first adhesive may also be another adhesive cured by light (for example, it may be a UV thermosetting adhesive). The second adhesive may also be another adhesive cured by heat, by moisture, by anaerobic or oxidative curing.

In another embodiment, the first adhesive and the second adhesive may be of the same material when they are in a liquid state. For example, UV thermosetting adhesives may be used for both of the first adhesive and the second adhesive. However, the UV thermosetting adhesives located in the first gap and the second gap are each cured in a different way (for example, the UV thermosetting adhesive in the first gap may be directly irradiated with light to complete the light curing, and then the UV thermosetting adhesive in the second gap is cured by heat), so as to form different materials with different microstructures after curing, so that the adhesion force provided by the second adhesive after curing is greater than the adhesion force provided by the first adhesive after curing. The microstructure may be, for example, a molecular structure, a physical form in micrometers, a molecular ratio, a lattice form, or the like.

Further, in an embodiment, the first adhesive and the second adhesive may not be in contact with each other so as to avoid the generation of chemical changes after the first adhesive and the second adhesive are mixed and the influence on the characteristics of glue. Since the generation of chemical changes after the first adhesive and the second adhesive are mixed is avoided, this embodiment can further enhance the reliability of the optical lens or camera module.

Further, in an embodiment, the size of the first gap in the direction along the optical axis of the optical lens is 30-100 μm.

Further, in an embodiment, the size of the second gap in the direction along the optical axis of the optical lens is 30-100 μm.

Further, when the first adhesive and the second adhesive are of the same material when they are in a liquid state (that is, when not cured), the difference of the sizes of the second gap and the first gap in the direction along the optical axis of the optical lens is less than a threshold (the threshold is smaller than 100 μm).

Further, according to an embodiment of the present disclosure, there is also provided an assembly method for camera module, comprising: using the assembly method for optical lens of any one of the foregoing embodiments to assemble an optical lens, and then using the assembled optical lens to manufacture a camera module.

Further, FIG. 11 shows a flowchart of an assembly method for camera module in another embodiment of the present disclosure, and the method comprises:

Step 100, prepare a first lens component and a camera module component, wherein the camera module component includes a second lens component and a photosensitive module combined together, the first lens component includes a first lens barrel and at least one first lens sheet mounted in the first lens barrel, and the second lens component includes a second lens barrel and at least one second lens sheet mounted in the second lens barrel.

Step 200, pre-position the first lens component and the second lens component, so that the at least one second lens sheet and the at least one first lens sheet together constitute an imageable optical system.

Step 300, adjust and determine a relative position of the first lens component and the second lens component based on active alignment.

Step 400, bond the first lens component and the second lens component by an adhesive, wherein at least a part of the adhesive is interposed between the first lens sheet and the second lens sheet.

It can be seen that, compared with the previous embodiment, the second lens component and the photosensitive module in this embodiment are assembled together to constitute the camera module component, and then the camera module component and the first lens component are assembled to obtain a complete camera module. The process of assembling the camera module component and the first lens component can also have many variants. For example, the multiple embodiments of the assembly method for optical lens described previously may be referred to so as to realize the assembly of the camera module component and the first lens component.

Further, the active alignment described in the present application can adjust the relative position of the first lens component and the second lens component in multiple degrees of freedom. FIG. 22a shows a relative position adjustment manner in active alignment in an embodiment of the present disclosure. In this adjustment manner, the first lens component (or the first lens sheet) can be moved along x, y, and z directions relative to the second lens component (that is, the relative position adjustment in this embodiment has three degrees of freedom). The z direction is a direction along the optical axis, and the x and y directions are directions perpendicular to the optical axis. The x and y directions are both in an adjustment plane P, and the translation in the adjustment plane P can be decomposed into two components in the x and y directions.

FIG. 22b shows rotation adjustment in active alignment according to another embodiment of the present disclosure. In this embodiment, in addition to the three degrees of freedom in FIG. 3, a degree of freedom in rotation is, i.e., an adjustment in a r direction, is also added to the relative position adjustment. In this embodiment, the adjustment in the r direction is rotation in the adjustment plane P, i.e. rotation around an axis perpendicular to the adjustment plane P.

Further, FIG. 22c shows a relative position adjustment manner in which adjustments in v and w directions are added in active alignment according to still another embodiment of the present disclosure. The v direction represents a rotation angle of an xoz plane, and the w direction represents a rotation angle of a yoz plane. The rotation angles of the v direction and w direction can be combined into a vector angle, which represents the total tilt state. That is to say, by adjusting in the v and w directions, the tilt attitude of the first lens component relative to the second lens component (i.e. tilt of an optical axis of the first lens component relative to an optical axis of the second lens component) can be adjusted.

The adjustments in the six degrees of freedom of x, y, z, r, v, and w may all affect the imaging quality of the optical system (for example, affecting the size of the resolution). In other embodiments of the present disclosure, the relative position adjustment manner may be to adjust only in any one of the above six degrees of freedom, or may be a combination of any two or more of them.

Figure 21A:
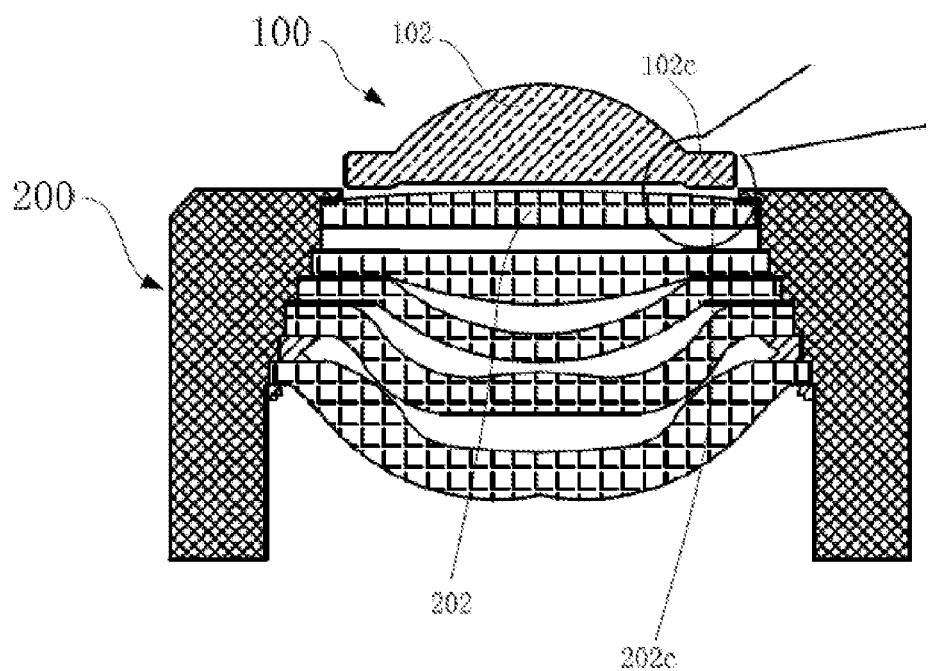
FIG. 21a shows a schematic cross-sectional view of a first lens sheet and a second lens component after pre-positioning according to an embodiment of the disclosure.
Figure 21B:
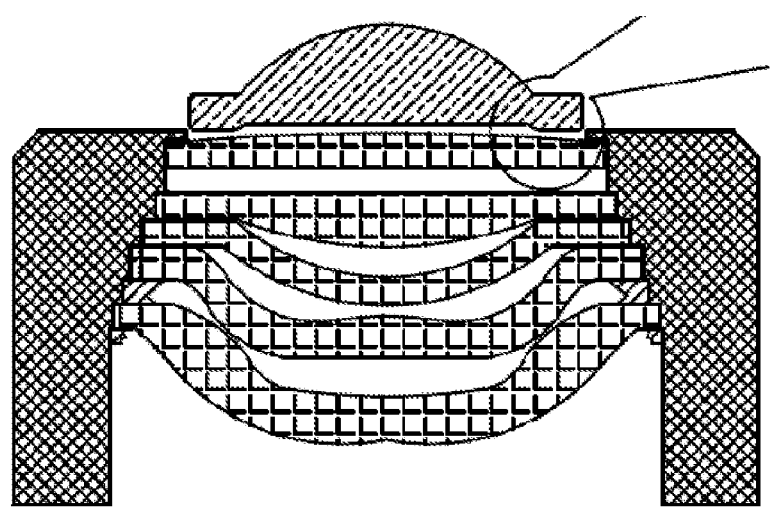
FIG. 21b shows a schematic cross-sectional view of a positional relationship between a first lens sheet and a second lens component after active alignment according to an embodiment of the present disclosure.
Figure 21C:
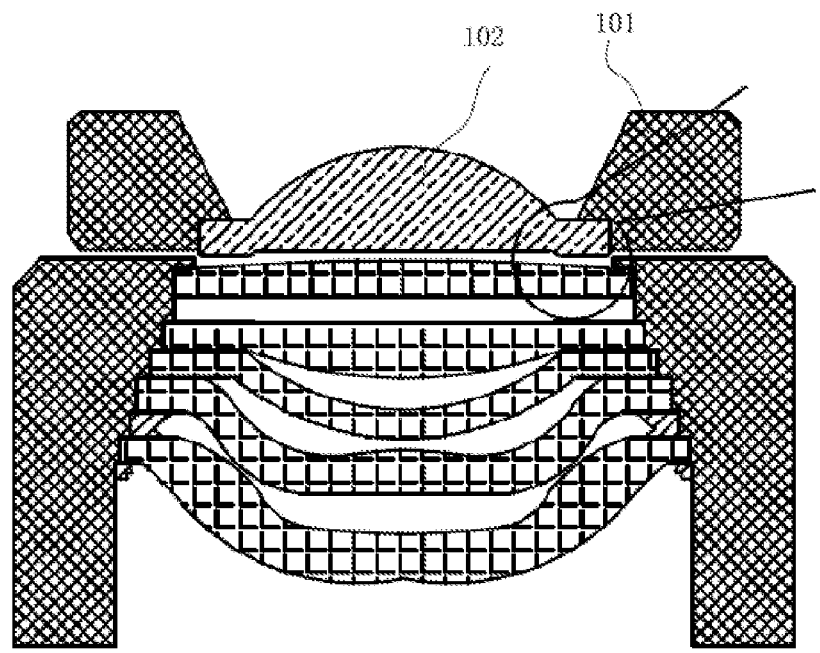
FIG. 21c shows a schematic cross-sectional view where a first lens barrel is mounted on the basis of FIG. 21b.
Figure 21D:
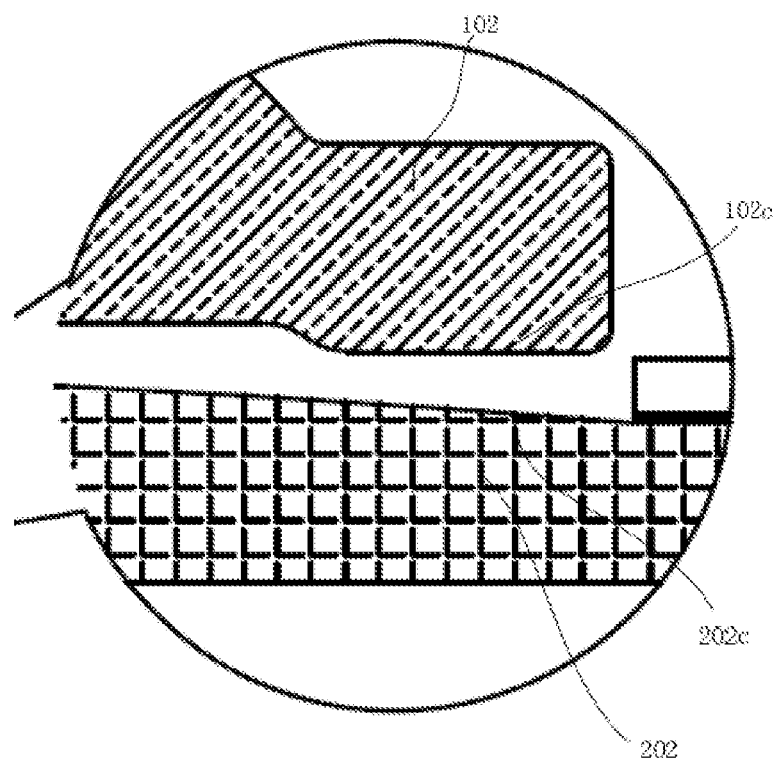

Further, FIGS. 21a to 21c show an assembly flow of an optical lens according to an embodiment of the present disclosure, and the assembly flow comprises:

Step 1, the second lens component is fixed by a fixing mechanism (not shown), and a pickup mechanism (not shown) clamps (or adsorbs) the first lens sheet 102 of the first lens component 100 for pre-positioning, so that the first and second lens components 100 and 200 constitute an imageable optical system. FIG. 21a shows a schematic cross-sectional view of a first lens sheet and a second lens component after pre-positioning according to an embodiment of the disclosure. FIG. 21d shows an enlarged schematic view of a partial region in FIG. 21a, and the enlarged part is a region within a circle in FIG. 21a. Referring to FIGS. 21a and 21d, the first lens component 100 has at least one first bearing surface 102c, the second lens component 200 has at least one second bearing surface 202c, and the at least one first bearing surface 102c and the at least one second bearing surface 202c constitute at least one gap located between the first bearing surface 102c and the second bearing surface 202c. The first lens component 100 is picked up by a pickup mechanism, so that the first lens component 100 is actively adjusted relative to the second bearing surface of the second lens component. The active adjustment comprises photographing a reference object, which is preferably a target board, and obtaining a correction amount from image information. The correction amount is preferably a MTF value, or may be a SFR or Tv Line value. After obtaining the relevant correction amount, the pickup mechanism adjusts the positions of the first and second lens components to improve the optical system. A specific reference standard of the optical system includes the improved optical system having the performance of reduced aberrations and improved resolution compared with the optical system that is not adjusted. The improvement index of the optical system may also be set as needed. Pre-positioning is a starting step of the subsequent process flow. When the first and second lens components are pre-positioned, the design size of the gap is generally followed.

In an embodiment, the second lens component is actively adjusted with respect to the first bearing surface by a pickup mechanism, and the active adjustment includes adjusting the first bearing surface and the second bearing surface relative to X-axis and/or Y-axis and/or Z-axis directions so as to change the relative position of the first bearing surface and the second bearing surface, so that the first bearing surface and the second bearing surface form an included angle. Generally speaking, the size of the adjusted included angle is inconsistent with the included angle during pre-positioning. The included angle changes the size of the gap during pre-positioning, which may thus cause a certain error between the adjusted gap and the designed gap size.

In an embodiment, the relative position of the first lens sheet 102 with respect to the second lens component 200 is adjusted by a pickup mechanism, and the adjustment of the relative position comprises: adjusting an included angle between the axis of the first lens component and an the axis of the second lens component to cause the first lens component to move along an adjustment plane relative to the second lens component, and cause the lens component to move along a direction perpendicular to the adjustment plane, so that the measured resolution (e.g. MTF value, SFR value or Tv Line value) of imaging of the optical system is improved. The movement along the adjustment plane includes translation and/or rotation on the adjustment plane. After the active alignment, the included angle between the axis of the first lens sheet 102 and the axis of the second lens component 200 may not be zero. The axis of the second lens component 200 may be represented by the axis of the second lens barrel 201 or the second lens sheet 202.

Figure 21E:
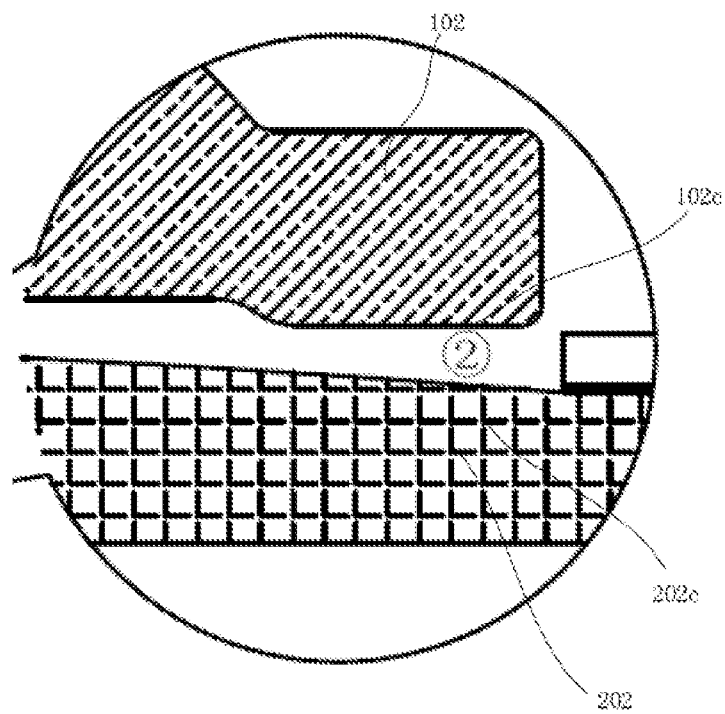
FIG. 21e shows an enlarged schematic view of a partial region in FIG. 21b.

Step 2, after the adjusted gap is recorded, the pickup mechanism moves the first lens component 100 away from the second lens component to expose the second bearing surface 202c. After glue is dispensed on the second bearing surface 202c, the first lens component 100 is returned to a position during recording by the pickup mechanism. FIG. 21b shows a schematic cross-sectional view of a positional relationship between a first lens sheet and a second lens component after the active alignment according to an embodiment of the present disclosure. FIG. 21e shows an enlarged schematic view of a partial region in FIG. 21b, and the enlarged part is a region within a circle in FIG. 21b. It needs to be noted that a position of dispensing glue in this step is marked with "②" in the figure, but the adhesive is not shown. After the first lens component is returned to the position during recording by the pickup mechanism, the adhesive is cured, and the curing manner includes a thermosetting manner so as to achieve the strength for supporting the first and second lens components. In this embodiment, the first bearing surface 102c is located in a non-optical zone of the first lens sheet 102, and the second bearing surface 202c is located in a non-optical zone of the second lens sheet 202. Therefore, the adhesive is located between the first bearing surface 102c and the second bearing surface 202c.

Figure 21F:
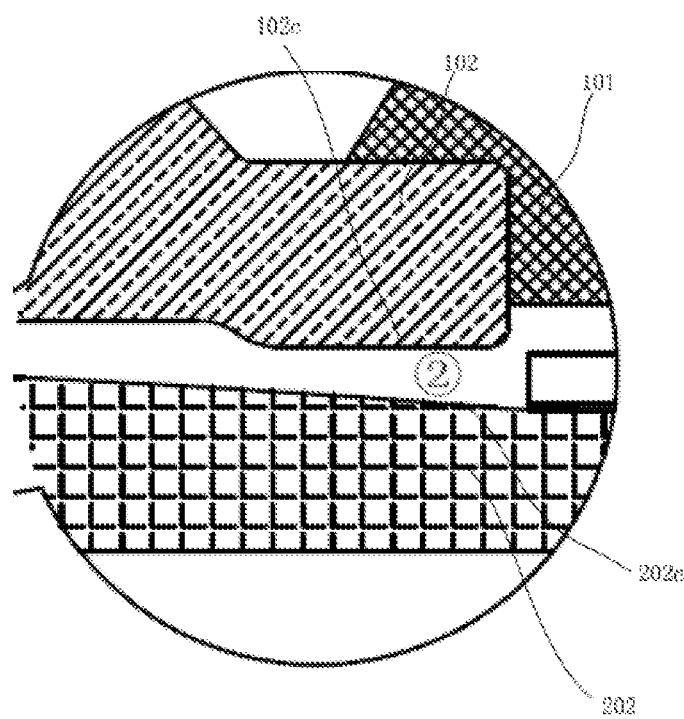
FIG. 21f shows an enlarged schematic view of a partial region in FIG. 21c.

Step 3, mount the first lens barrel 101 on the first lens sheet 102 so as to enhance the structural strength of the first lens component 100 and the second lens component 200 and protect the lens sheet to a certain extent. The first lens barrel 101 is mounted on a top surface and/or a side surface of the first lens sheet 102 by the pickup mechanism. The mounting manner may be using a threaded structure to realize the connection between the first lens barrel and the first lens sheet. In this embodiment, it is preferable to coat an adhesive on the top surface of the first lens sheet, and the adhesive plays a function of connecting and fixing the first lens barrel and the first lens sheet. FIG. 21c shows a schematic cross-sectional view where a first lens barrel is mounted on the basis of FIG. 21b. FIG. 21f shows an enlarged schematic view of a partial region in FIG. 21b, and the enlarged part is a region within a circle in FIG. 21b. Further, FIG. 21g shows an enlarged schematic view of a partial region where a glue dispensing position of an adhesive between a first lens barrel and a second lens barrel is added on the basis of FIG. 21f. The glue dispensing position of the adhesive between the first lens barrel and the second lens barrel is marked with "①".

Particularly, in an embodiment, the pickup mechanism preferably controls the gap between the first lens barrel and the second lens barrel to be the same size, that is, no correction is made between the lens barrel and the lens barrel, so that the first lens barrel and the second lens barrel are consistent in their appearance. Therefore, the adhesive between the first lens barrel and the second lens barrel is indicated so that "①" has the same size in the optical axis direction.

Figure 24:
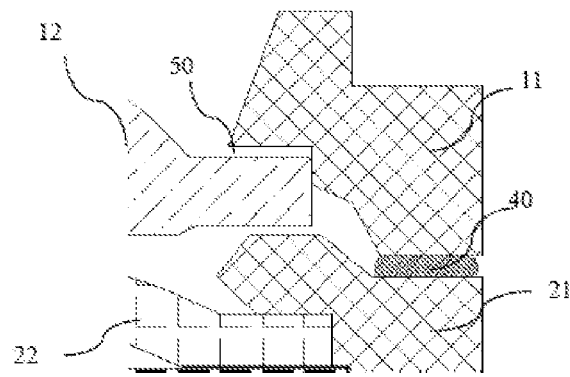
FIG. 24 shows a partial schematic cross-sectional view of an example of an optical lens manufactured based on an Active Alignment process in an actual case where an upper sub-lens has an assembly tolerance.
Figure 25:
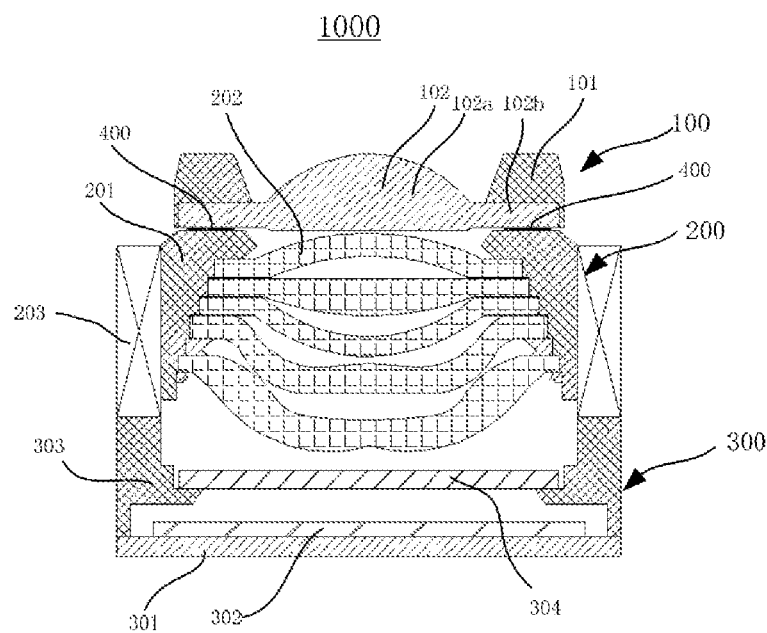
FIG. 25 shows a schematic cross-sectional view of a camera module 1000 according to an embodiment of the present disclosure.

FIG. 25 shows a schematic cross-sectional view of a camera module 1000 according to an embodiment of the present disclosure. The camera module 1000 includes an optical lens and a photosensitive assembly 300. The optical lens includes a first lens component 100, a second lens component 200, and an adhesive 400 for bonding the first lens component 100 and the second lens component 200 together. The first lens component 100 includes a first lens barrel 101 and one first lens sheet 102, and the second lens component 200 includes a second lens barrel 201 and five second lens sheets 202. In this embodiment, the first lens barrel 101 plays a function of shielding light, but does not have the function of supporting the first lens sheet 102. In other words, the first lens barrel 101 can be understood as a light shielding portion attached to the first lens sheet 102. Referring to FIG. 25, the first lens barrel 101 surrounds a side surface of the first lens sheet 102. Specifically, the first lens sheet 102 includes an optical zone 102a and a non-optical zone 102b. The first lens barrel 101 is attached to a side surface and a top surface of the non-optical zone 102b so as to shield the optical zone 102a from light. In this embodiment, since the first lens barrel 101 does not need to play the function of supporting the first lens sheet 102, the thickness of the first lens barrel 101 can be reduced. For example, the thickness of the barrel wall of the first lens barrel 101 may be smaller than the thickness of the barrel wall required for supporting the first lens sheet 102. This will be helpful to reduce the volume of the optical lens or camera module. In this embodiment, the first lens sheet 102 is directly bonded to the second lens barrel 102. Since the first lens sheet 102 is directly bonded to the second lens barrel 102, the gap 50 as shown in FIG. 24 will not cause the thickness of the adhesive 400 between the first lens component 100 and the second lens component 200 to increase. In this way, in the optical lens manufacturing based on active alignment, the additional manufacturing tolerances due to the assembly tolerances of the first lens sheet and the first lens barrel shown in FIG. 24 can be avoided.

Figure 23:
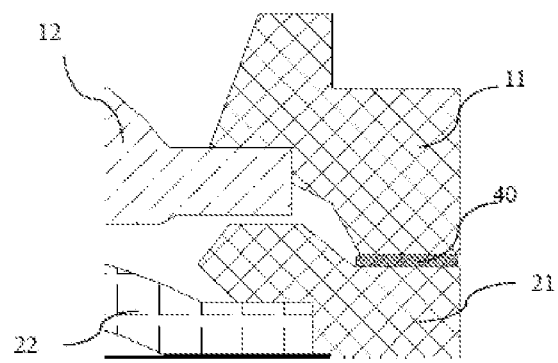
FIG. 23 shows a partial schematic cross-sectional view of an example of an optical lens manufactured based on an Active Alignment process in an ideal case where an upper sub-lens has no assembly tolerance.

Further, still referring to FIG. 25, in this embodiment, the second lens component 200 may further include a motor 203, and the second lens barrel 202 may be mounted in a carrier of the motor 203 (the internal structure of the motor is not shown in FIG. 23). The photosensitive assembly 300 includes a circuit board 301, a photosensitive chip 302 mounted on the circuit board 301, a cylindrical support 303 mounted on the circuit board 301 and surrounding the photosensitive chip, and a color filter 304 mounted on the cylindrical support 303. The motor 203 is mounted on a top surface of the cylindrical support 303 so as to fix the second lens component 200 and the photosensitive assembly 300 together. It needs to be noted that in other embodiments of the present disclosure, the motor 203 in FIG. 23 may also be replaced by another structure such as a cylindrical support, or the motor 203 in FIG. 23 may also be cancelled and the second lens barrel 201 is directly mounted on the top surface of the cylindrical support 303. It needs to be noted that in other embodiments, the motor 203 may also be replaced by another type of optical actuator, such as an SMA (shape memory alloy) actuator. The optical actuator refers to a device used to urge the optical lens to move relative to the photosensitive chip.

Figure 26:
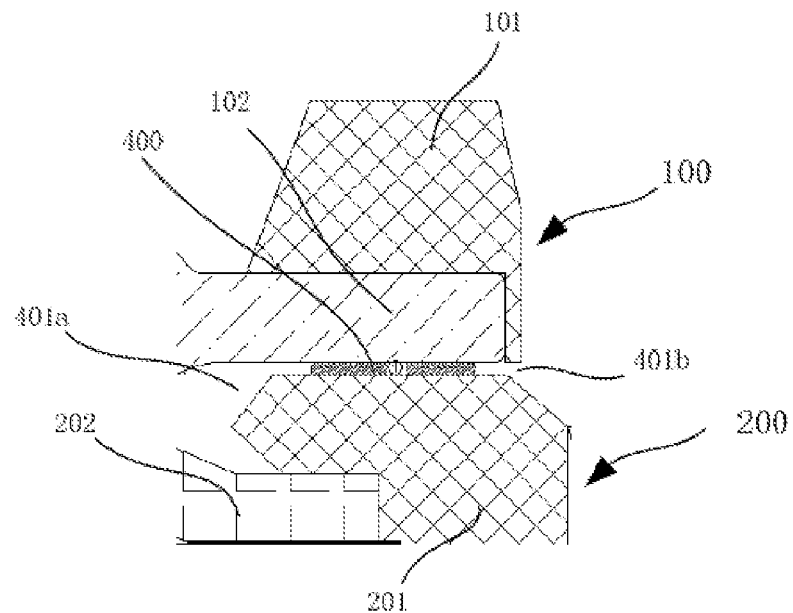
FIG. 26 shows a partially enlarged schematic cross-sectional view of a bonding region of a first lens component 100 and a second lens component 200 in an embodiment of the present disclosure.

Further, FIG. 26 shows a partially enlarged schematic cross-sectional view of a bonding region of a first lens component 100 and a second lens component 200 in an embodiment of the present disclosure. Referring to FIG. 26, in this embodiment, there is a gap between the first lens component 100 and the second lens component 200 (marked by "①" in FIG. 26). Specifically, the gap is located between an end surface (non-optical surface) of a non-optical zone of the first lens sheet 102 and the second lens barrel 202. A surface of the non-optical surface of the first lens sheet 102 may also be roughened to increase its roughness, thereby increasing the adhesion force between the second adhesive and the surface of the non-optical surface. When assembling the first lens component 100 and the second lens component 200, active alignment can be performed first to adjust the relative position of the first and second lens components 100 and 200, and then glue (such as a UV thermosetting adhesive) is dispensed at the gap between the first lens sheet 102 and the second lens component 200. During glue dispensing, the adhesive 400 is caused not to contaminate the part of the first lens barrel 101. Then UV exposure is performed to cure a relative outer part of the adhesive 400 that can receive light, so as to pre-fix the structure of the camera module or optical lens. Finally, baking is performed to cure all the glue, fixing the entire camera module or optical lens. Of course, in another embodiment, the sequence of glue dispensing and active alignment may also be interchanged.

Referring to FIG. 26, in an embodiment, in order to enable the glue to be exposed and cured as much as possible, the barrel wall of the first lens barrel 101 of the first lens component 100 is as thin as possible. Further, in another embodiment, the first lens component may also be composed of only one lens sheet subjected to a shading treatment, wherein the shading treatment of the lens sheet can avoid the influence of stray light on imaging. The embodiment shown in FIG. 35 will be further described below.

Further, still referring to FIG. 26, in an embodiment, the second lens barrel 201 may be provided with a chamfer so that the gap forms an opening 401b facing the outside. The chamfer is used to drain glue that may overflow and prevent the first lens barrel 101 of the first lens component 100 from being contaminated with the glue. The second lens barrel 201 may also be provided with a chamfer so that the gap forms an opening 401a facing the optical axis of the optical lens, so as to drain the glue that may overflow and prevent the lens sheet from being contaminated by the glue. The sizes of the two openings 401a, 401b in the direction along the optical axis are each larger than an average size of the gap.

In the above embodiment, the first lens sheet 102 is closer to a front end of the optical lens than the second lens sheet 202 (the front end of the optical lens refers to a light incident end, and a rear end refers to an end close to the photosensitive assembly).

Figure 27:
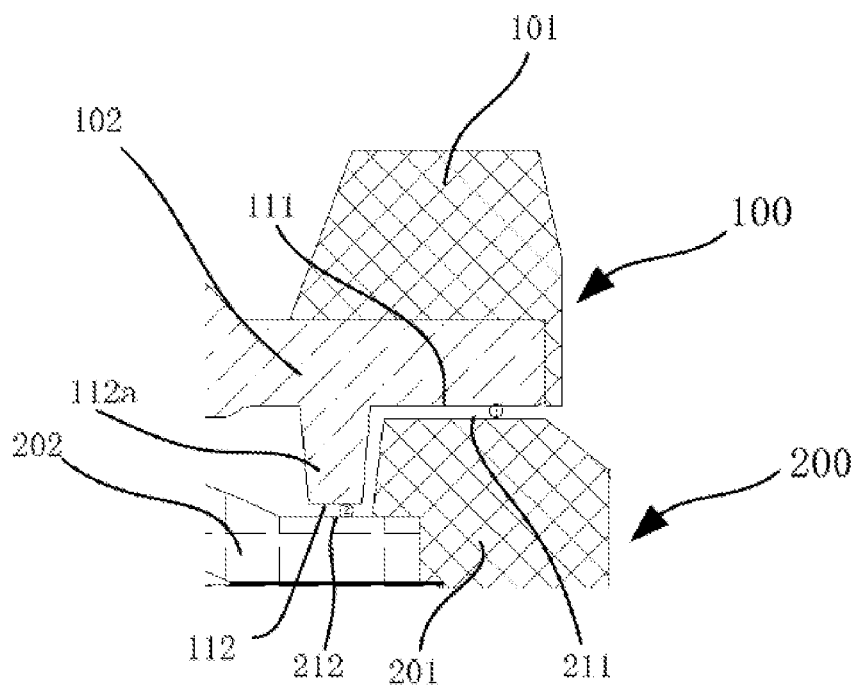
FIG. 27 shows a partially enlarged schematic cross-sectional view of a bonding region of a first lens component 100 and a second lens component 200 in another embodiment of the present disclosure.

Further, FIG. 27 shows a partially enlarged schematic cross-sectional view of a bonding region of a first lens component 100 and a second lens component 200 in another embodiment of the present disclosure. In this embodiment, there is a first gap and a second gap between the first lens component 100 and the second lens component 200. In FIG. 27, "①" and "②" are used to mark the positions of the first gap and the second gap, respectively. The adhesive includes a first adhesive and a second adhesive, wherein the first adhesive and the second adhesive are applied to the first gap and the second gap, respectively, and the first gap is closer to an outer side of the optical lens than the second gap (that is, the second gap is closer to an optical axis of the optical lens than the first gap). Moreover, the second adhesive is interposed between the first lens sheet 102 and the second lens sheet 202, and the adhesion force provided by the second adhesive is greater than the adhesion force provided by the first adhesive. Referring to FIG. 27, the first gap is located between a non-optical surface 111 of the first lens sheet 102 and an end surface 211 of the second lens barrel 201. The second gap is located between a non-optical surface 112 of the first lens sheet 101 and a non-optical surface 212 of one second lens sheet 202 closest to the first lens barrel 100. The non-optical surface 112 of the first lens sheet 101 may be formed with a first boss 112a protruding toward the second lens component 200. In this way, the second gap is located between the first boss 112a and the non-optical surface 212 of the second lens sheet 202. The first boss 112a may be annular in a bottom view. The cross-sectional shape of the first boss 112a is not limited, and for example, the cross-sectional shape may be trapezoidal, rectangular or the like.

In an embodiment, in order to enable the glue to be exposed and cured as much as possible, the barrel wall of the first lens barrel 101 of the first lens component 100 may be as thin as possible (for example, the thickness of the barrel wall of the first lens barrel 101 may be smaller than the thickness of the barrel wall required for rigidly supporting the first lens sheet 102), and even the first lens component may only be composed of a lens sheet subjected to a shading treatment (the shading treatment of the lens sheet avoids the influence of stray light on imaging). Herein, a non-optical surface of one lens sheet is a surface of a part of the lens sheet that does not participate in optical imaging. A part of the lens sheet that does not participate in optical imaging may be referred to as a non-optical zone, sometimes also referred to as an ineffective zone. In this embodiment, the non-optical zone of the lens sheet can play a supporting function. In this embodiment, the adhesive (including the first adhesive and the second adhesive) is used to support the first lens component 100 and the second lens component 200, so that a relative position of the first lens component 100 and the second lens component 200 is maintained at a relative position determined by active alignment. The first adhesive can be used for pre-fixing, and the second adhesive can be used for permanent fixing. In an embodiment, the first adhesive is a UV adhesive, and the UV adhesive can be cured by exposure. The second adhesive is a thermosetting adhesive, and thermosetting adhesive can be cured by baking the lens or module. In this embodiment, a surface of the non-optical surface 212 of the second lens sheet 202 applied with the second adhesive may be roughened to increase its roughness, thereby increasing the adhesion force between the second adhesive and the surface of the non-optical surface 212. The surfaces of the non-optical surfaces 111, 112 of the first lens sheet 102 may also be roughened to increase its roughness, thereby increasing the adhesion force between the second adhesive and the surfaces of the non-optical surfaces.

Figure 28:
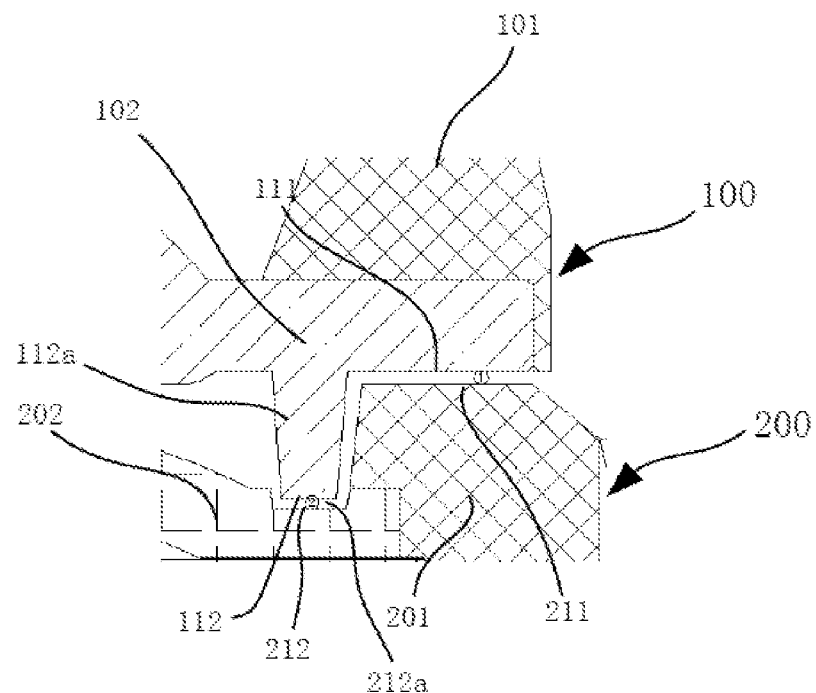
FIG. 28 shows a partially enlarged schematic cross-sectional view of a bonding region of a first lens component 100 and a second lens component 200 in still another embodiment of the present disclosure.

Further, FIG. 28 shows a partially enlarged schematic cross-sectional view of a bonding region of a first lens component 100 and a second lens component 200 in still another embodiment of the present disclosure. This embodiment and the embodiment shown in FIG. 27 are basically consistent, and differ only in that the non-optical surface 212 of the second lens sheet 202 forms a first groove 212a, and the second gap is located between the first boss 112a and the first groove 212a. The first boss 112a is annular in a bottom view, and the first groove 212a is annular in a top view. The first groove corresponding to the first boss can prevent the glue from overflowing and contaminating the lens sheet.

Figure 29:
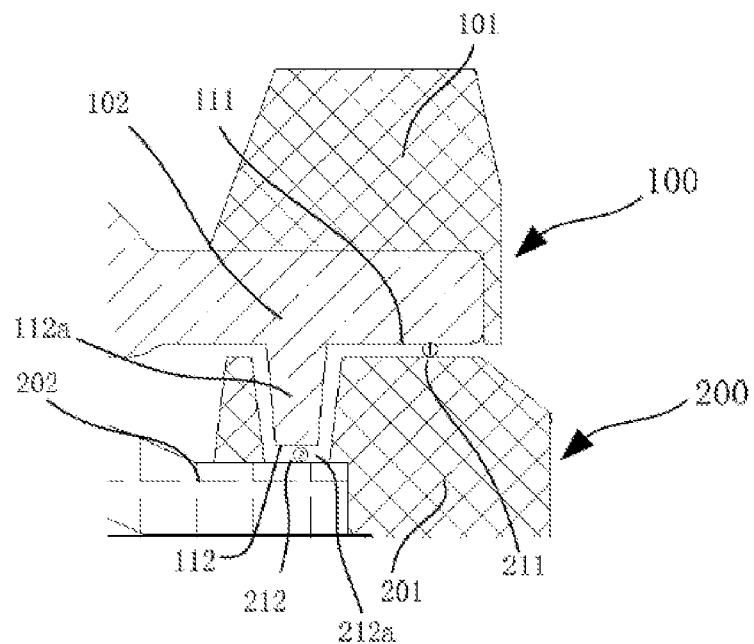
FIG. 29 shows a partially enlarged schematic cross-sectional view of a bonding region of a first lens component 100 and a second lens component 200 in further another embodiment of the present disclosure.
Figure 30:
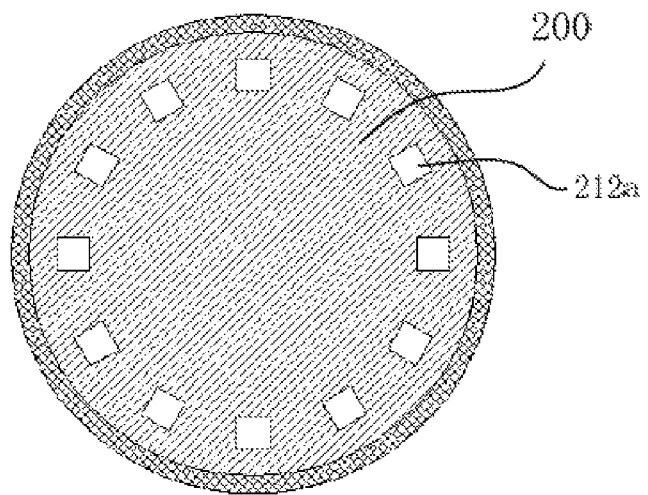
FIG. 30 shows a schematic top view of the second lens component 200 of the embodiment of FIG. 29.

Further, FIG. 29 shows a partially enlarged schematic cross-sectional view of a bonding region of a first lens component 100 and a second lens component 200 in further another embodiment of the present disclosure. FIG. 30 shows a schematic top view of the second lens component 200 of the embodiment of FIG. 29. Referring to FIGS. 29 and 30, in this embodiment, the first lens sheet 102 has a plurality of first bosses 112b protruding toward the second lens component 200, an end surface 213 of the second lens component 200 has a plurality of first grooves 213b for accommodating the plurality of first bosses 112b, and the second gap is located between the plurality of first bosses 112b and the plurality of first grooves 213b. In a top view (refer to FIG. 30), the plurality of first grooves 213b are distributed on a circle. Correspondingly, in a bottom view, the plurality of first bosses 112b are also distributed on a circle. In this embodiment, second glue can be applied to the bottom of the first groove 213b, which can prevent the glue from overflowing and contaminating the lens sheet. Moreover, the solution of this embodiment also increases the contact area between the first lens component 100 and the second lens component 200, thereby increasing the connection strength of the first lens component 100 and the second lens component 200.

Still referring to FIG. 29, in an embodiment, side walls of the plurality of first grooves 213b are formed by the second lens barrel 201, and bottom surfaces of the plurality of first grooves 213b are formed by a non-optical surface 212 of one second lens sheet 202 closest to the first lens component.

Figure 31:
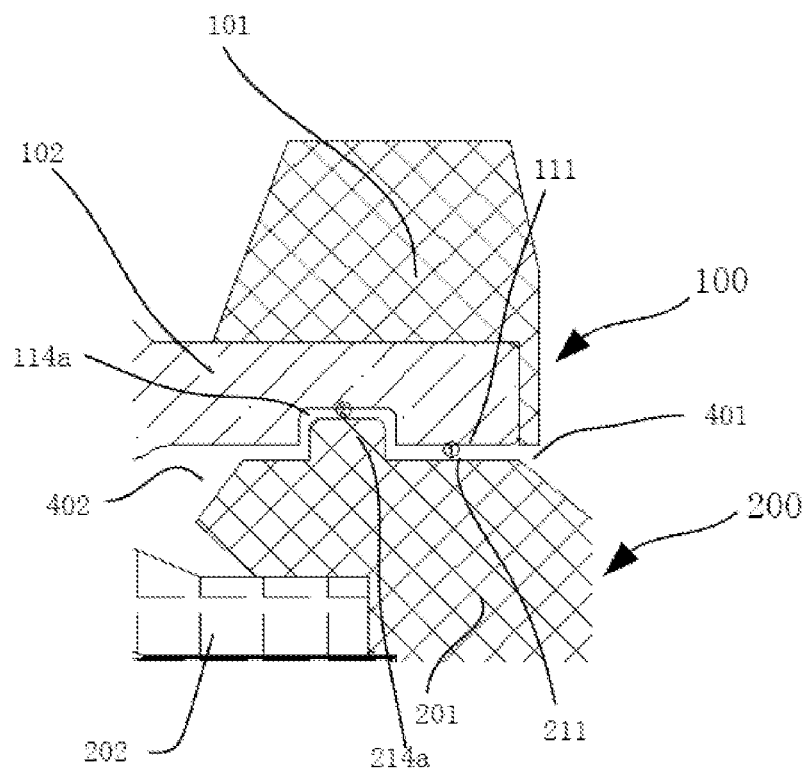
FIG. 31 shows a partially enlarged schematic cross-sectional view of a bonding region of a first lens component 100 and a second lens component 200 in further another embodiment of the present disclosure.

Further, FIG. 31 shows a partially enlarged schematic cross-sectional view of a bonding region of a first lens component 100 and a second lens component 200 in further another embodiment of the present disclosure. In this embodiment, there is a first gap and a second gap between the first lens component 100 and the second lens component 200. The adhesive includes a first adhesive and a second adhesive, wherein the first adhesive and the second adhesive are applied to the first gap and the second gap, respectively, and the first gap is closer to an outer side of the optical lens than the second gap (that is, the second gap is closer to an optical axis of the optical lens than the first gap). The adhesion force provided by the second adhesive is greater than the adhesion force provided by the first adhesive. An end surface of the second lens barrel 201 has a second boss 214a protruding toward the first lens component 100, a non-optical surface of the first lens sheet 102 has a second groove 114a, and the second gap is located between the second boss 214a and the second groove 114a. The first gap is located between a non-optical surface 111 of the first lens sheet 102 and an end surface 211 of the second lens barrel 201. The second boss 214a may be annular in a top view. The cross-sectional shape of the second boss 214a is not limited, and for example, its cross-sectional shape may be trapezoidal, rectangular or the like. The second groove 114a may be annular in a bottom view. In order to enable the glue to be exposed and cured as much as possible, the barrel wall of the first lens barrel 101 of the first lens component 100 may be as thin as possible (for example, the thickness of the barrel wall of the first lens barrel 101 may be smaller than the thickness of the barrel wall required for rigidly supporting the first lens sheet 102), and even the first lens component may only be composed of a lens sheet subjected to a shading treatment (the shading treatment of the lens sheet avoids the influence of stray light on imaging).

Still referring to FIG. 31, in an embodiment, the second gap has a second opening 402 facing the optical axis of the optical lens, and a size of the second opening 402 in a direction along the optical axis is larger than an average size of the second gap. The first gap has a first opening 401 facing an outer side of the optical lens, and a size of the first opening 401 in a direction along the optical axis is greater than an average size of the first gap. The design of the first opening 401 and the second opening 402 can effectively drain the overflown glue and avoid the lens barrel or the optical zone of the lens sheet being contaminated. The first opening 401 and the second opening 402 each can be formed by making a chamfer on an end surface of the second lens barrel 201.

Figure 35:
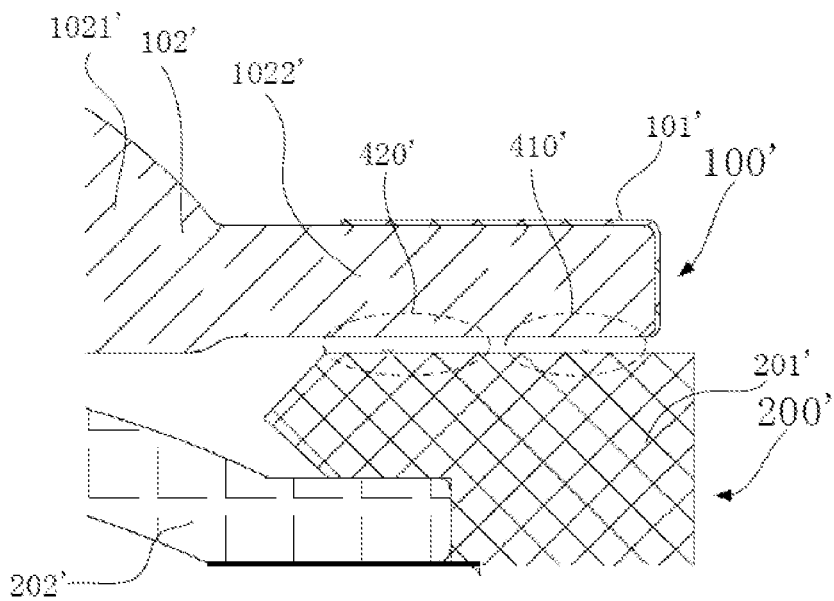
FIG. 35 shows a partially enlarged schematic cross-sectional view of a bonding region of a first lens component 100 and a second lens component 200 in further another embodiment of the present disclosure.

Further, FIG. 35 shows a partially enlarged schematic cross-sectional view of a bonding region of a first lens component 100' and a second lens component 200' in further another embodiment of the present disclosure. In this embodiment, the first lens component may only be composed of a lens sheet subjected to a shading treatment. The shading treatment of the lens sheet can avoid the influence of stray light on imaging. Referring to FIG. 35, the first lens component 100' includes a first lens sheet 102' and a light shielding portion 101' attached to the first lens sheet 102'. The first lens sheet 102' includes an optical zone 1021' and a non-optical zone 1022' (sometimes referred to as an ineffective zone). The optical zone 1021' is a region in the lens sheet that participates in optical imaging. The light shielding portion 101' is formed on a top surface and an outer side surface of the non-optical zone 1022' to avoid the influence of stray light on imaging. A bottom surface of the non-optical zone 1022' may be a first flat surface. The second lens component 200' includes at least one second lens sheet 202' and a second lens barrel 201'. All the second lens sheets 202' are mounted inside the second lens barrel 201'. A top surface of the second lens barrel 201' includes a second flat surface. A first gap 410' and a second gap 420' are formed between the first flat surface and the second flat surface. The first gap 410' is closer to an outer side of the optical lens than the second gap 420', that is, the second gap 420' is closer to the optical axis of the optical lens than the first gap 410'. The first adhesive is a UV adhesive, and the UV adhesive can be cured by exposure. The second adhesive is a thermosetting adhesive, and thermosetting adhesive can be cured by baking the lens or module. In this embodiment, a part of a bottom surface of the non-optical zone 1022' of the first lens sheet 102' that constitutes the second gap may be roughened to increase its roughness, thereby increasing an adhesion force between it and the second adhesive. After the first adhesive and the second adhesive are cured, a relative position of the first lens component 100' and the second lens component 200' can be maintained at a relative position determined by active alignment. Since the light shielding portion 101' is attached to the first lens sheet 102', the first lens barrel is cancelled, and the assembly tolerance between the first lens sheet and the first lens barrel is avoided, the problem of secondary variation caused by thickening (as shown in FIG. 24) of the adhesive due to the assembly tolerance is also avoided. On the other hand, in the Active Alignment process, the pickup mechanism usually needs to clamp (or absorb) the lens component from the outside so as to adjust the relative position of the first lens component and the second lens component. When the lens component has a lens barrel, the pickup mechanism clamps (or adsorbs) the lens barrel to indirectly move the lens sheet to realize the adjustment of the optical system. When there is an assembly tolerance for the first lens component (e.g. upper sub-lens), there is an undesirable installation difference between the lens sheet and the lens barrel (that is, there is a difference in the relative position of the lens sheet and the lens barrel). This difference will cause the size of the gap between the first lens component and the second lens component to be unstable during mass production, which is not convenient for active alignment. However, the embodiment of FIG. 35 can avoid this problem.

Further, in the foregoing embodiments, a UV adhesive and a thermosetting adhesive are used for the first adhesive and the second adhesive, respectively. Generally speaking, thermosetting adhesive can provide an adhesion force greater than that of the UV adhesive after curing, so that the adhesion force provided by the second adhesive is greater than the adhesion force provided by the first adhesive. The UV adhesive is applied to the first gap located on an outer side (i.e. a side farther from the optical axis), and thermosetting adhesive is applied to the second gap located on an inner side (i.e. a side closer to the optical axis). The UV adhesive is cured by direct irradiation of light to pre-fix the first lens component and the second lens component according to the relative position determined by the active alignment. Then, the pre-fixed optical lens is heated to cure thermosetting adhesive at the second gap, thereby enhancing the structural strength of the optical lens and improving the reliability of the optical lens.

It needs to be noted that in other embodiments, the first adhesive may also be another adhesive cured by light (for example, it may be a UV thermosetting adhesive). The second adhesive may also be another adhesive cured by heat, by moisture, by anaerobic or oxidative curing.

In another embodiment, the first adhesive and the second adhesive may be of the same material when they are in a liquid state. For example, UV thermosetting adhesives may be used for both of the first adhesive and the second adhesive. However, the UV thermosetting adhesives located in the first gap and the second gap are each cured in a different way (for example, the UV thermosetting adhesive in the first gap may be directly irradiated with light to complete the light curing, and then the UV thermosetting adhesive in the second gap is cured by heat), so as to form different materials with different microstructures after curing, so that the adhesion force provided by the second adhesive after curing is greater than the adhesion force provided by the first adhesive after curing. The microstructure may be, for example, a molecular structure, a physical form in micrometers, a molecular ratio, a lattice form, or the like.

Further, in an embodiment, the first adhesive and the second adhesive may not be in contact with each other so as to avoid the generation of chemical changes after the first adhesive and the second adhesive are mixed and the influence on the characteristics of glue. Since the generation of chemical changes after the first adhesive and the second adhesive are mixed is avoided, this embodiment can further enhance the reliability of the optical lens or camera module.

Further, the size of the first gap in the direction along the optical axis of the optical lens is 30-100 μm.

Further, in an embodiment, the size of the second gap in the direction along the optical axis of the optical lens is 30-100 μm.

Further, when the first adhesive and the second adhesive are of the same material when they are in a liquid state (that is, when not cured), the difference of the sizes of the second gap and the first gap in the direction along the optical axis of the optical lens is less than a threshold (the threshold is smaller than 100 μm).

Figure 32:
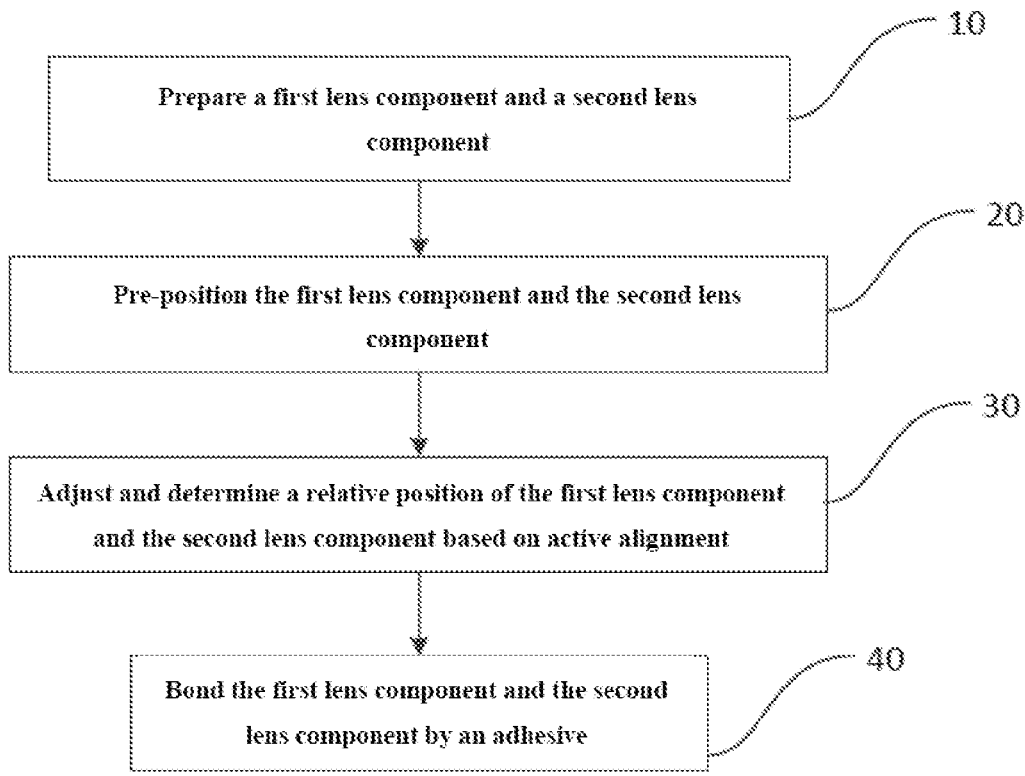
FIG. 32 shows a flowchart of an assembly method for optical lens in an embodiment of the present disclosure.

In the above embodiment, the number of lens sheets of the first lens component and the second lens component can be adjusted as needed. For example, the number of lens sheets of the first lens component and the second lens component may be two and four, respectively, or may be three and three, respectively, or may be four and two, respectively, or may be five and one, respectively. The total number of lens sheets of the entire optical lens can also be adjusted as needed. For example, the total number of lens sheets of the optical lens can be six, or may be five or seven. Particularly, in a preferred embodiment, when the first lens component has a plurality of first lens sheets, these first lens sheets are fitted with each other to maintain at a fixed position relative to each other. In other words, the plurality of first lens sheets of the first lens component do not need the first lens barrel to provide a supporting function, and the structure of the optical system of the first lens component can be kept stable. Moreover, when the first lens component and the second lens component are bonded by the adhesive, it is sufficient as long as the first lens sheet in each of the embodiments described previously (there is only a single first lens sheet in these embodiments) is replaced by one first sheet closest to the second lens component among the plurality of first lens sheets fitted each other. That is to say, the shape and structure of the first lens sheet in FIGS. 25-40 can be used for one first lens sheet closest to the second lens component among the plurality of first lens sheets fitted each other, thereby achieving similar functions. Further, FIG. 32 shows a flowchart of an assembly method for optical lens in an embodiment of the present disclosure. Referring to FIG. 32, the method comprises:

Step 10, prepare a first lens component and a second lens component, wherein the first lens component includes at least one first lens sheet, when there are a plurality of first lens sheets, these first lens sheets are fitted with each other to maintain at a fixed position relative to each other, and the second lens component includes a second lens barrel and at least one second lens sheet located in the second lens barrel.

Step 20, pre-position the first lens component and the second lens component, so that the at least one second lens sheet and the at least one first lens sheet together constitute an imageable optical system.

Step 30, adjust and determine a relative position of the first lens component and the second lens component based on active alignment.

Step 40, bond the first lens component and the second lens component by an adhesive, wherein the adhesive is interposed between the first lens sheet and the second lens component. In this step, the cured adhesive is used to support the first lens component and the second lens component, so that the relative position of the first lens component and the second lens component is maintained at a relative position determined by active alignment.

Further, in an embodiment, before step 30 is performed, the adhesive may be applied on the gap between the first lens component and the second lens component, and then step 30 is performed to adjust and determine the relative position of the first lens component and the second lens component. After determining the relative position, step 40 is performed to cure the adhesive, so that the cured adhesive is used to support the first lens component and the second lens component, and thus the relative position of the first lens component and the second lens component is maintained at the relative position determined by the active alignment. In another embodiment, step 30 may be performed first so as to adjust and determine the relative position of the first lens component and the second lens component. After determining the relative position, the first lens component (or second lens component) is temporarily moved away, then the adhesive is applied, and thereafter, the first lens component (or second lens component) is moved back based on the determined relative position. Finally, the adhesive is cured so that the relative position of the first lens component and the second lens component is maintained at the relative position determined by the active alignment.

Further, in an embodiment, in the step 30, a first gap and a second gap are formed between the first lens component and the second lens component, wherein the first gap is closer to the outer side of the optical lens than the second gap.

Figure 33:
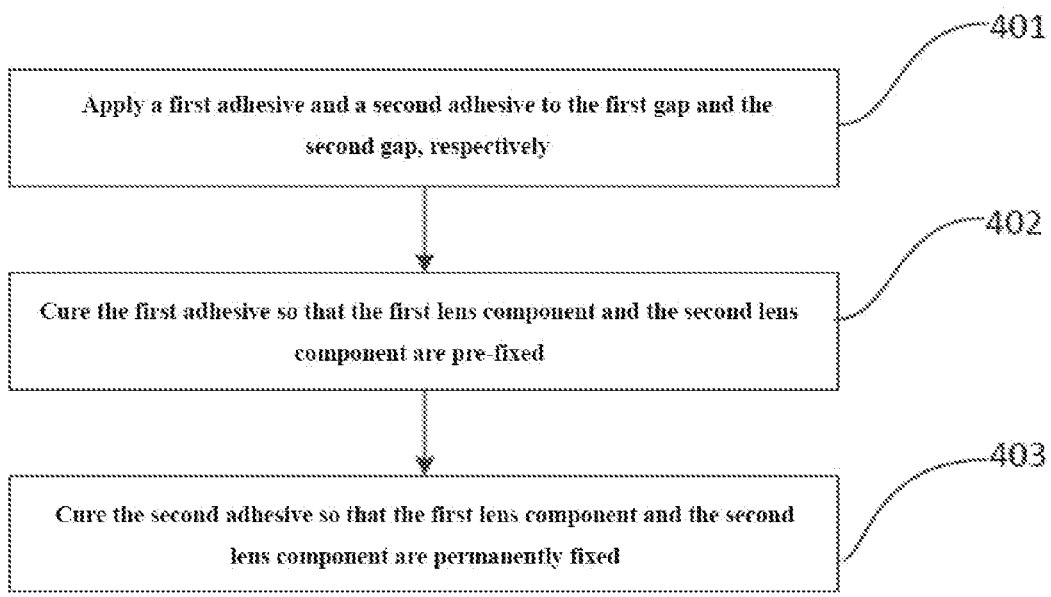
FIG. 33 shows a flowchart of step 40 in an embodiment of the present disclosure.

Further, FIG. 33 shows a flowchart of step 40 in an embodiment of the present disclosure. Referring to FIG. 33, the step 40 comprises the following sub-steps:

Step 401, apply a first adhesive and a second adhesive to the first gap and the second gap, respectively, wherein an adhesion force of the second adhesive is greater than an adhesion force of the first adhesive.

Step 402, cure the first adhesive so that the first lens component and the second lens component are pre-fixed.

Step 403, cure the second adhesive so that the first lens component and the second lens component are permanently combined. The first adhesive may be a UV adhesive, and the second adhesive may be a thermosetting adhesive.

In step 402, when the first lens barrel and the second lens are bonded by using the first adhesive, the curing deformation of the adhesive has a small action force on the lens barrel, thereby reducing the deformation of the lens barrel. In step 403, since the first lens sheet is directly bonded to the corresponding second lens component, the increase in the first gap and the second gap caused by the assembly tolerance of the first lens barrel and the first lens sheet can be avoided, thereby avoiding the thickness of the adhesive being too large. If the thickness of the adhesive is too large, the deformation that will occur when the adhesive is cured will cause the lens barrel to distort, which in turn causes the first lens sheet or the second lens sheet to be misaligned. Therefore, this embodiment can avoid the position change of the lens sheet caused by the deformation of the first lens barrel and/or the second lens barrel, thereby ensuring that the permanent relative position between the first lens sheet and the second lens sheet formed after curing is consistent with the relative position between the first lens component and the second lens component determined by the active alignment, further ensuring that the imaging quality meets expectations.

Further, in an embodiment, in the step of pre-positioning the first lens component and the second lens component (step 30), the first gap formed is located between a non-optical surface of one first lens sheet closest to the second lens component among the at least one first lens sheet and an end surface of the second lens barrel. Moreover, the second gap formed is located between one first lens sheet closest to the second lens component and one second lens sheet closest to the first lens component among the at least one second lens sheet.

In the foregoing embodiments, a UV adhesive and a thermosetting adhesive are used for the first adhesive and the second adhesive, respectively. Generally speaking, thermosetting adhesive can provide an adhesion force greater than that of the UV adhesive after curing, so that the adhesion force provided by the second adhesive is greater than the adhesion force provided by the first adhesive. The UV adhesive is applied to the first gap located on an outer side (i.e. a side farther from the optical axis), and thermosetting adhesive is applied to the second gap located on an inner side (i.e. a side closer to the optical axis). The UV adhesive is cured by direct irradiation of light to pre-fix the first lens component and the second lens component according to the relative position determined by the active alignment. Then, the pre-fixed optical lens is heated to cure thermosetting adhesive at the second gap, thereby enhancing the structural strength of the optical lens and improving the reliability of the optical lens.

It needs to be noted that in other embodiments, the first adhesive may also be another adhesive cured by light (for example, it may be a UV thermosetting adhesive). The second adhesive may also be another adhesive cured by heat, by moisture, by anaerobic or oxidative curing.

In another embodiment, the first adhesive and the second adhesive may be of the same material when they are in a liquid state. For example, UV thermosetting adhesives may be used for both of the first adhesive and the second adhesive. However, the UV thermosetting adhesives located in the first gap and the second gap are each cured in a different way (for example, the UV thermosetting adhesive in the first gap may be directly irradiated with light to complete the light curing, and then the UV thermosetting adhesive in the second gap is cured by heat), so as to form different materials with different microstructures after curing, so that the adhesion force provided by the second adhesive after curing is greater than the adhesion force provided by the first adhesive after curing. The microstructure may be, for example, a molecular structure, a physical form in micrometers, a molecular ratio, a lattice form, or the like.

Further, in an embodiment, the first adhesive and the second adhesive may not be in contact with each other so as to avoid the generation of chemical changes after the first adhesive and the second adhesive are mixed and the influence on the characteristics of glue. Since the generation of chemical changes after the first adhesive and the second adhesive are mixed is avoided, this embodiment can further enhance the reliability of the optical lens or camera module.

Further, in an embodiment, the size of the first gap in the direction along the optical axis of the optical lens is 30-100 μm.

Further, in an embodiment, the size of the second gap in the direction along the optical axis of the optical lens is 30-100 μm.

Further, when the first adhesive and the second adhesive are of the same material when they are in a liquid state (that is, when not cured), the difference of the sizes of the second gap and the first gap in the direction along the optical axis of the optical lens is less than a threshold (the threshold is smaller than 100 μm).

Further, according to an embodiment of the present disclosure, there is also provided an assembly method for camera module, comprising: using the assembly method for optical lens of any one of the foregoing embodiments to assemble an optical lens, and then using the assembled optical lens to manufacture a camera module.

Figure 34:
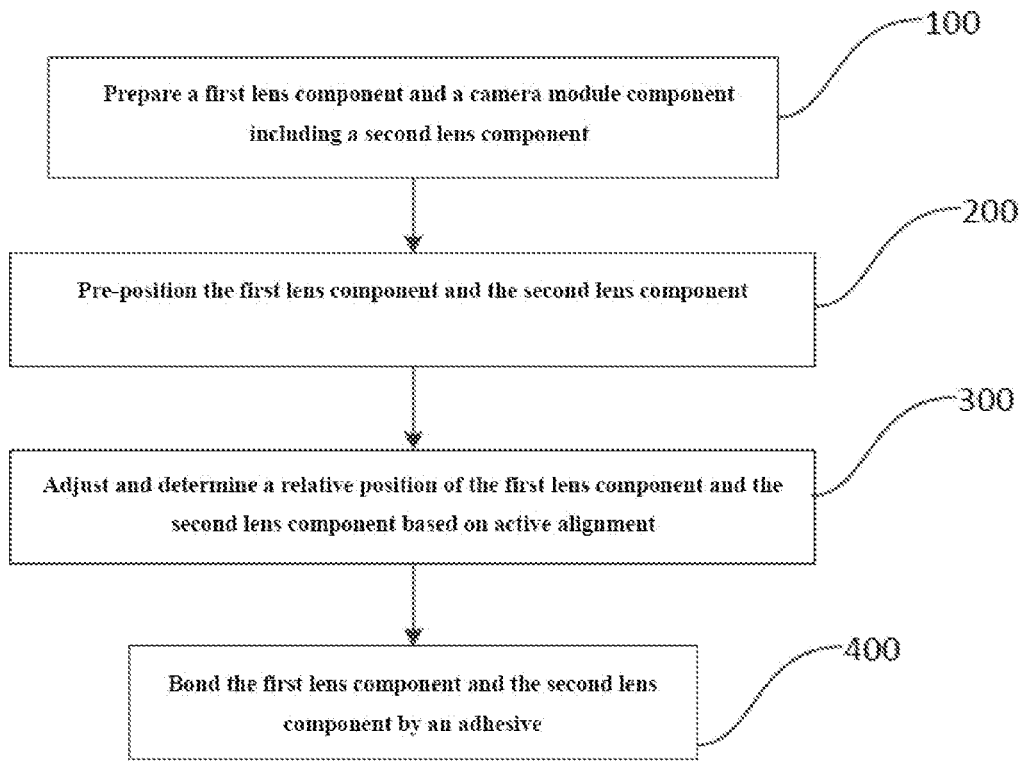
FIG. 34 shows a flowchart of an assembly method for camera module in another embodiment of the present disclosure.

Further, FIG. 34 shows a flowchart of an assembly method for camera module in another embodiment of the present disclosure, and the method comprises:

Step 100, prepare a first lens component and a camera module component, wherein the camera module component includes a second lens component and a photosensitive module combined together, and wherein the first lens component includes at least one first lens sheet, and when there are a plurality of first lens sheets, these first lens sheets are fitted with each other to maintain at a fixed position relative to each other, and the second lens component includes a second lens barrel and at least one second lens sheet located in the second lens barrel. In this step, in order to enable the glue to be exposed and cured as much as possible, the prepared first lens component may include a first lens barrel, the barrel wall of the first lens barrel may be as thin as possible, and even the first lens component may only be composed of one first lens sheet subjected to a shading treatment (the shading treatment of the lens sheet can avoid the influence of stray light on imaging).

Step 200, pre-position the first lens component and the second lens component, so that the at least one second lens sheet and the at least one first lens sheet together constitute an imageable optical system.

Step 300, adjust and determine a relative position of the first lens component and the second lens component based on active alignment.

Step 400, bond the first lens component and the second lens component by an adhesive, wherein the adhesive is interposed between the first lens sheet and the second lens component.

It can be seen that, compared with the previous embodiment, the second lens component and the photosensitive module in this embodiment are assembled together to constitute the camera module component, and then the camera module component and the first lens component are assembled to obtain a complete camera module. The process of assembling the camera module component and the first lens component can also have many variants. For example, the multiple embodiments of the assembly method for optical lens described previously may be referred to so as to realize the assembly of the camera module component and the first lens component.

Figure 37A:
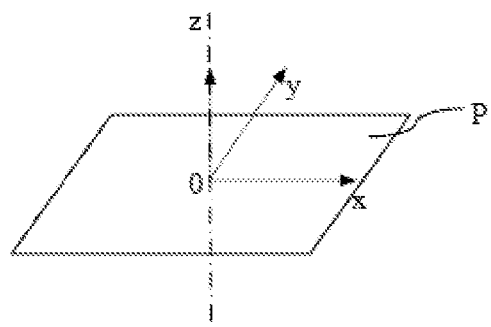
FIG. 37a shows a relative position adjustment manner in active alignment in an embodiment of the present disclosure.

Further, the active alignment described in the present application can adjust the relative position of the first lens component and the second lens component in multiple degrees of freedom. FIG. 37a shows a relative position adjustment manner in active alignment in an embodiment of the present disclosure. In this adjustment manner, the first lens component (or the first lens sheet) can be moved along x, y, and z directions relative to the second lens component (that is, the relative position adjustment in this embodiment has three degrees of freedom). The z direction is a direction along the optical axis, and the x and y directions are directions perpendicular to the optical axis. The x and y directions are both in an adjustment plane P, and the translation in the adjustment plane P can be decomposed into two components in the x and y directions.

Figure 37B:
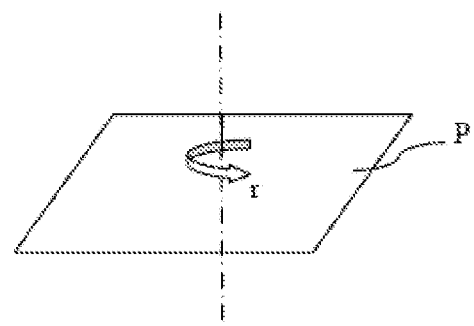
FIG. 37b shows rotation adjustment in active alignment according to another embodiment of the present disclosure.

FIG. 37b shows rotation adjustment in active alignment according to another embodiment of the present disclosure. In this embodiment, in addition to the three degrees of freedom in FIG. 25, a degree of freedom in rotation is, i.e., an adjustment in a r direction, is also added to the relative position adjustment. In this embodiment, the adjustment in the r direction is rotation in the adjustment plane P, i.e. rotation around an axis perpendicular to the adjustment plane P.

Figure 37C:
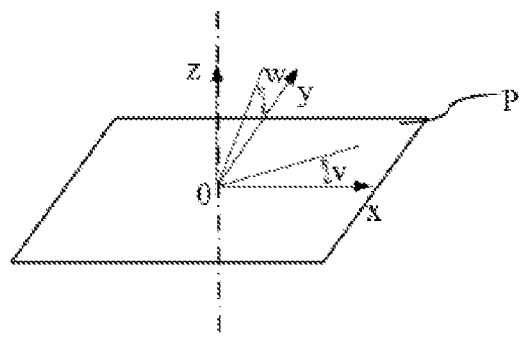
FIG. 37c shows a relative position adjustment manner in which adjustments in v and w directions are added in active alignment according to still another embodiment of the present disclosure.

Further, FIG. 37c shows a relative position adjustment manner in which adjustments in v and w directions are added in active alignment according to still another embodiment of the present disclosure. The v direction represents a rotation angle of an xoz plane, and the w direction represents a rotation angle of a yoz plane. The rotation angles of the v direction and the w direction can be combined into a vector angle, which represents the total tilt state. That is to say, by adjusting in the v and w directions, the tilt attitude of the first lens component relative to the second lens component (i.e. tilt of an optical axis of the first lens component relative to an optical axis of the second lens component) can be adjusted.

The adjustments in the six degrees of freedom of x, y, z, r, v, and w may all affect the imaging quality of the optical system (for example, affecting the size of the resolution). In other embodiments of the present disclosure, the relative position adjustment manner may be to adjust only in any one of the above six degrees of freedom, or may be a combination of any two or more of them.

Figure 36A:
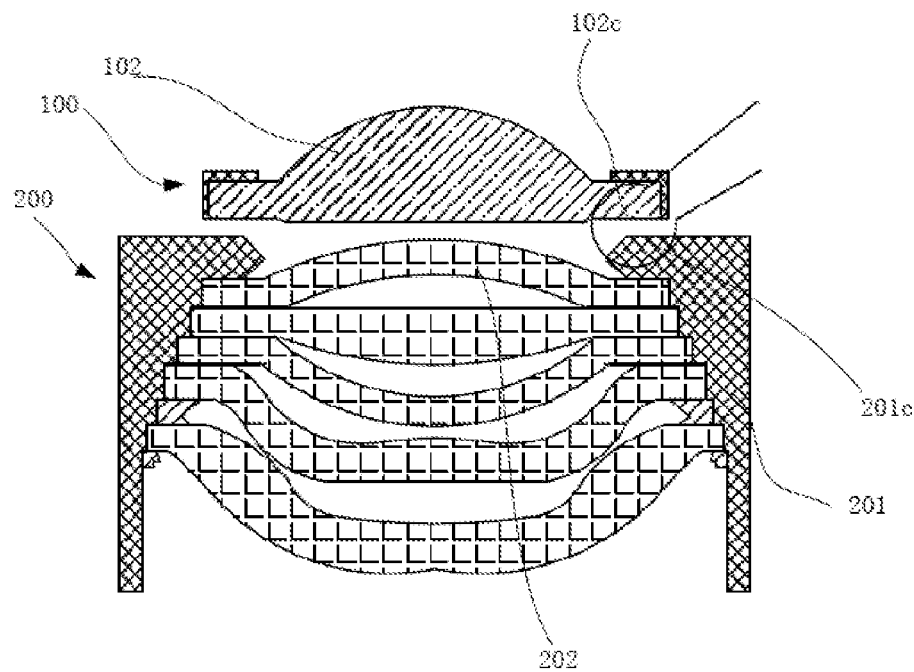
FIG. 36a shows a schematic cross-sectional view of a first lens sheet and a second lens component after pre-positioning according to an embodiment of the disclosure.
Figure 36B:
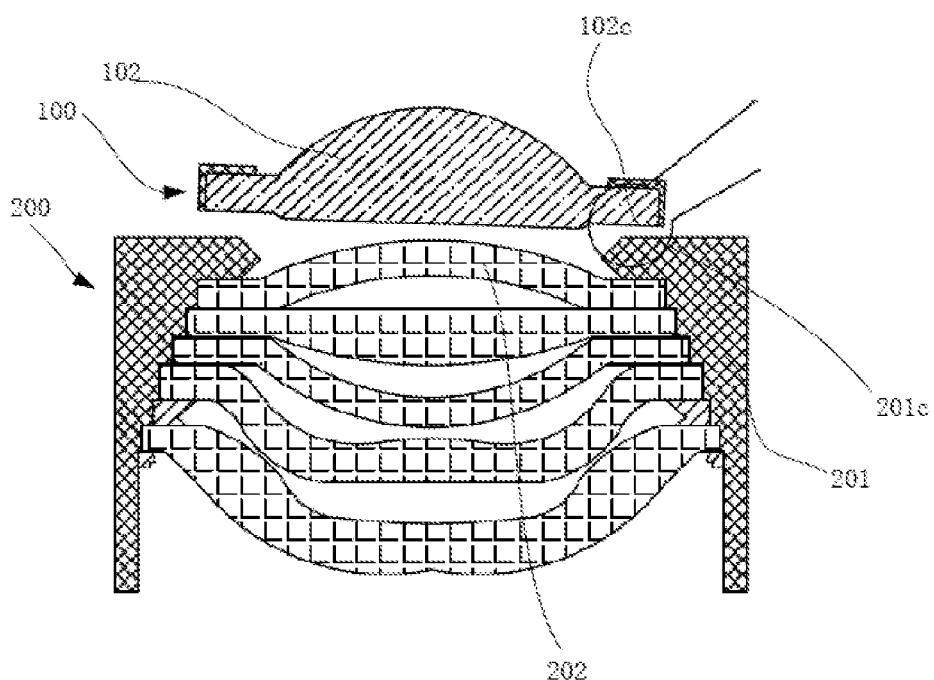
FIG. 36b shows a schematic cross-sectional view of a positional relationship between a first lens sheet and a second lens component after active alignment according to an embodiment of the present disclosure.
Figure 36C:
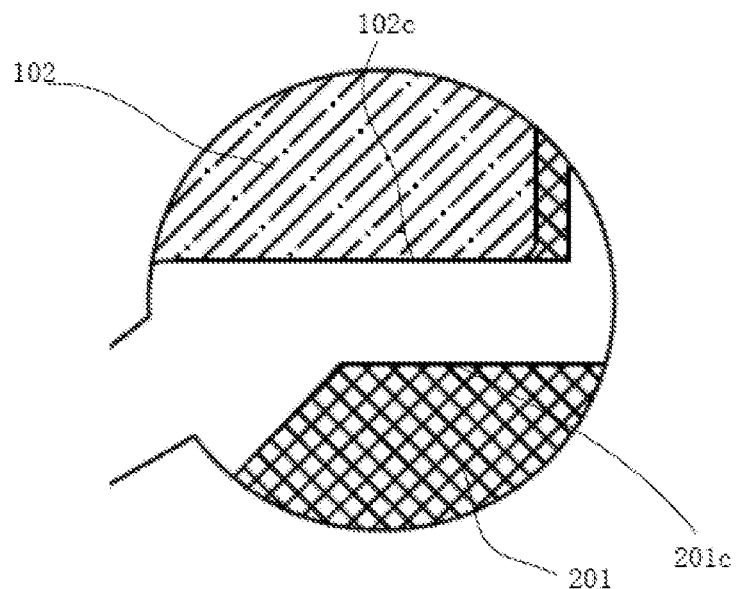

Further, FIGS. 36a-b show an assembly flow of an optical lens according to an embodiment of the present disclosure, comprising:

Step 1, the second lens component 200 is fixed by a fixing mechanism (not shown), and a pickup mechanism (not shown) clamps (or adsorbs) the first lens sheet 102 of the first lens component 100 for pre-positioning, so that the first and second lens components 100 and 200 constitute an imageable optical system. FIG. 36a shows a schematic cross-sectional view of a first lens sheet and a second lens component after pre-positioning according to an embodiment of the disclosure. FIG. 36c shows an enlarged schematic view of a partial region in FIG. 36a, and the enlarged part is a region within a circle in FIG. 36a. Referring to FIGS. 36a and 36c, the first lens component 100 has at least one first bearing surface 102c, the second lens component 200 has at least one second bearing surface 201c, and the at least one first bearing surface 102c and the at least one second bearing surface 201c constitute at least one gap located between the first bearing surface and the second bearing surface. The first lens sheet 102 in this embodiment not only plays a supporting function, but also plays a function of improving optical capabilities. The first bearing surface 102c is provided by the non-optical zone of the first lens sheet 102, and the second bearing surface 201c is preferably provided by the second lens barrel 201 in this embodiment.

Figure 36D:
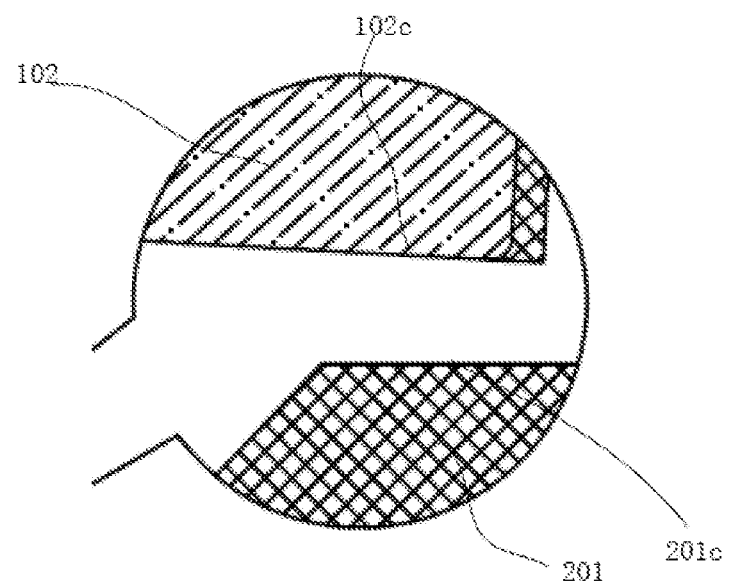
FIG. 36d shows an enlarged schematic view of a partial region in FIG. 36b.

Step 2: the first lens component 100 is actively adjusted relative to the second bearing surface of the second lens component by a pickup mechanism. The active adjustment comprises photographing a reference object, which is preferably a target board, and obtaining a correction amount from image information. The correction amount is preferably a MTF value, or may be a SFR or Tv Line value. After obtaining the relevant correction amount, the pickup mechanism adjusts the positions of the first and second lens components to improve the optical system. A specific reference standard of the optical system includes the improved optical system having the performance of reduced aberrations and improved resolution compared with the optical system that is not adjusted. The improvement index of the optical system may also be set as needed. Pre-positioning is a starting step of the subsequent process flow. When the first and second lens components are pre-positioned, the design size of the gap is generally followed. FIG. 36b shows a schematic cross-sectional view of a positional relationship between a first lens sheet and a second lens component after active alignment according to an embodiment of the present disclosure. FIG. 36d shows an enlarged schematic view of a partial region in FIG. 36b, and the enlarged part is a region within a circle in FIG. 36b. Referring to FIGS. 36b and 36d, after the active alignment, the included angle between the axis of the first lens sheet 102 and the axis of the second lens component 200 may not be zero. At this time, the first bearing surface 102c and the second bearing surface 201c are not parallel.

In an embodiment, the second lens component is actively adjusted with respect to the first bearing surface by the pickup mechanism, and the active adjustment includes adjusting the first bearing surface and the second bearing surface relative to X-axis and/or Y-axis and/or Z-axis directions so as to change the relative position of the first bearing surface and the second bearing surface, so that the first bearing surface and the second bearing surface form an included angle. Generally speaking, the size of the adjusted included angle is inconsistent with the included angle during pre-positioning. The included angle changes the size of the gap during pre-positioning, which may thus cause a certain error between the adjusted gap and the designed gap size. It can be seen from the figures that, referring to the actual experiments, since the errors during production due to the assembly of the first lens component and the second lens component lead to poor consistency of the optical systems of the first and second lens components, a change has occurred compared with the pre-positioning in step 1 after adjustment.

In another embodiment, the relative position of the first lens sheet 102 with respect to the second lens component 200 is adjusted by a pickup mechanism, and the adjustment of the relative position comprises: adjusting an included angle between the axis of the first lens component and an the axis of the second lens component to cause the first lens component to move along an adjustment plane relative to the second lens component, and cause the first lens component to move along a direction perpendicular to the adjustment plane to the second lens component, so that the measured resolution (e.g. MTF value, SFR value or Tv Line value) of imaging of the optical system is improved. The movement along the adjustment plane includes translation and/or rotation on the adjustment plane. After the active alignment, the included angle between the axis of the first lens sheet 102 and the axis of the second lens component 200 may not be zero. The axis of the second lens component 200 may be represented by the axis of the second lens barrel 201 or the second lens sheet 202.

Figure 36E:
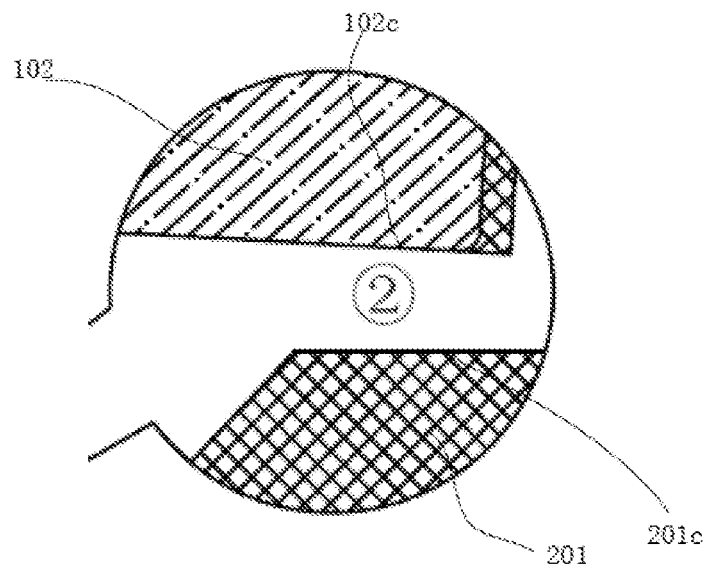
FIG. 36e shows an enlarged schematic view of a partial region where a glue dispensing position of an adhesive between a first lens sheet and a second lens barrel is added on the basis of FIG. 36d.

Step 3: after the determined gap after adjustment is recorded, the pickup mechanism moves the first lens component 100 away from the second lens component to expose the second bearing surface 201c. After glue is dispensed on the second bearing surface 201c, the first lens component 100 is returned to a position during recording by the pickup mechanism, and then the adhesive is cured to support and fix the first lens component and the second lens component. FIG. 36e shows an enlarged schematic view of a partial region where a glue dispensing position of an adhesive between a first lens sheet and a second lens barrel is added on the basis of FIG. 36d. The position for dispensing glue in this step is marked with "②". It is worth mentioning that, since the lens barrel of the first lens component is cancelled, the light shielding portion in this embodiment can be blackened, which can greatly reduce the size of the first lens component. At the same time, the adhesive is completely interposed between the first lens sheet and the second lens component, avoiding the chain reaction of the lens barrel variation driven by the glue variation and the lens sheet variation driven by the lens barrel variation.

The above description is only the preferred implementations of the present application and the explanation of the applied technical principle. It should be understood by those skilled in the art that the scope of disclosure involved in the present application is not limited to technical solutions formed by specific combinations of the above technical features, and at the same time, should also cover other technical solutions formed by any combination of the above technical features or equivalent features thereof without departing from the concept of the disclosure. For example, the above features and (but not limited to) the technical features with similar functions disclosed in the present application are replaced with each other to form technical solutions.

The invention claimed is:

1. An optical lens, comprising:
a first lens component comprising a first lens barrel and at least one first lens sheet mounted in the first lens barrel;
a second lens component comprising a second lens barrel and at least one second lens sheet mounted in the second lens barrel, the at least one second lens sheet and the at least one first lens sheet together constituting an imageable optical system, wherein there are a first gap and a second gap between the first lens component and the second lens component, and the first gap is closer to an outer side of the optical lens than the second gap; and
an adhesive bonding the first lens component and the second lens component together, wherein the adhesive includes a first adhesive located in the first gap and a second adhesive located in the second gap;
wherein the second adhesive is interposed between and directly bonding a top surface of the second lens barrel and a bottom surface of the first lens sheet, or interposed between and directly bonding a bottom surface of the first lens barrel and a top surface of the second lens sheet.

2. The optical lens according to claim 1, wherein arrangement positions and materials of the first adhesive and the second adhesive are suitable for making the first adhesive and the second adhesive be cured successively at different times.

3. The optical lens according to claim 2, wherein the first adhesive and the second adhesive are of different materials, and an adhesion force provided by the second adhesive after curing is greater than an adhesion force provided by the first adhesive after curing.

4. The optical lens according to claim 3, wherein the first adhesive is an adhesive cured by light, and/or the second adhesive is an adhesive cured by heat, by moisture, by anaerobic or oxidative curing.

5. The optical lens according to claim 2, wherein the first adhesive and the second adhesive are of the same material when they are in a liquid state, and the first adhesive and the second adhesive form different materials with different microstructures after curing, so that an adhesion force provided by the second adhesive after curing is greater than an adhesion force provided by the first adhesive after curing.

6. The optical lens according to claim 5, wherein the first adhesive and the second adhesive are both UV thermosetting adhesives.

7. The optical lens according to claim 2, wherein the first adhesive and the second adhesive do not contact each other.

8. The optical lens according to claim 2, wherein a difference between sizes of the second gap and the first gap in a direction along an optical axis of the optical lens is smaller than a threshold.

9. The optical lens according to claim 3, wherein the first gap is located between an end surface of the first lens barrel and an end surface of the second lens barrel.

10. The optical lens according to claim 3, wherein the second gap is located between an end surface of the first lens barrel and a non-optical surface of a second lens sheet closest to the first lens barrel, and the non-optical surface of the second lens sheet closest to the first lens barrel has a roughened surface; or the second gap is located between an end surface of the second lens barrel and a non-optical surface of a first lens sheet closest to the second lens barrel, and the non-optical surface of the first lens sheet closest to the second lens barrel has a roughened surface.

11. The optical lens according to claim 1, wherein the adhesive is used to support the first lens component and the second lens component after curing, so that a relative position of the first lens component and the second lens component is maintained at a relative position determined by active alignment.

12. The optical lens according to claim 3, wherein an end surface of the second lens barrel comprises a flat surface, the first gap is located between the flat surface and an end surface of the first lens barrel, and the second gap is located between the flat surface and a non-optical surface of the first lens sheet.

13. The optical lens according to claim 12, wherein there is a third gap between an outer surface of the first lens sheet bonded to the second lens component and an inner surface of the first lens barrel, and the first lens sheet to the second lens component and the first lens barrel are fixed to each other by a third adhesive filled in the third gap.

14. The optical lens according to claim 10, wherein the second gap has a second opening facing an optical axis of the optical lens, and a size of the second opening in a direction along the optical axis is greater than an average size of the second gap.

15. The optical lens according to claim 10, wherein the first gap has a first opening facing an outer side of the optical lens, and a size of the first opening in a direction along an optical axis of the optical lens is greater than an average size of the first gap.

16. A camera module, comprising the optical lens according to claim 1.

17. An assembly method for optical lens, comprising:
pre-positioning a first lens component and a second lens component so that at least one second lens sheet of the second lens component and at least one first lens sheet of the first lens component together form an imageable optical system, the at least one first lens sheet being mounted in a first lens barrel of the first lens component, and the at least one second lens sheet being mounted in a second lens barrel of the second lens component, and forming a first gap and a second gap between the first lens component and the second lens component, wherein the first gap is closer to an outer side of the optical lens than the second gap;
adjusting and determining a relative position of the first lens component and the second lens component based on active alignment; and
bonding the first lens component and the second lens component by an adhesive;
wherein the adhesive includes a first adhesive located in the first gap and a second adhesive located in the second gap;
wherein the second adhesive is interposed between and directly bonding a top surface of the second lens barrel and a bottom surface of the first lens sheet, or interposed between and directly bonding a bottom surface of the first lens barrel and a top surface of the second lens sheet.

18. The assembly method for optical lens according to claim 17, wherein the bonding by the adhesive comprises:
using the cured adhesive to support the first lens component and the second lens component, so that a relative position of the first lens component and the second lens component is maintained at a relative position determined by active alignment.

19. The assembly method for optical lens according to claim 17, wherein the pre-positioning the first lens component and the second lens component further comprises:
and
the bonding by the adhesive comprises:
wherein an adhesion force of the second adhesive is greater than an adhesion force of the first adhesive;
curing the first adhesive so that the first lens component and the second lens component are pre-fixed; and
curing the second adhesive so that the first lens component and the second lens component are permanently combined.

20. The assembly method for optical lens according to claim 19, wherein in the step of pre-positioning the first lens component and the second lens component, the first gap formed is located between an end surface of the first lens barrel and an end surface of the second lens barrel; and the second gap formed is located between an end surface of the first lens barrel and a non-optical surface of one lens sheet closest to the first lens barrel among the at least one second lens sheet, or between an end surface of the second lens barrel and a non-optical surface of one lens sheet closest to the second lens barrel among the at least one first lens sheet.

* * * * *